US011852187B2

(12) United States Patent
Schaffert et al.

(10) Patent No.: US 11,852,187 B2
(45) Date of Patent: *Dec. 26, 2023

(54) SEED PLANTER WITH EQUALIZER ASSEMBLY

(71) Applicant: SCHAFFERT MANUFACTURING COMPANY, INC., Indianola, NE (US)

(72) Inventors: Paul E. Schaffert, Indianola, NE (US); Doug Shadley, Indianola, NE (US)

(73) Assignee: SCHAFFERT MANUFACTURING COMPANY, INC., Indianola, NE (US)

( * ) Notice: Subject to any disclaimer, the term of this patent is extended or adjusted under 35 U.S.C. 154(b) by 275 days.

This patent is subject to a terminal disclaimer.

(21) Appl. No.: 17/092,934

(22) Filed: Nov. 9, 2020

(65) Prior Publication Data

US 2021/0301863 A1    Sep. 30, 2021

Related U.S. Application Data

(63) Continuation of application No. 16/113,701, filed on Aug. 27, 2018, now Pat. No. 10,830,274, which is a
(Continued)

(51) Int. Cl.
*F16C 11/04* (2006.01)
*A01C 7/20* (2006.01)
(Continued)

(52) U.S. Cl.
CPC ............ *F16C 11/04* (2013.01); *A01C 5/04* (2013.01); *A01C 5/06* (2013.01); *A01C 5/064* (2013.01);
(Continued)

(58) Field of Classification Search
CPC .. A01C 5/04; A01C 5/06; A01C 5/064; A01C 5/066; A01C 5/068; A01C 7/06;
(Continued)

(56) References Cited

U.S. PATENT DOCUMENTS

| 13,683 A | 10/1855 | McCormick |
| 35,510 A | 6/1862 | De Haven |

(Continued)

FOREIGN PATENT DOCUMENTS

| AU | 2017399124 A1 | 8/2019 |
| CA | 3052323 A1 | 8/2018 |

(Continued)

OTHER PUBLICATIONS

Author Unknown , "1200 Series Advanced Seed Meter Planters", Case IiI, 2005, 1-35.
(Continued)

*Primary Examiner* — Christopher J. Novosad
(74) *Attorney, Agent, or Firm* — Dorsey & Whitney LLP

(57) ABSTRACT

A bracket for use with an agriculture planter including a trailing arm frame defining a pivot point thereon may include an arm bracket assembly with first and second arms. Each arm may extend from a middle portion of the bracket. First and second implements may be rotatably mounted on mounting ends of two of the arms. The middle portion of the bracket may be pivotally coupled to the trailing arm frame at the pivot point.

13 Claims, 66 Drawing Sheets

Related U.S. Application Data continuation of application No. 14/961,604, filed on Dec. 7, 2015, now Pat. No. 10,060,467, which is a continuation of application No. 13/428,922, filed on Mar. 23, 2012, now Pat. No. 9,204,590, which is a continuation-in-part of application No. 12/341,978, filed on Dec. 22, 2008, now Pat. No. 8,356,563.

(60) Provisional application No. 61/596,399, filed on Feb. 8, 2012, provisional application No. 61/467,085, filed on Mar. 24, 2011, provisional application No. 61/118,217, filed on Nov. 26, 2008, provisional application No. 61/016,386, filed on Dec. 21, 2007.

(51) Int. Cl.
*A01C 7/06* (2006.01)
*A01C 5/06* (2006.01)
*A01C 23/02* (2006.01)
*A01C 5/04* (2006.01)

(52) U.S. Cl.
CPC .............. *A01C 5/066* (2013.01); *A01C 5/068* (2013.01); *A01C 7/06* (2013.01); *A01C 7/201* (2013.01); *A01C 7/203* (2013.01); *A01C 23/025* (2013.01); *Y02P 60/21* (2015.11); *Y10T 403/32606* (2015.01)

(58) Field of Classification Search
CPC ....... A01C 7/201; A01C 7/203; A01C 23/025; A01C 5/00; A01C 5/062; A01C 7/00; A01C 7/20; A01C 23/023; A01C 23/02; A01C 23/00; F16C 11/04; F16C 11/00; Y10T 403/32606; Y10T 403/32; Y10T 403/00; Y02P 60/21; Y02P 60/20; Y02P 60/00

See application file for complete search history.

(56) References Cited

U.S. PATENT DOCUMENTS

| | | |
|---|---|---|
| 122,299 A | 12/1871 | Wight et al. |
| 176,708 A | 4/1876 | Templin |
| 203,207 A | 4/1878 | Springer |
| 211,601 A | 1/1879 | Springer |
| 252,265 A | 1/1882 | Scofield |
| 288,661 A | 11/1883 | Purdy et al. |
| 308,327 A | 11/1884 | Runstetler |
| 322,841 A | 7/1885 | Miskimen |
| 555,897 A | 3/1896 | Crane |
| 889,947 A | 6/1908 | Miller |
| 909,137 A | 1/1909 | Bellerive |
| 1,473,297 A | 11/1923 | Knight |
| 2,533,374 A | 12/1950 | Hyland |
| 2,805,486 A | 9/1957 | Barrett |
| 2,849,969 A | 9/1958 | Taylor |
| 2,872,883 A | 2/1959 | Padrick |
| 3,115,192 A | 12/1963 | Bushmeyer |
| 3,177,830 A | 4/1965 | Zimmerman |
| 3,336,885 A | 8/1967 | Lebow |
| 3,599,729 A | 8/1971 | Greemore |
| 3,666,572 A | 5/1972 | Nakagawa et al. |
| 3,895,589 A | 7/1975 | Garner et al. |
| 4,108,089 A | 8/1978 | Van Der Lely |
| 4,148,267 A | 4/1979 | Bennett et al. |
| 4,253,412 A | 3/1981 | Hogenson |
| 4,276,836 A | 7/1981 | Pust |
| 4,294,181 A | 10/1981 | Smith |
| 4,373,455 A | 2/1983 | Friggstad |
| 4,398,478 A | 8/1983 | Frase et al. |
| 4,542,705 A | 9/1985 | Orth |
| 4,565,141 A | 1/1986 | Kopecky |
| 4,580,507 A | 4/1986 | Dreyer et al. |
| 4,607,581 A | 8/1986 | Kopecky |
| 4,628,841 A | 12/1986 | Powilleit |
| 4,671,193 A | 6/1987 | States |
| 4,674,419 A | 6/1987 | Kopecky |
| 4,819,737 A | 4/1989 | Frase |
| 4,911,090 A | 3/1990 | Schimke |
| 5,078,528 A | 1/1992 | Schmidt |
| 5,092,255 A | 3/1992 | Long et al. |
| 5,361,848 A | 11/1994 | Fleischer et al. |
| 5,375,542 A | 12/1994 | Schaffert |
| 5,398,771 A | 3/1995 | Hornung et al. |
| 5,425,318 A | 6/1995 | Keeton |
| 5,640,915 A | 6/1997 | Schaffert |
| 5,673,638 A | 10/1997 | Keeton |
| 5,730,074 A | 3/1998 | Peter |
| 5,852,982 A | 12/1998 | Peter |
| 5,884,711 A | 3/1999 | Shoup |
| 5,904,107 A | 5/1999 | Kester |
| 5,918,557 A | 7/1999 | Schaffert |
| 5,996,514 A | 12/1999 | Arriola et al. |
| 6,082,274 A | 7/2000 | Peter |
| 6,082,275 A | 7/2000 | Schaffert |
| 6,119,608 A | 9/2000 | Peterson et al. |
| 6,148,747 A | 11/2000 | Deckler et al. |
| D440,985 S | 4/2001 | Noonan et al. |
| 6,209,466 B1 | 4/2001 | Wodrich |
| 6,220,191 B1 | 4/2001 | Peter |
| 6,283,050 B1 | 9/2001 | Schaffert |
| 6,321,667 B1 | 11/2001 | Shoup |
| 6,453,832 B1 | 9/2002 | Schaffert |
| 6,530,334 B2 | 3/2003 | Hagny |
| 6,640,732 B2 | 11/2003 | Prairie et al. |
| 6,763,773 B2 | 7/2004 | Schaffert |
| 7,121,216 B2 | 10/2006 | Schaffert |
| 7,360,495 B1 | 4/2008 | Martin |
| 7,410,005 B2 | 8/2008 | Lung et al. |
| 7,552,689 B2 | 6/2009 | Schaffert |
| 7,581,503 B2 | 9/2009 | Martin |
| 7,707,952 B2 | 5/2010 | Schaffert |
| 7,975,629 B1 | 7/2011 | Martin |
| 8,047,301 B2 | 11/2011 | Friggstad et al. |
| 8,356,563 B2 | 1/2013 | Schaffert et al. |
| 9,204,590 B2 | 12/2015 | Schaffert et al. |
| 9,232,689 B2 | 1/2016 | Trevino et al. |
| 10,060,467 B2 | 8/2018 | Schaffert et al. |
| 10,830,274 B2 * | 11/2020 | Schaffert ................ A01C 5/066 |
| 2002/0078869 A1 | 6/2002 | Brummelhuis |
| 2003/0051650 A1 | 3/2003 | Engelke et al. |
| 2005/0072344 A1 | 4/2005 | Kester |
| 2005/0155536 A1 | 7/2005 | Wendte et al. |
| 2007/0113763 A1 | 5/2007 | Schaffert |
| 2007/0278272 A1 | 12/2007 | Fast |
| 2008/0011208 A1 | 1/2008 | Martin |
| 2008/0066662 A1 | 3/2008 | Hesla |
| 2008/0257237 A1 | 10/2008 | Friesen et al. |
| 2008/0303238 A1 | 12/2008 | Fichter |
| 2009/0000796 A1 | 1/2009 | Cooper et al. |
| 2009/0056962 A1 | 3/2009 | Martin et al. |
| 2009/0084295 A1 | 4/2009 | Schaffert |
| 2009/0235853 A1 | 9/2009 | Schaffert |
| 2013/0074747 A1 | 3/2013 | Schaffert et al. |
| 2019/0271356 A1 | 9/2019 | Schaffert et al. |
| 2019/0364747 A1 | 12/2019 | Freeman |
| 2022/0078966 A1 | 3/2022 | Schaffert et al. |
| 2022/0240439 A1 | 8/2022 | Schaffert |

FOREIGN PATENT DOCUMENTS

| | | |
|---|---|---|
| DE | 3321490 A1 | 12/1984 |
| DE | 3441610 A1 | 5/1986 |
| GB | 2572309 A | 9/2019 |
| WO | 2018148776 A1 | 8/2018 |

OTHER PUBLICATIONS

Author Unknown , "3000 Series Kinze Planters", 2003, 3-6 and 12.
Author Unknown , "8000 Series Planters: Simply Advanced", White Planters, 2001, 13-15.

(56) References Cited

OTHER PUBLICATIONS

Author Unknown, "Brochure: The Precision Vacuum Planter, NG Plus Series", A.T.I., Inc., Monosem, Lenexa, Kansas, at least as early as Dec. 21, 2007, Dec. 21, 2007, 10 pages.
Author Unknown, "Changing Planting Depth", at least as early as Dec. 21, 2007, Dec. 21, 2007, 3 pages.
Author Unknown, "Cost-Effective Solutions for Real-World Needs", Yetter Profitable Solutions, at least as early as Dec. 21, 2007, Dec. 21, 2007, 1-29.
Author Unknown, "Dawn 1572/1500 Coulter Combo", Jul. 28, 2004, Jul. 28, 2004, 2 pages.
Author Unknown, "Dawn Curvtine™ Closing Wheel", 1997, 2 pages.
Author Unknown, "Dawn Trashwheels Row Cleaner", at least as early as Dec. 21, 2007, Dec. 21, 2007, 1 page.
Author Unknown, "Ferti-Placer", Schaffert Manufacturing Co., Inc., at least as early as Dec. 21, 2007, Dec. 21, 2007, 2 pages.
Author Unknown, "Groff AG Improvements, LLC", at least as early as Dec. 21, 2007, Dec. 21, 2007, 4 pages.
Author Unknown, "Hawkins Manufacturing Inc.", at least as early as 2002, 2002, 1 page.
Author Unknown, "Heavy-Duty Coulter", at least as early as Dec. 21, 2007, Dec. 21, 2007, 3 pages.
Author Unknown, "http://precision_planting.com/html/keeton.html", at least as early as Dec. 30, 2000, Dec. 30, 2000, 1 page.
Author Unknown, "Keeton Seed Firmer", J & K Enterprises, 1994, 2 pages.
Author Unknown, "Keeton Seed Firmer, Precision Planting", at least as early as Apr. 9, 2001, Apr. 9, 2001, 4 pages.
Author Unknown, "Photos Labeled "Photo A" and "Photo B"", Oct. 17, 2007, Oct. 17, 2007, 1 page.
Author Unknown, "Planter "N" Forcer, Planter Fertilizer Attachments online product information description", Hawkins Mfg. Inc. Retrieved from http://www.hawkinsmfg.com/ attachments.htm on Dec. 9, 2012, Dec. 9, 2012, 2 pages.
Author Unknown, "Planter Fertilizer Attachments", Hawkins Manufacturing Inc., at least as early as Dec. 21, 2007, Dec. 21, 2007, 4 pages.
Author Unknown, "Seed to Soil Inforcer", Seed Flap, Spring 1995, 1995, 1 page.
Author Unknown, "Sunco: Effectively Moves Trash in All Conditions!", at least as early as Dec. 21, 2007, Dec. 21, 2007, 2 pages.
Author Unknown, "Sunco: Your Solution for Accurate Starter Fertilizer Placement", at least as early as Dec. 21, 2007, Dec. 21, 2007, 2 pages.
Author Unknown, "Tine-Tooth Row Tillage Attachment", at least as early as Dec. 21, 2007, Dec. 21, 2007, 9 pages.
Author Unknown, "Tube Alignment Brackets", M & J Cotton Farms, Inc., at least as early as Oct. 30, 1995, Oct. 30, 1995, 1 page.
Author Unknown, "We Know It's All About Strong Roots", Yetter Profitable Solutions, at least as early as Dec. 21, 2007, Dec. 21, 2007, 1-29.
Author Unknown, "Yield-Pro Planters: Unsurpassed in form, function and safety", Great Plains, at least as early as Dec. 21, 2007, Dec. 21, 2007, 4, 5 and 10.
Author Unknown, "Yield-Pro Planters: Yield increasing row spacing options coupled with best in class productivity and accuracy", at least as early as Dec. 21, 2007, Dec. 21, 2007, 1 page.
Finck, "Where to start with starter fertilizer", Farm Journal, Jan. 1996, Jan. 1996, 15-16.
Agco, "Tye, Parts Catalog, 2015/2020 Rice and Soybean Drill EFF. S/N K-6-1367-10-RD," Jun. 1996, Form No. 79017760, Litho in U.S.A., 3 pages.

* cited by examiner

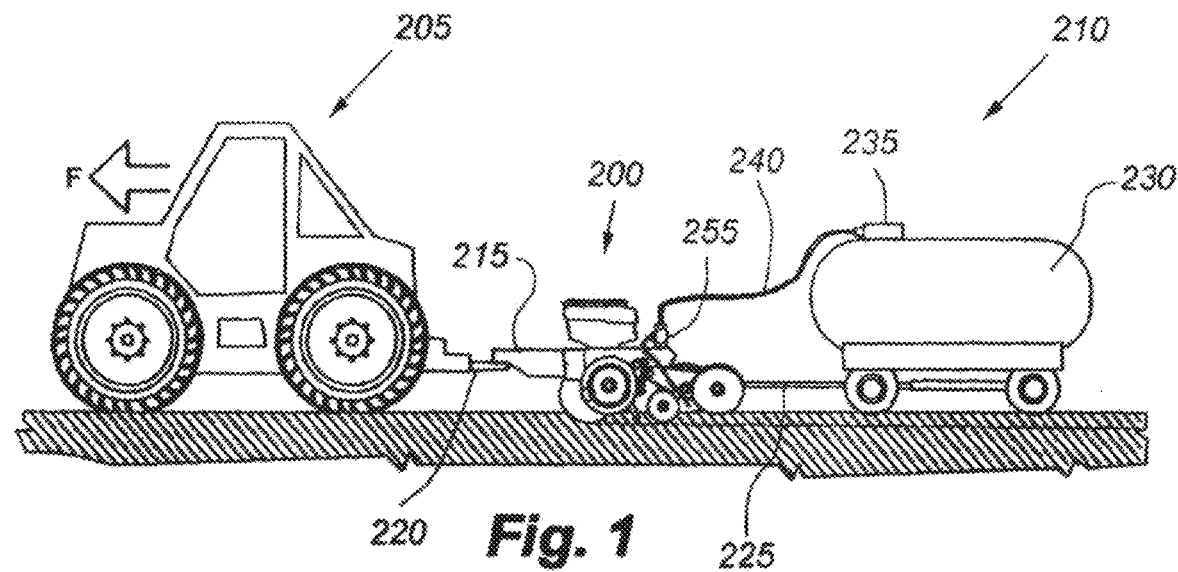
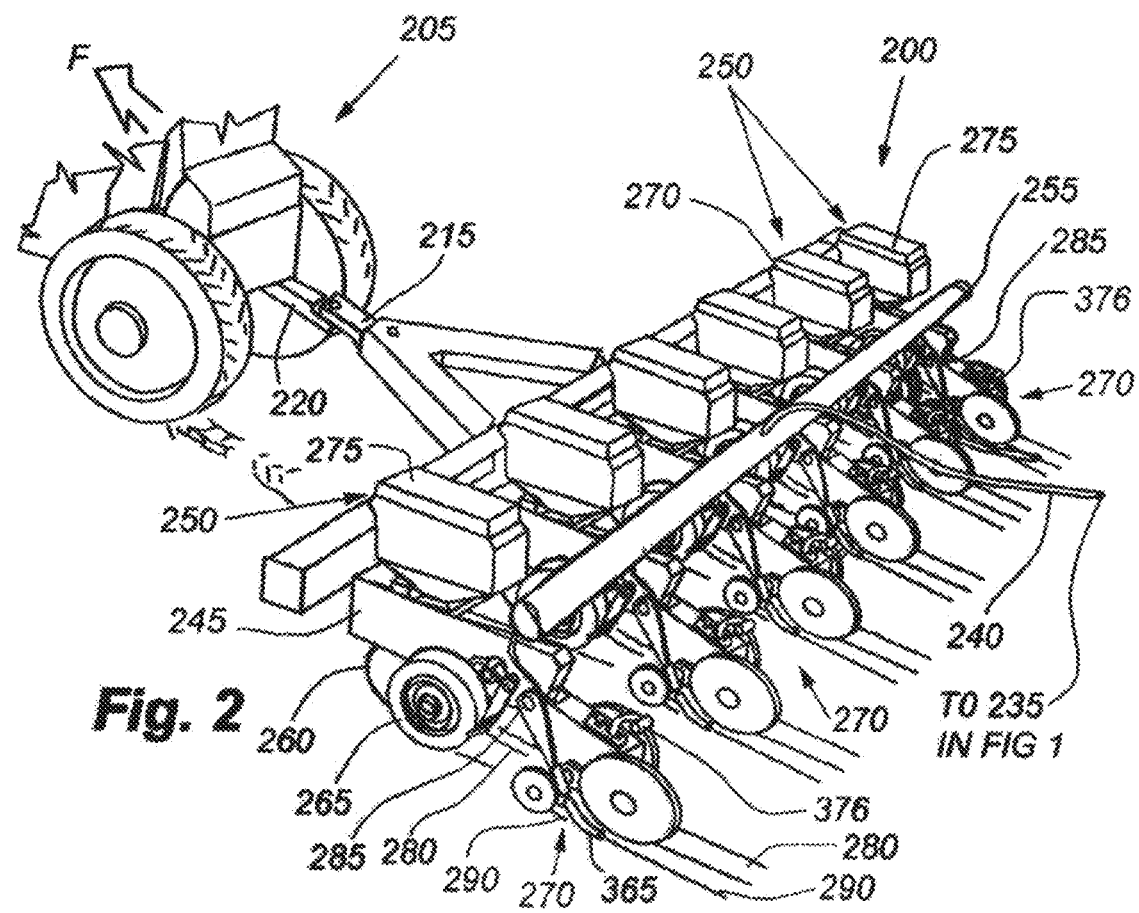

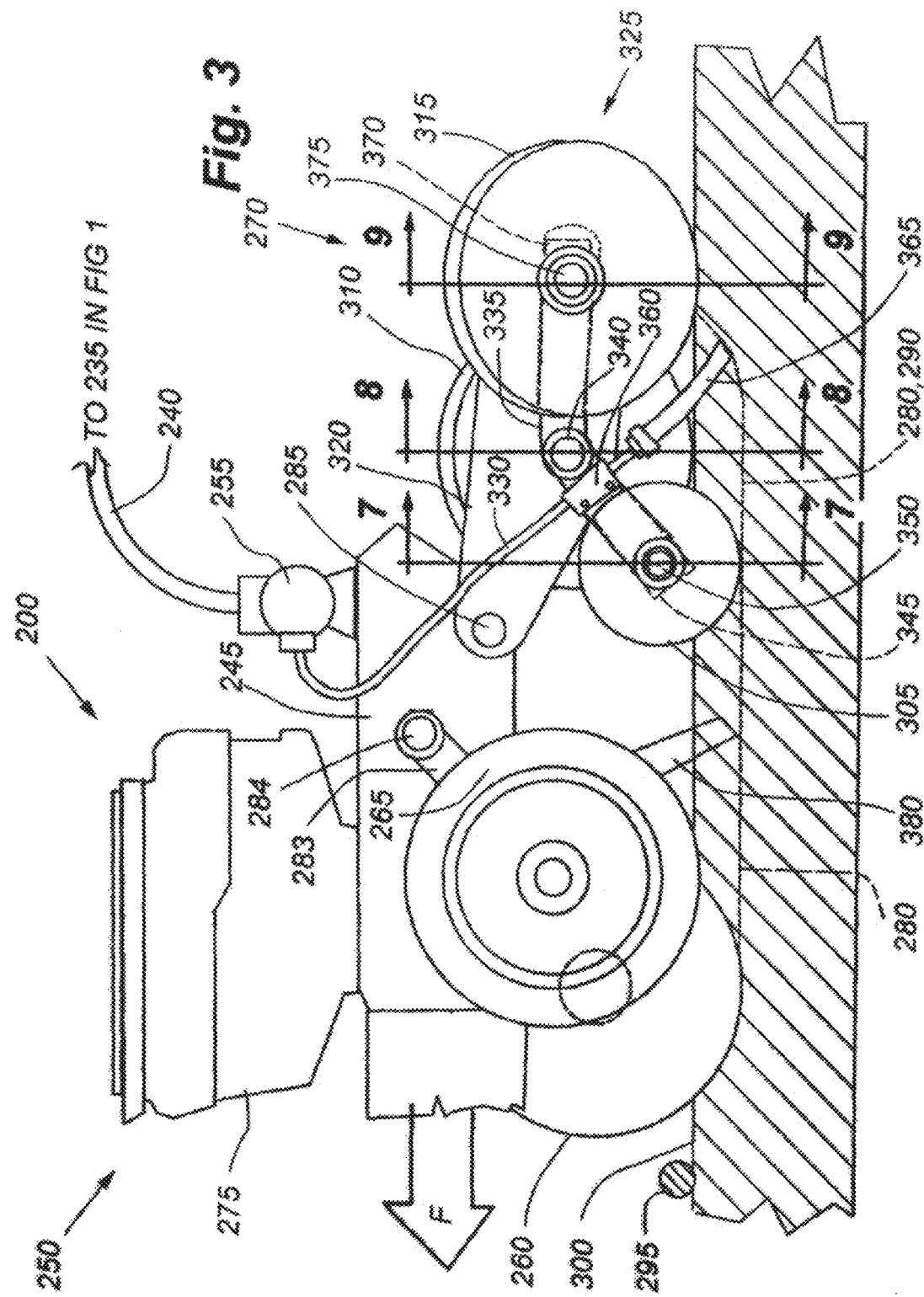

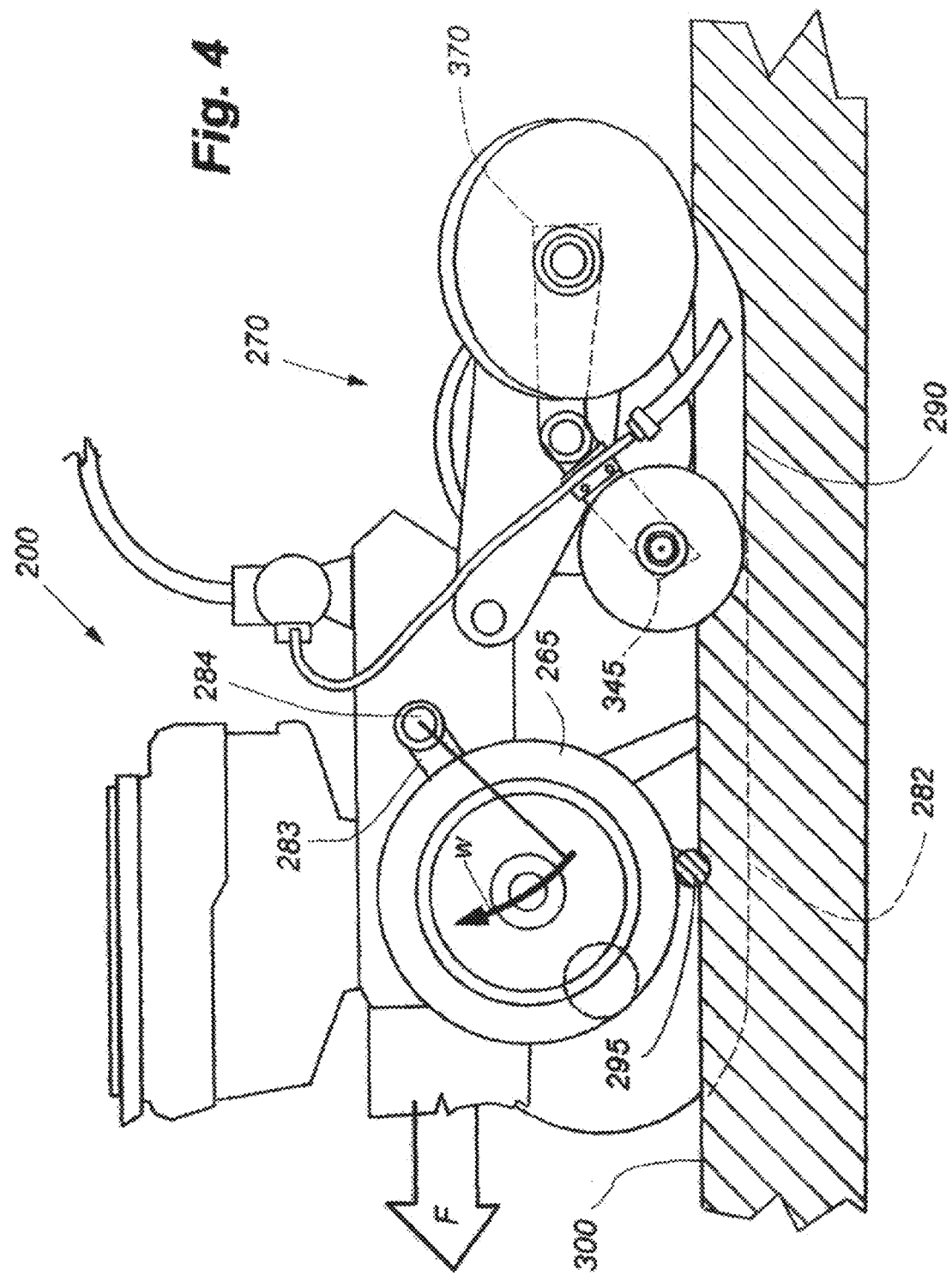

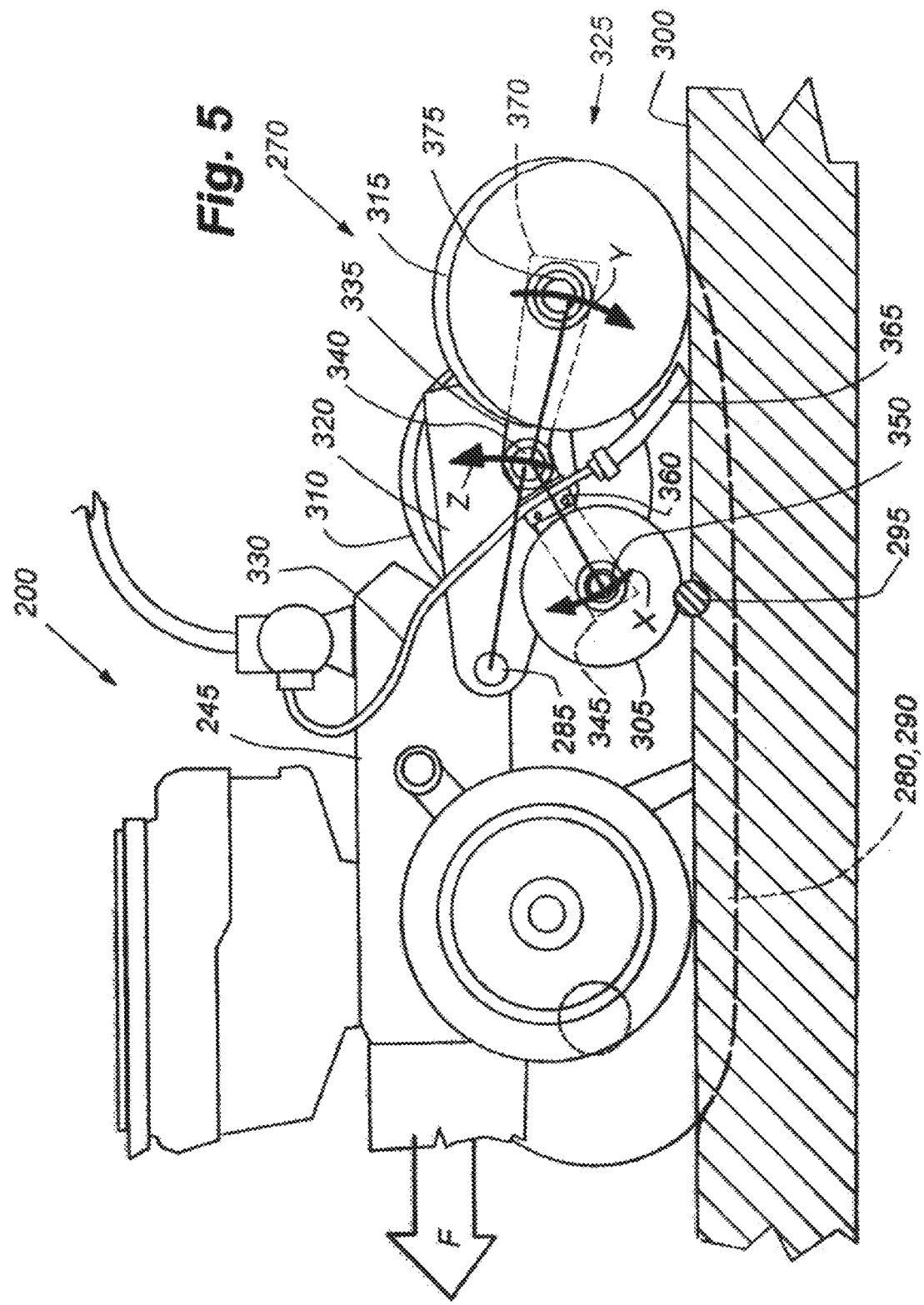

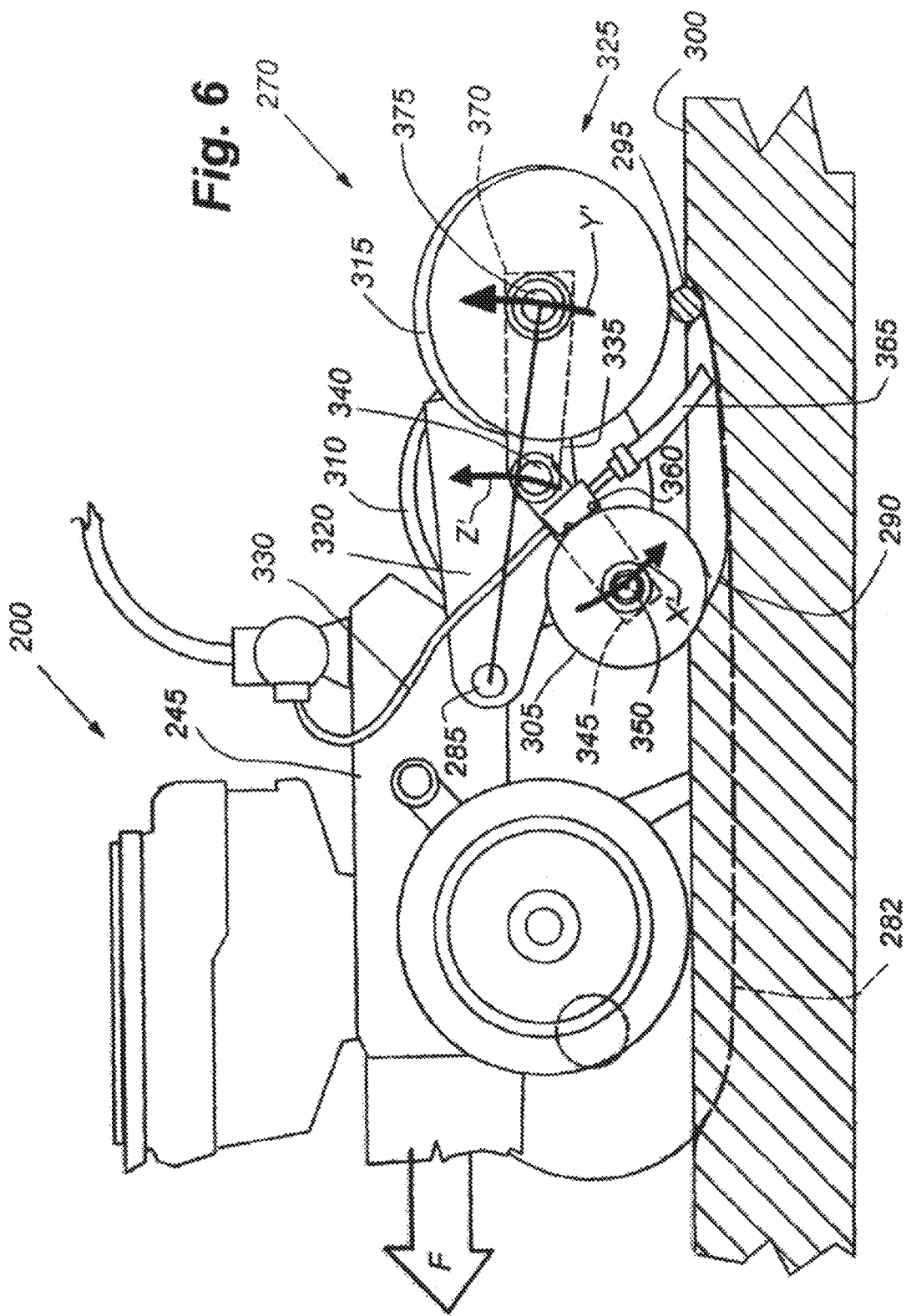

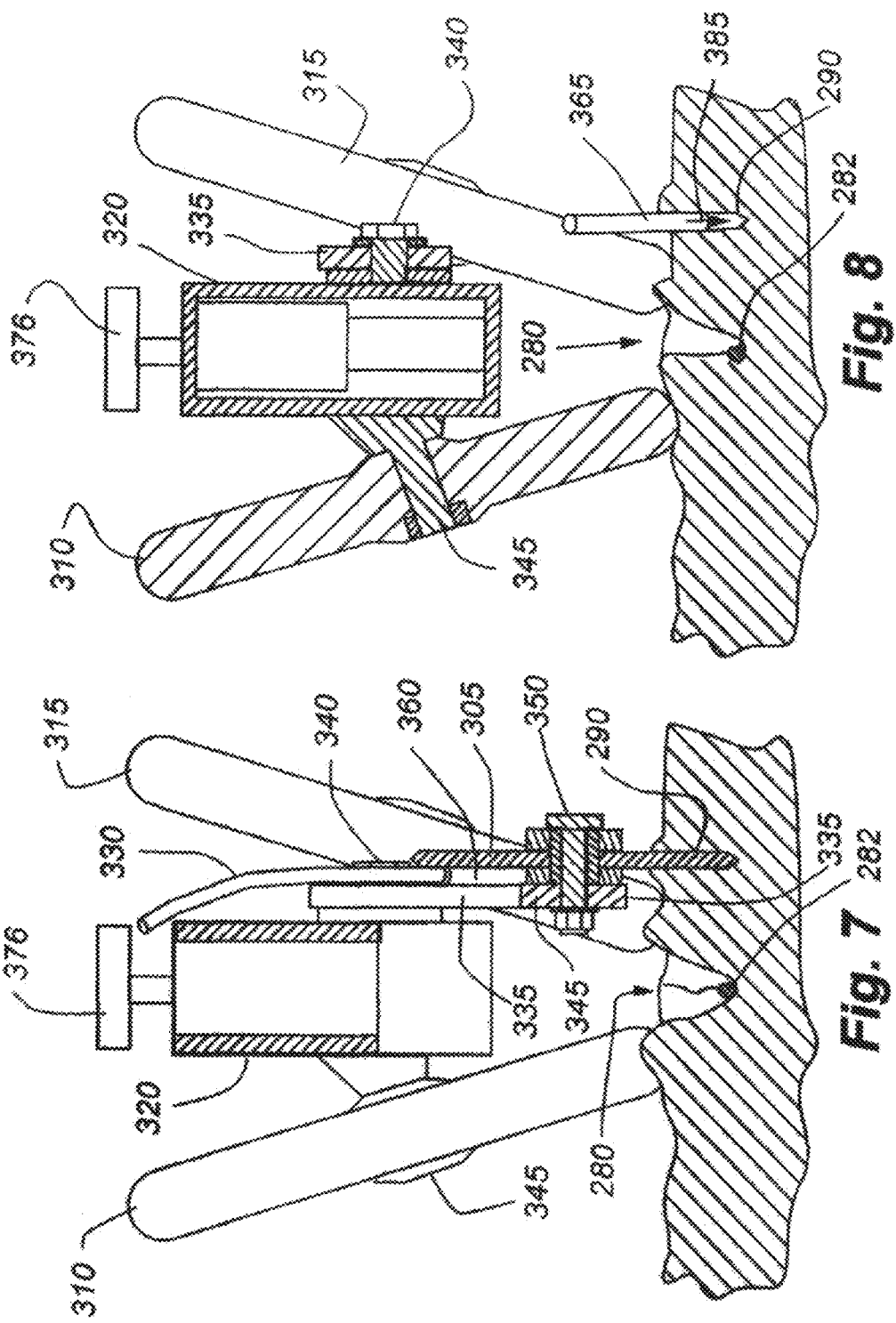

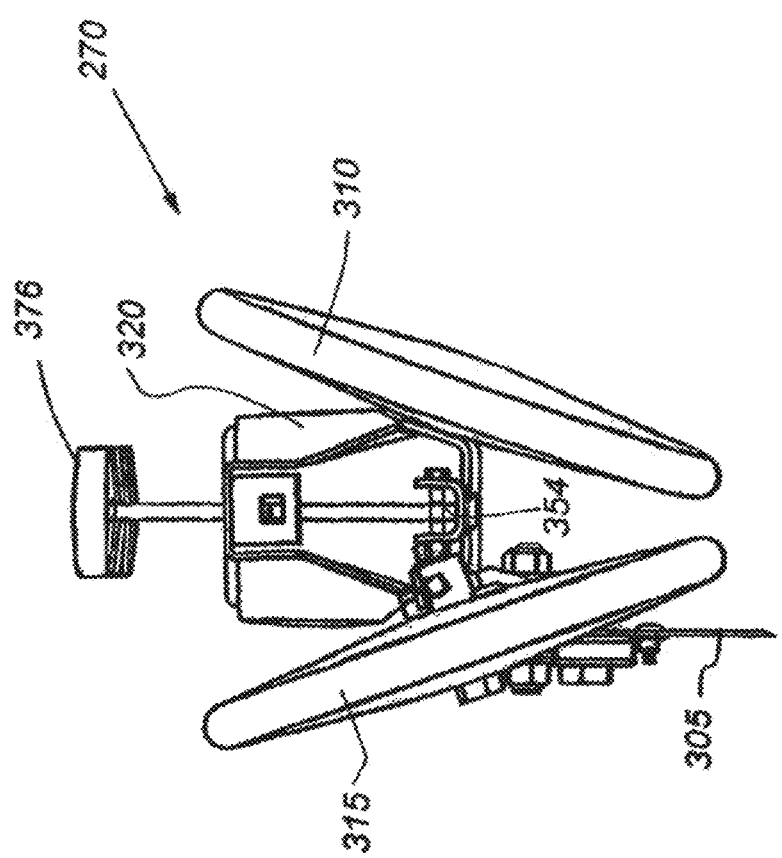

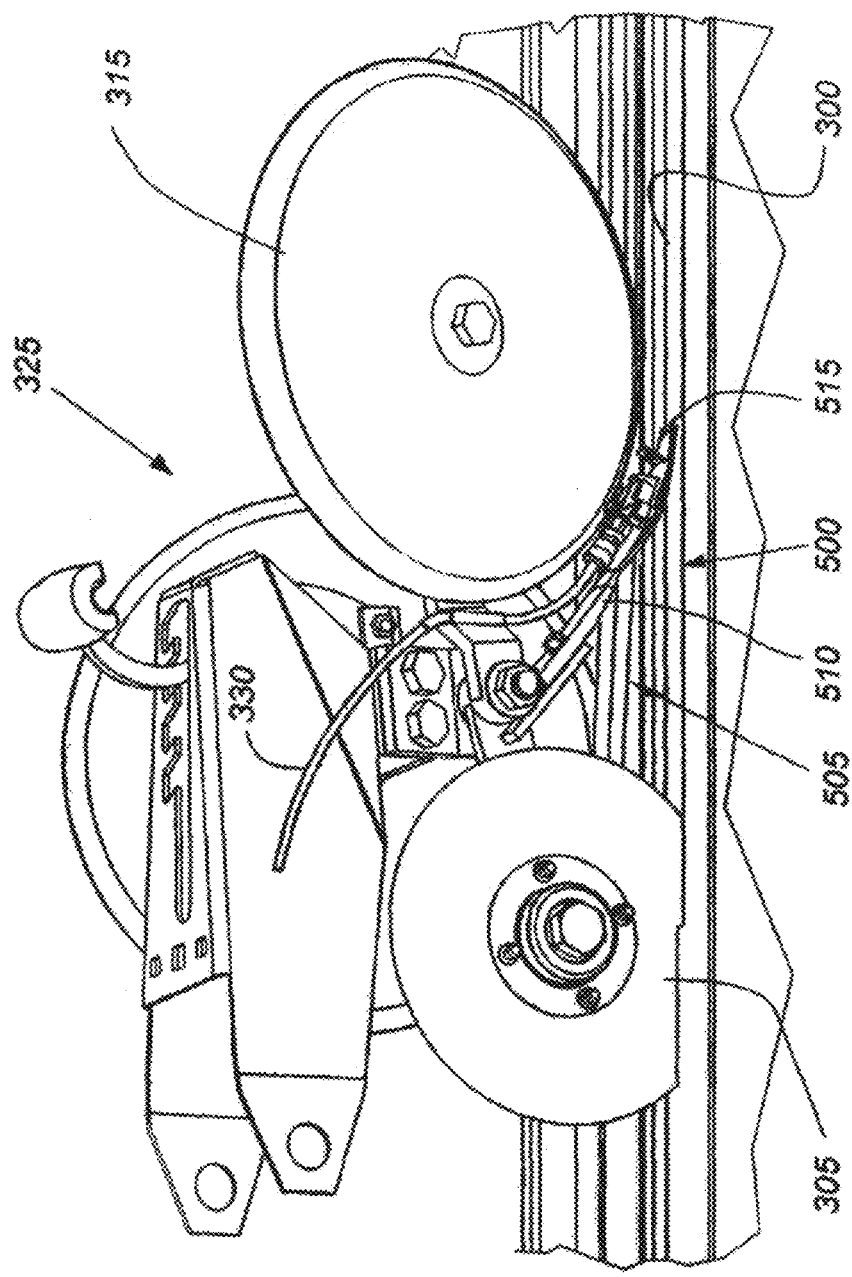

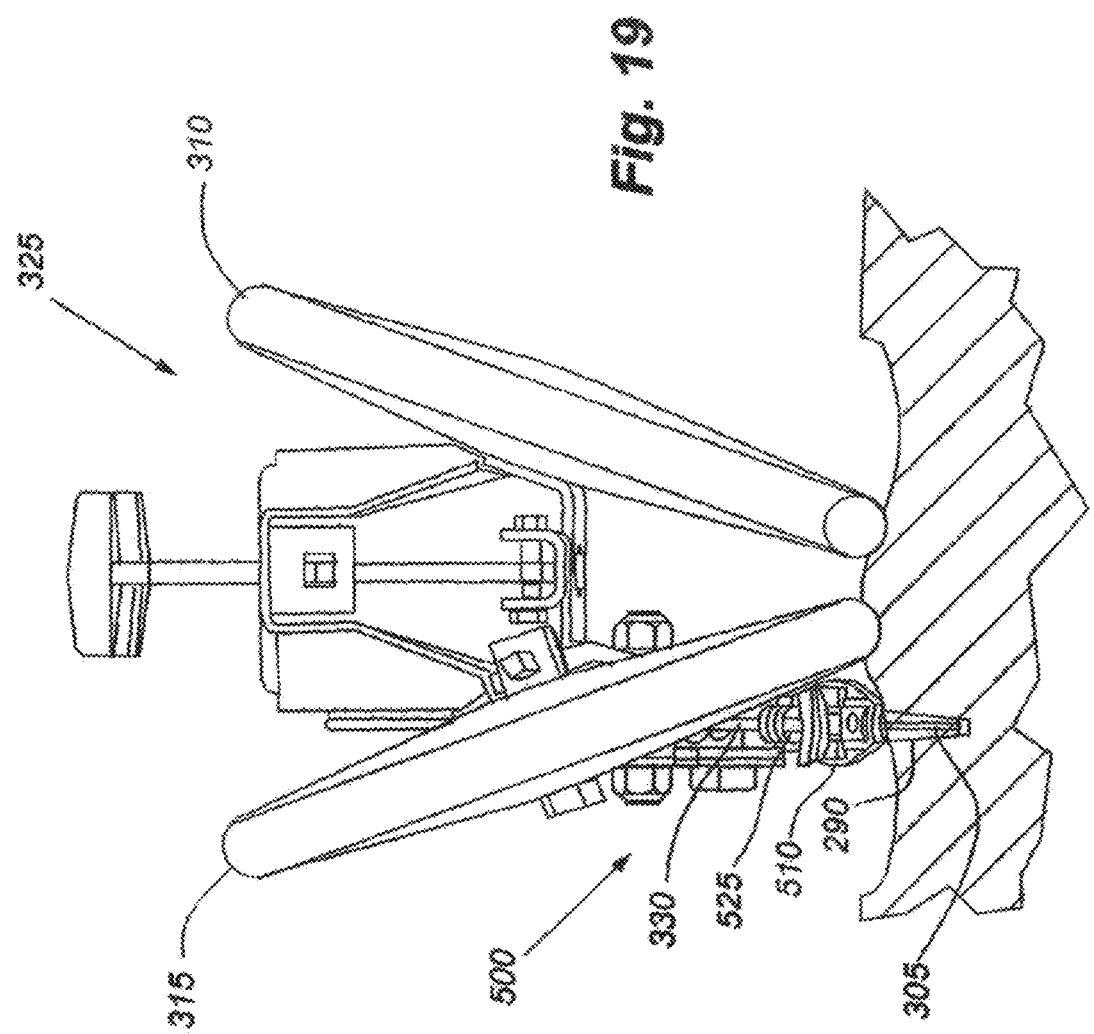

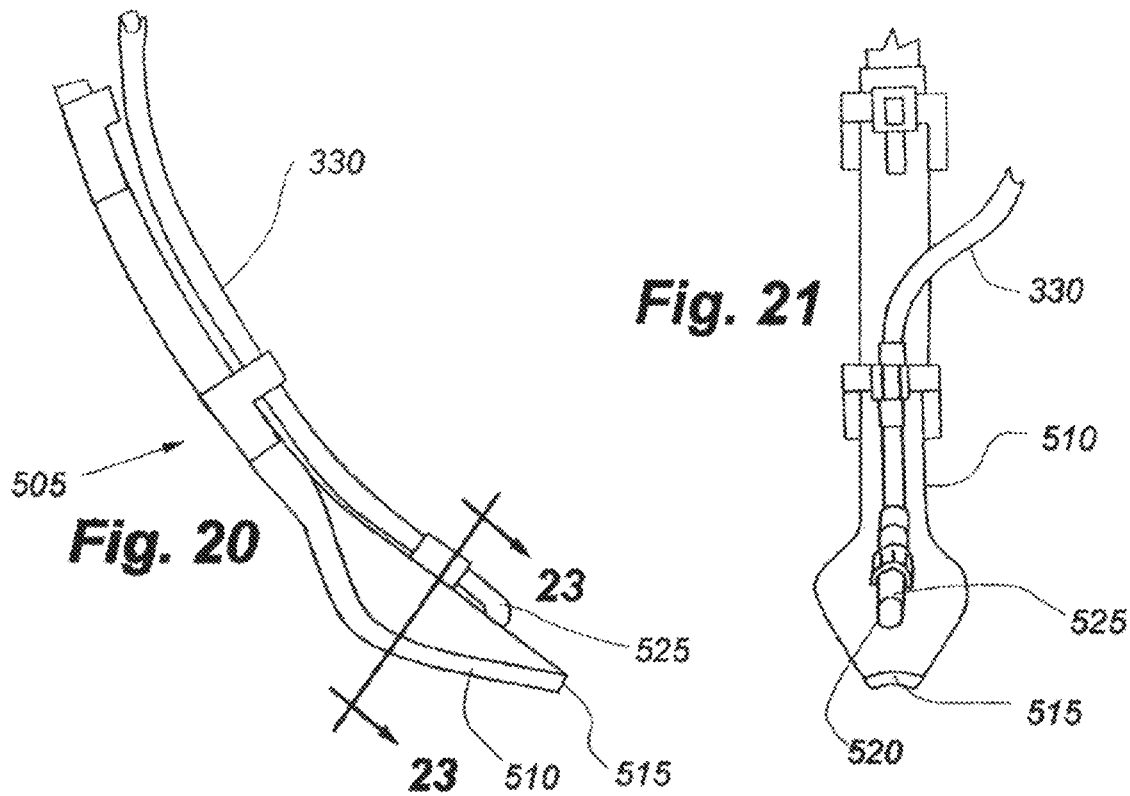
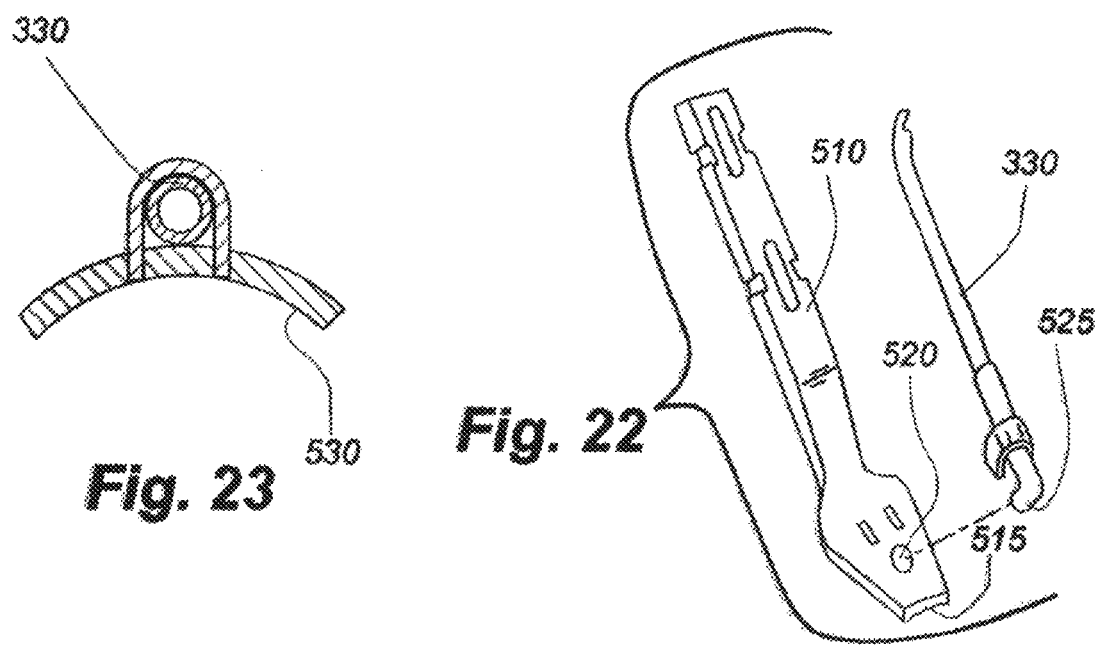

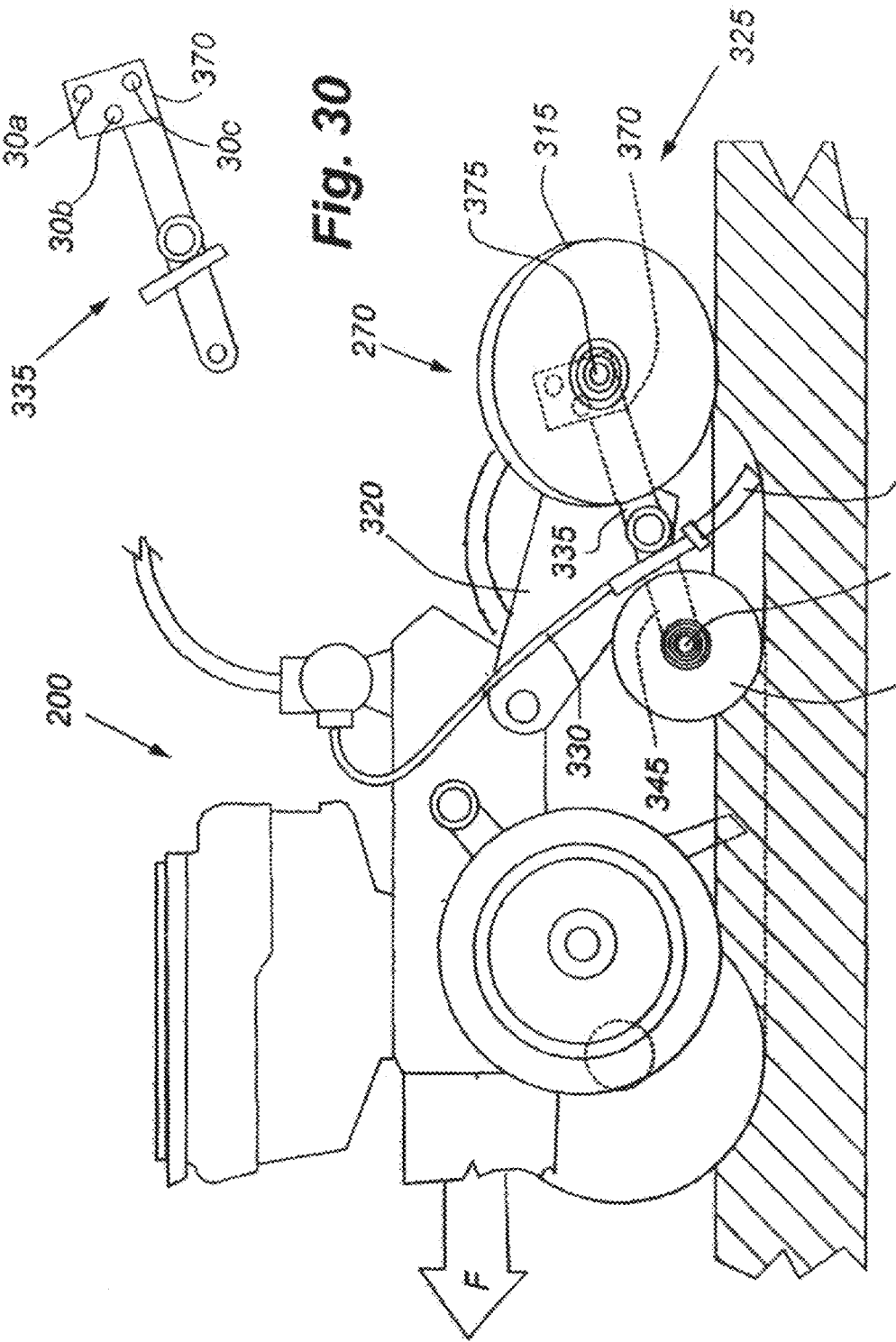

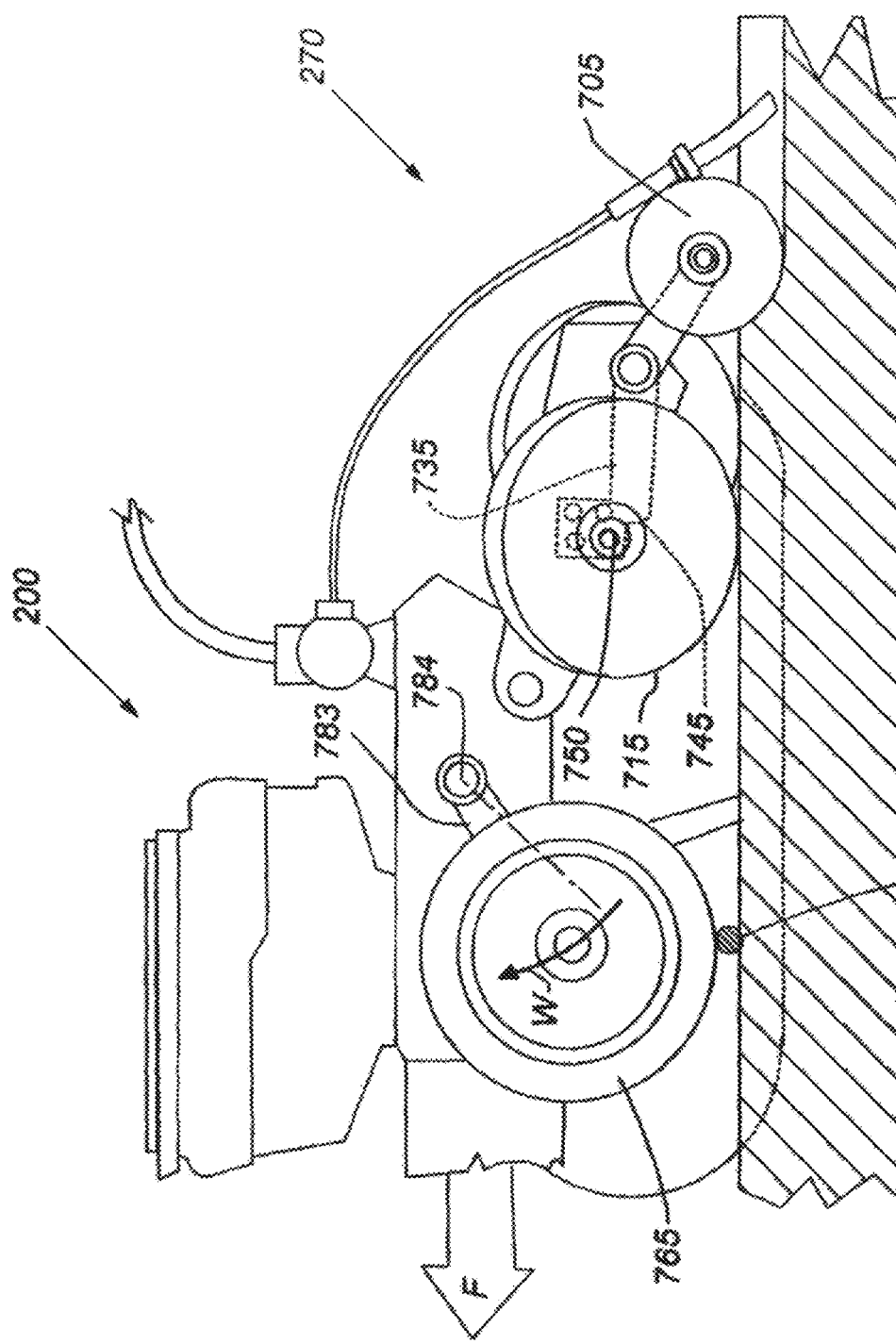

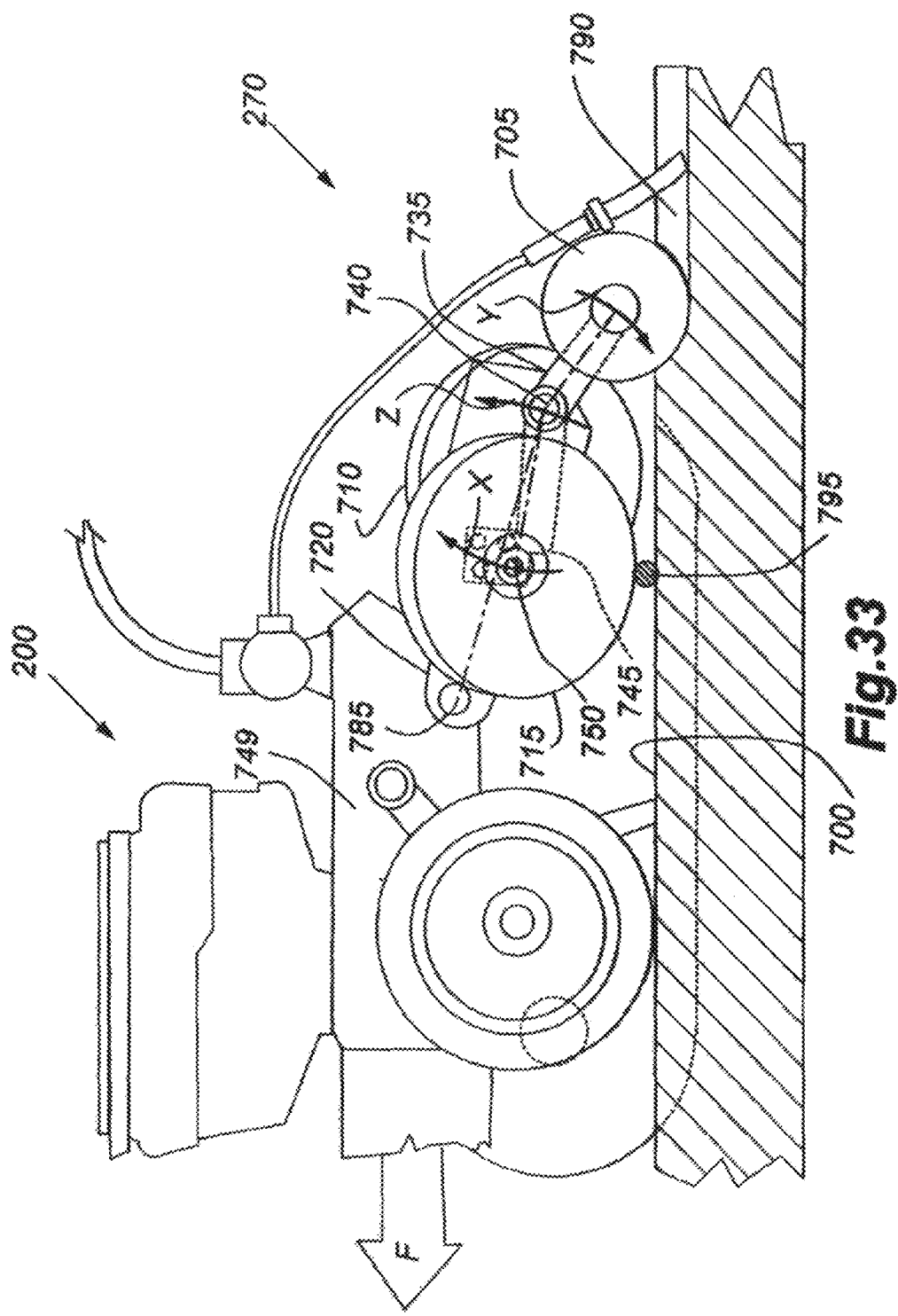

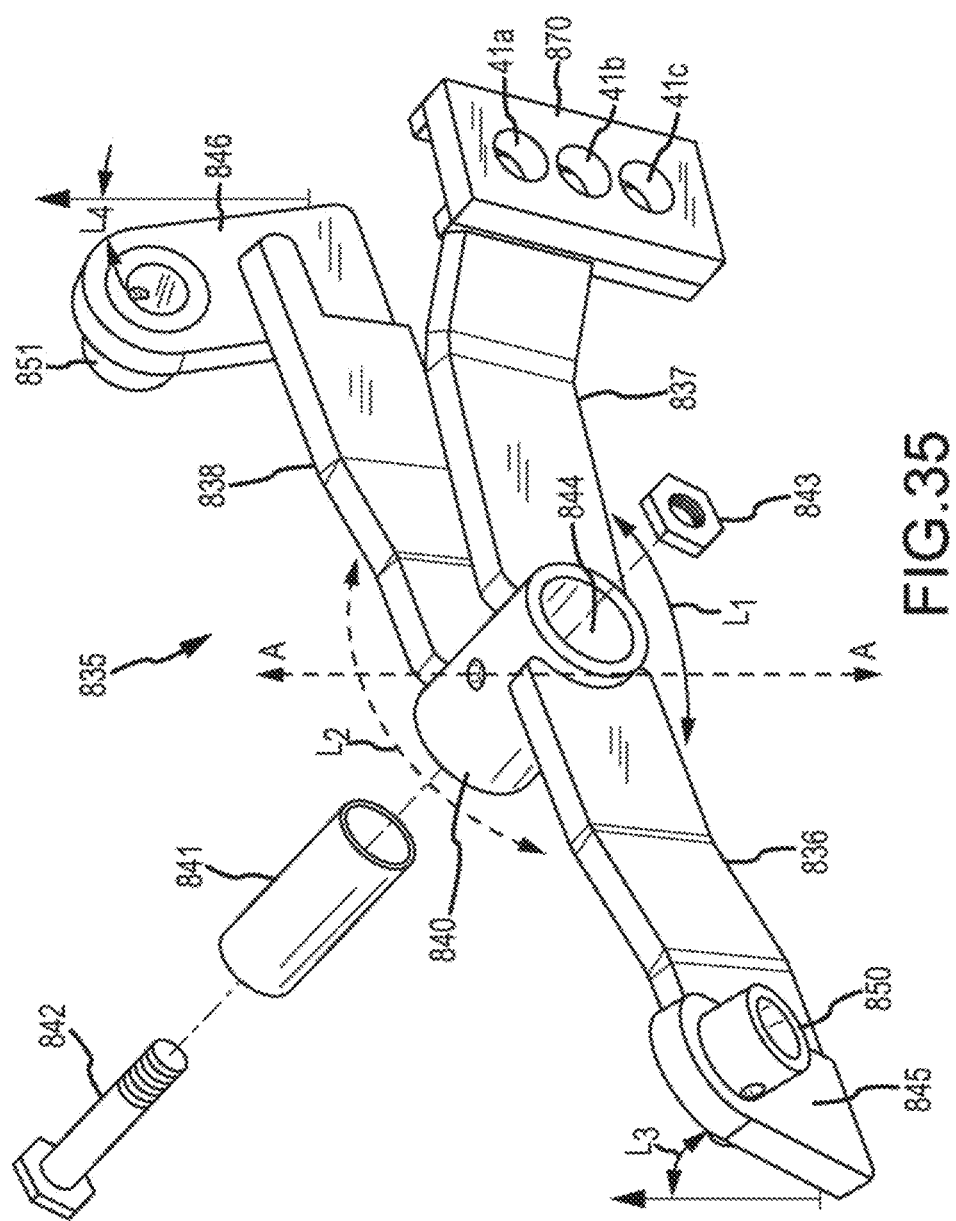

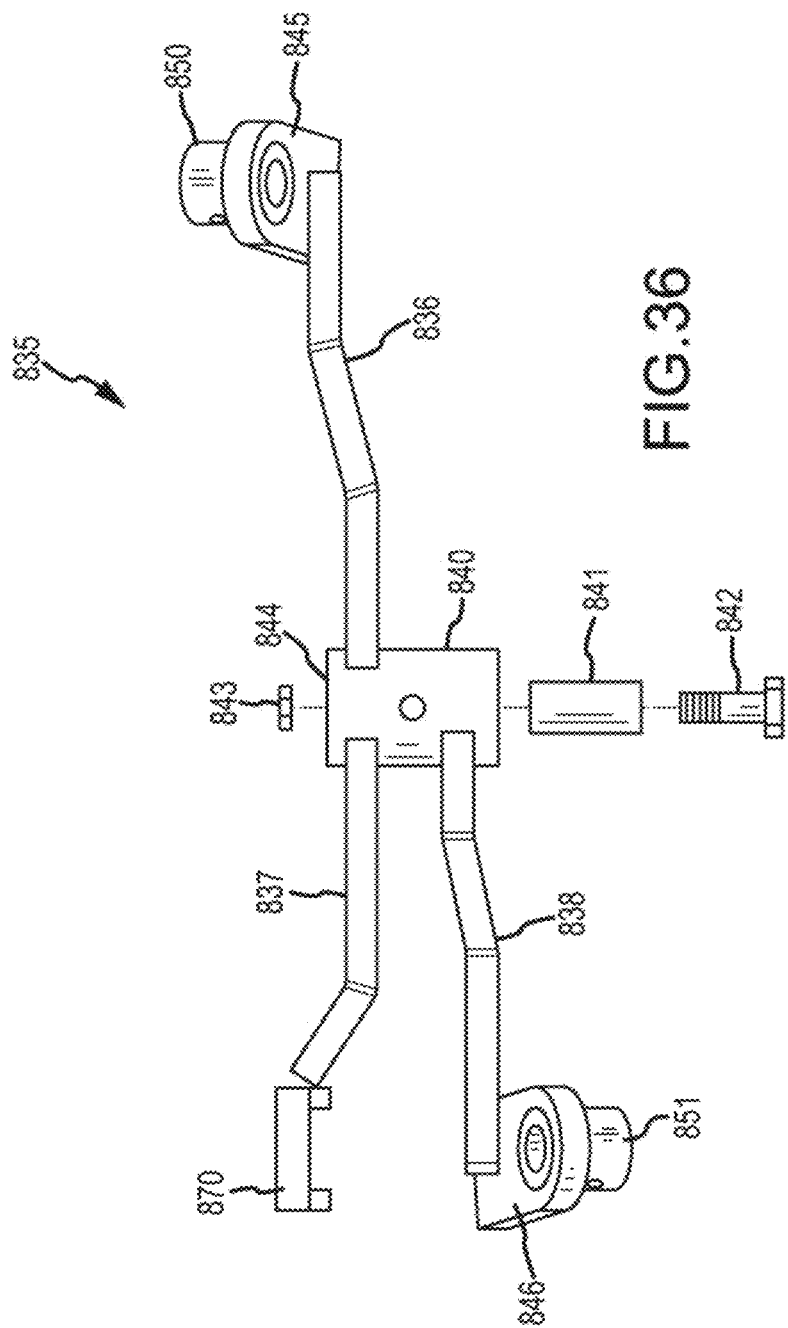

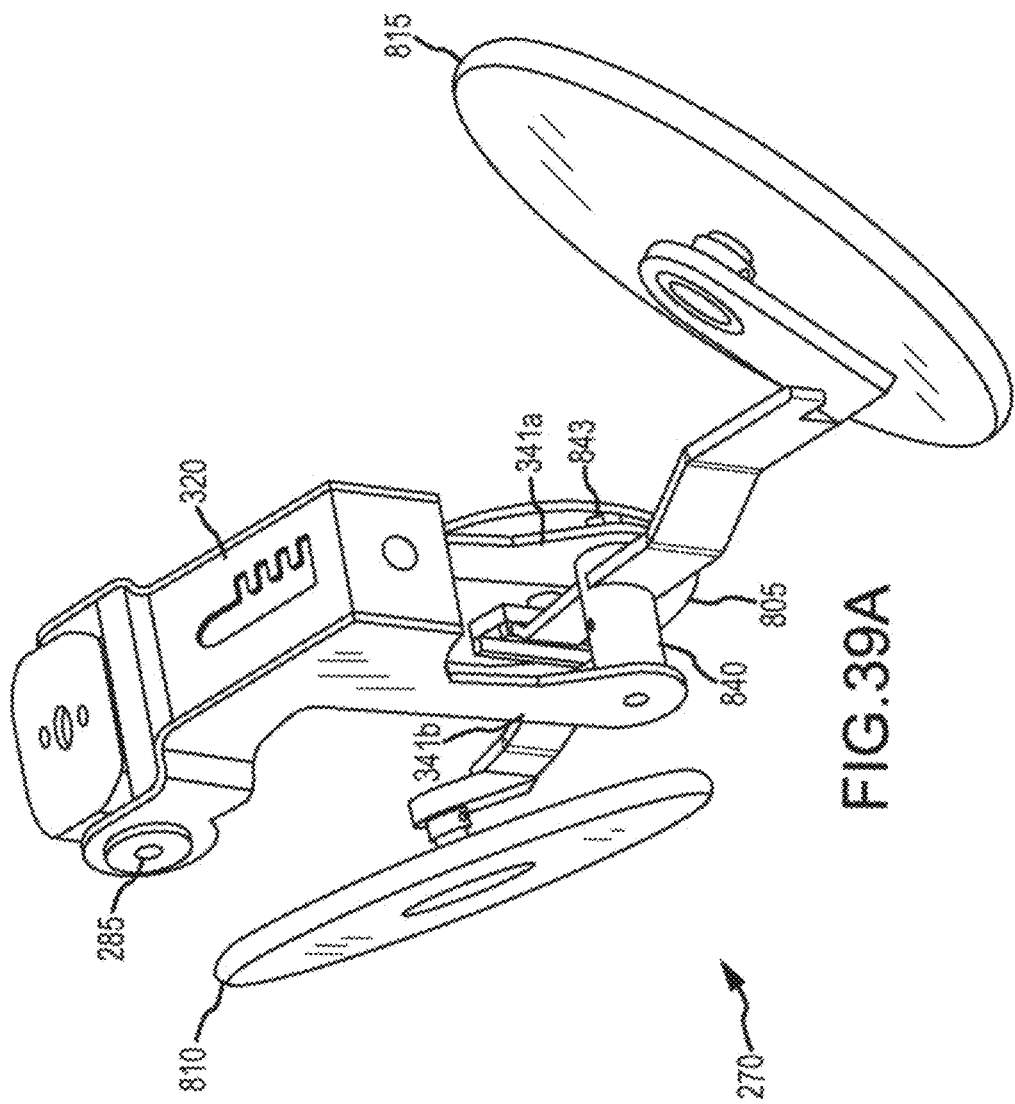

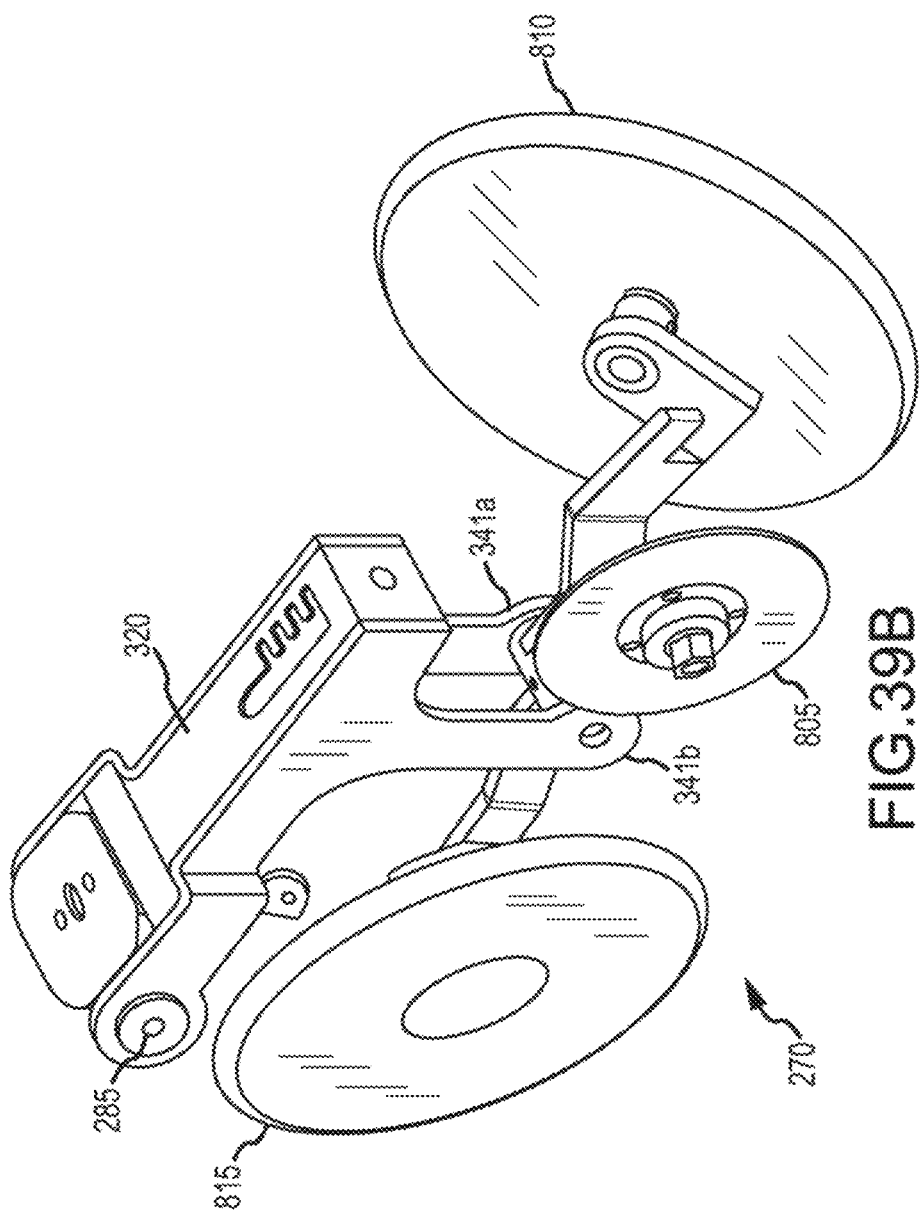

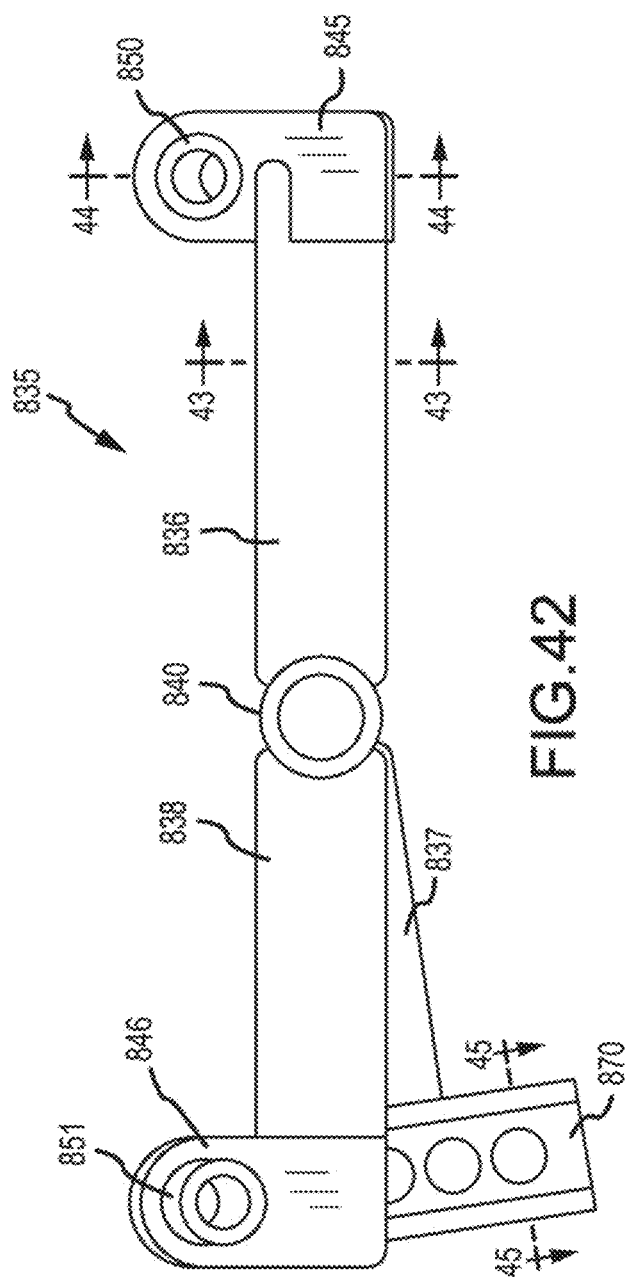
FIG. 42
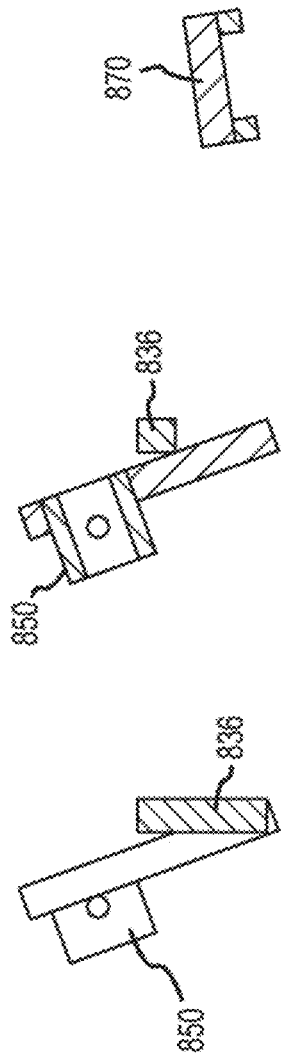
FIG. 44
FIG. 43
FIG. 45

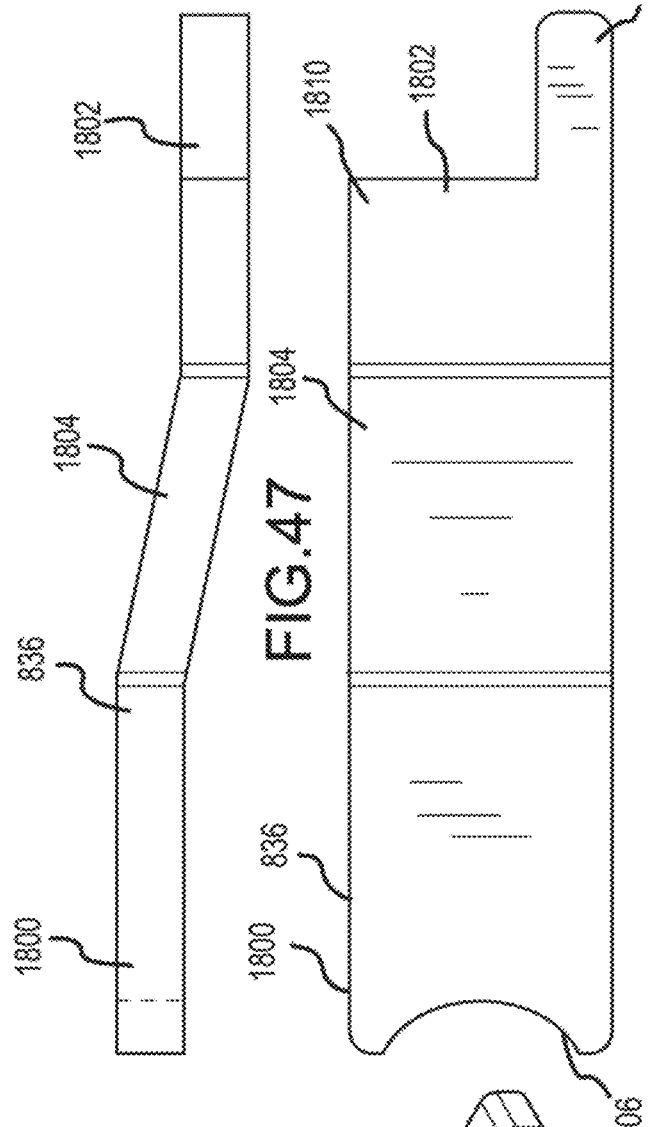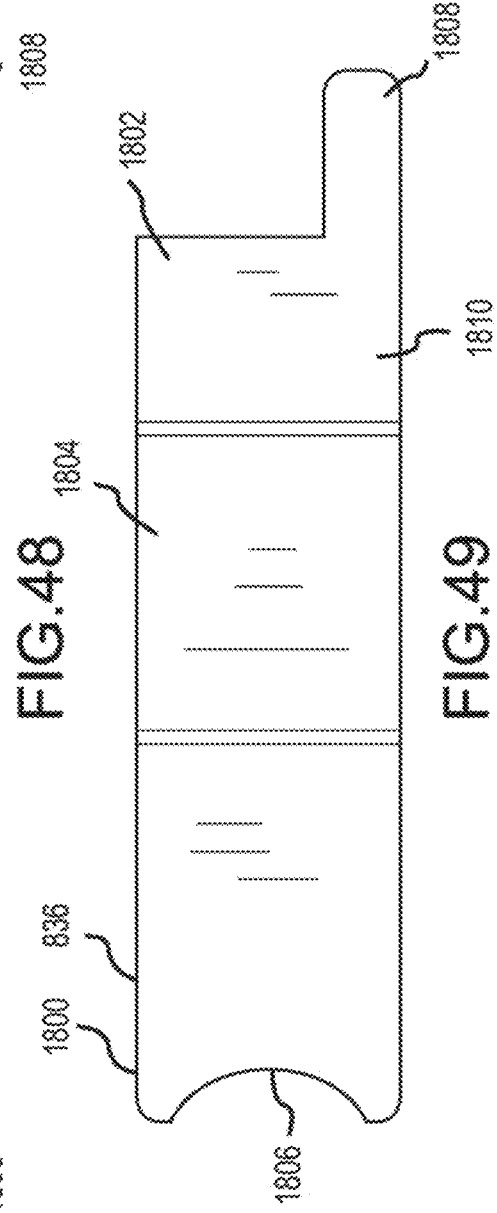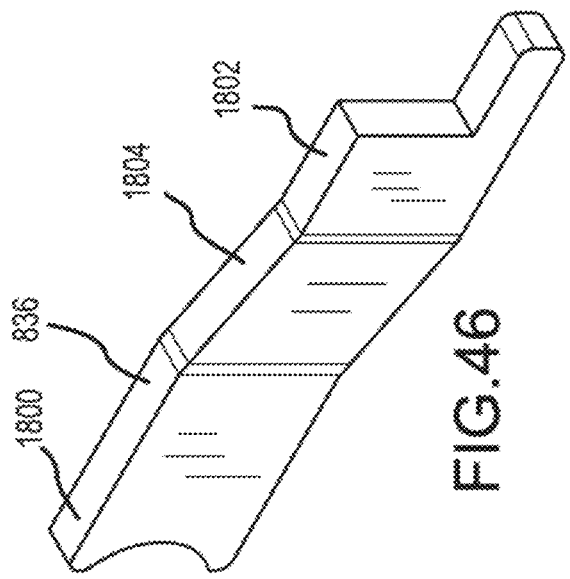

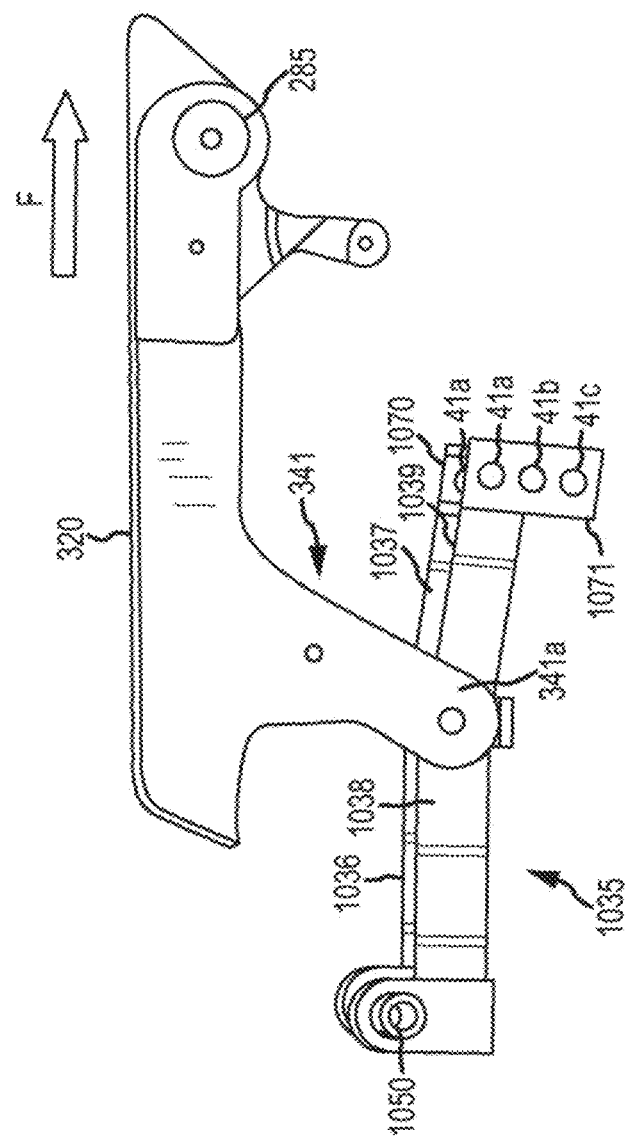

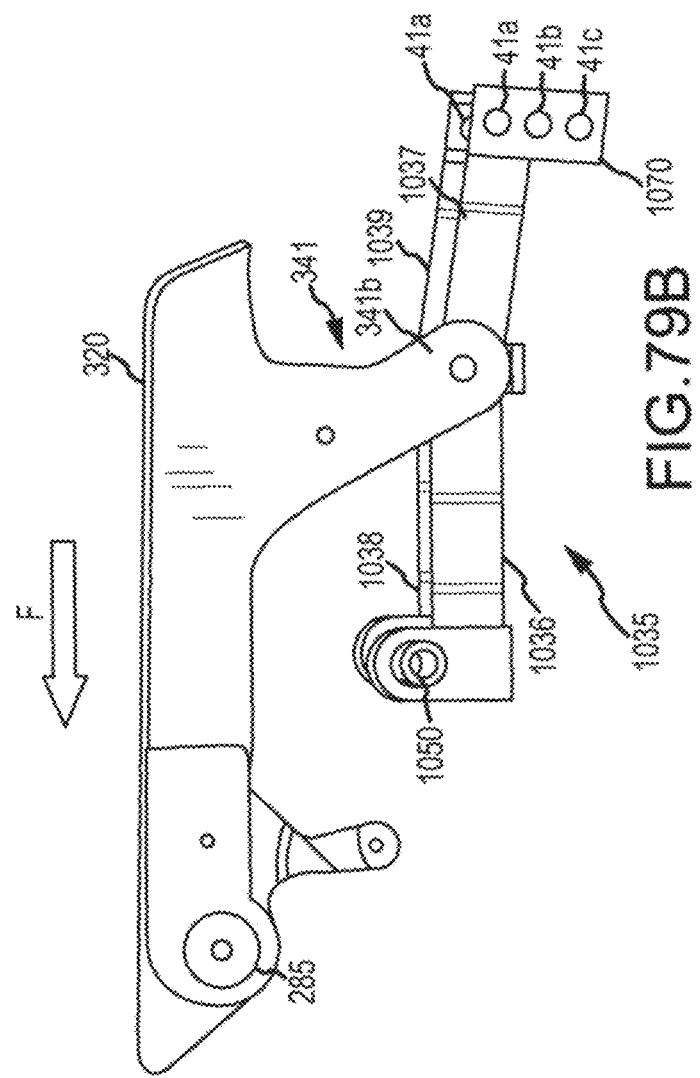

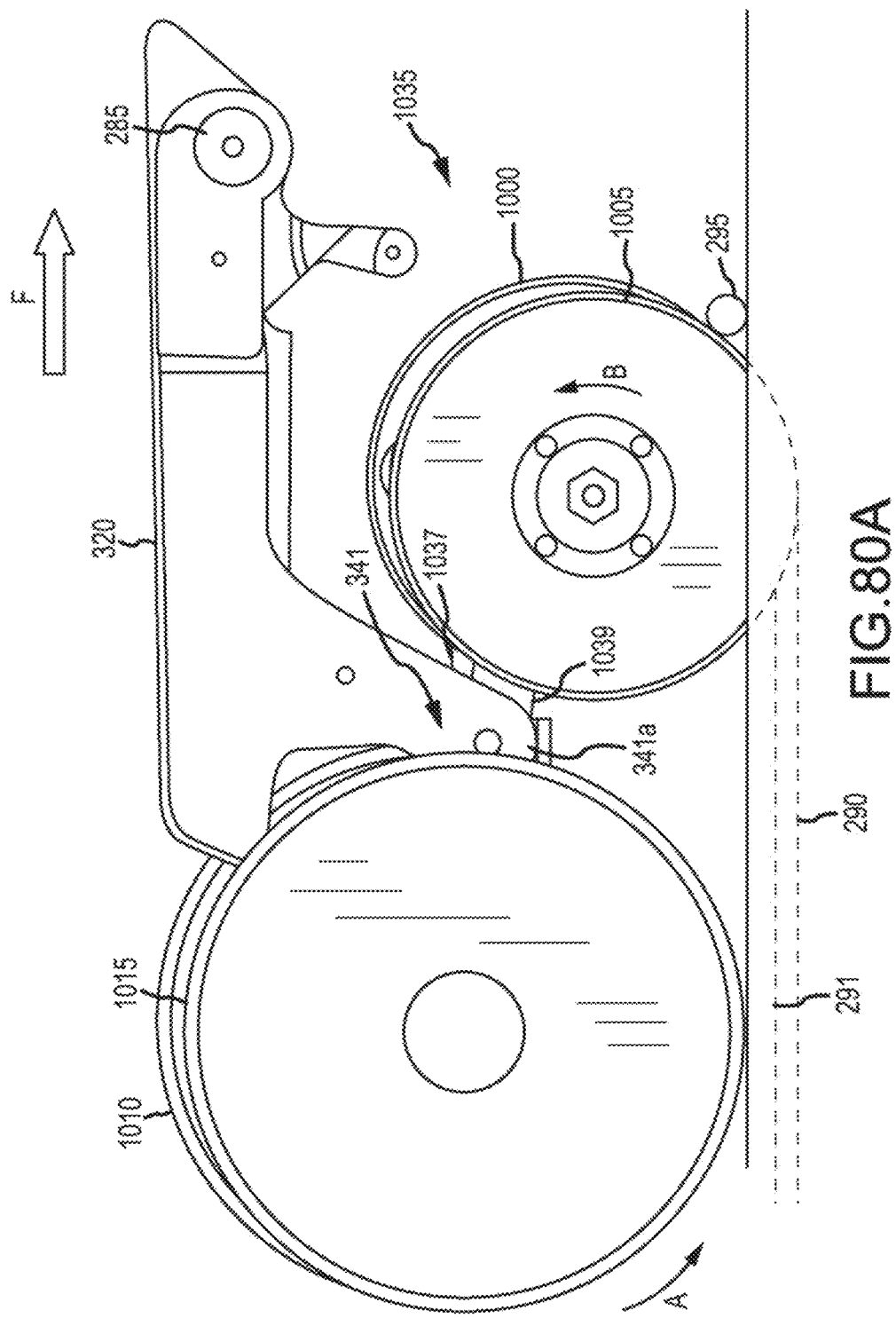

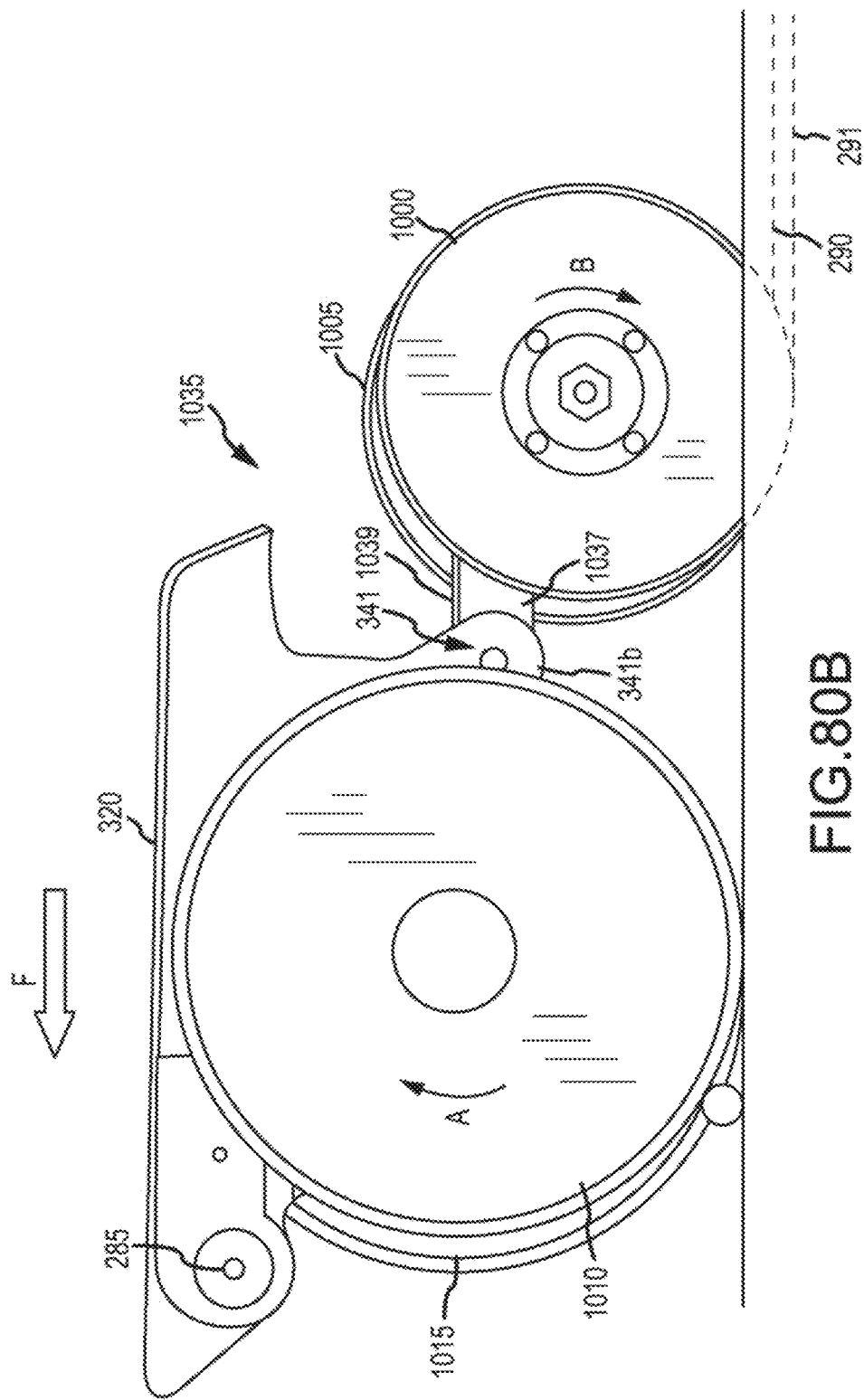

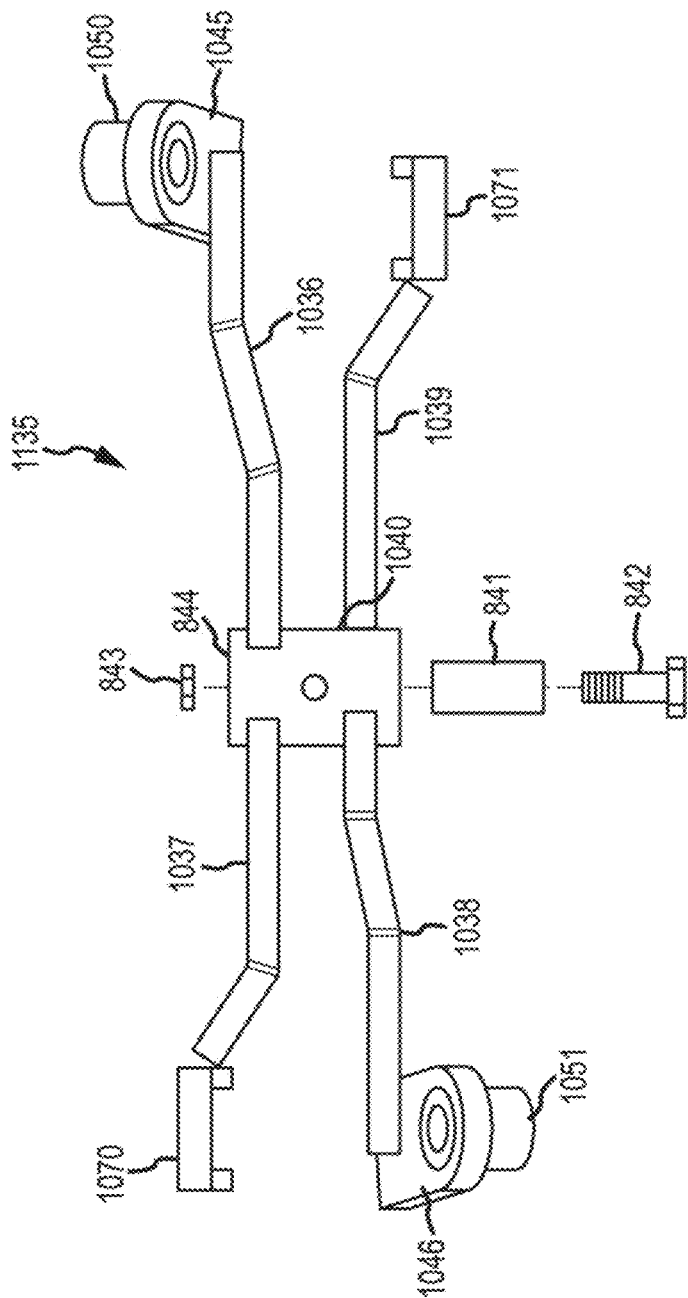

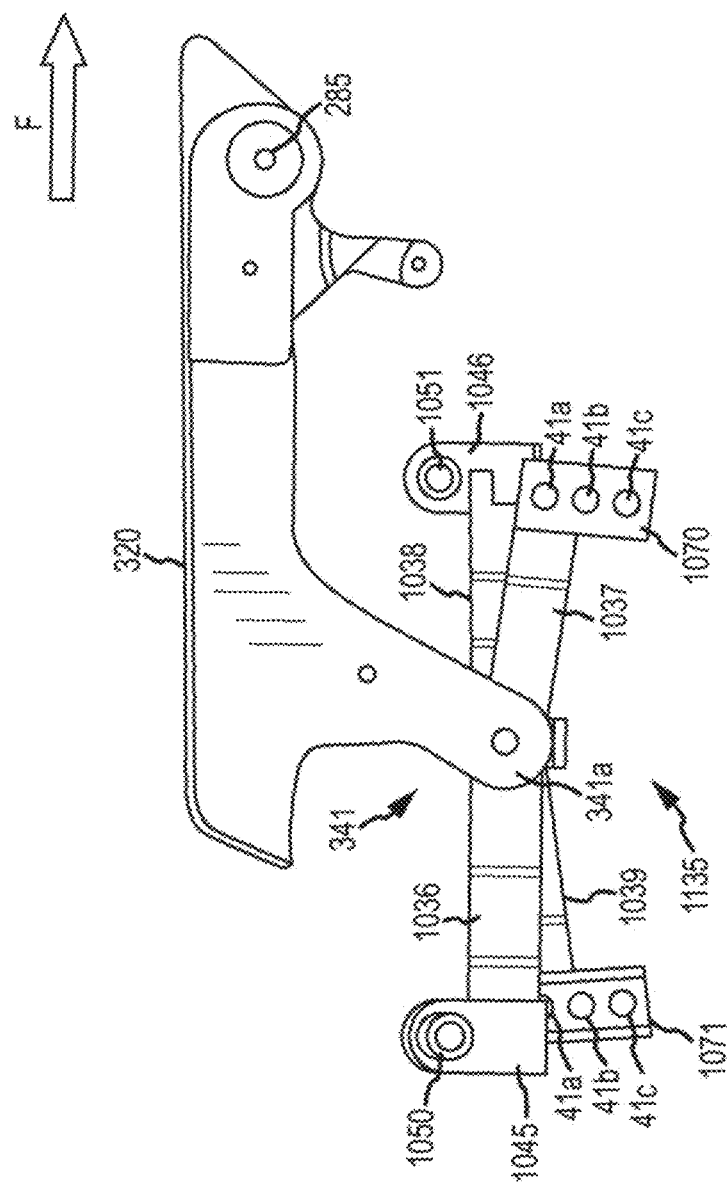

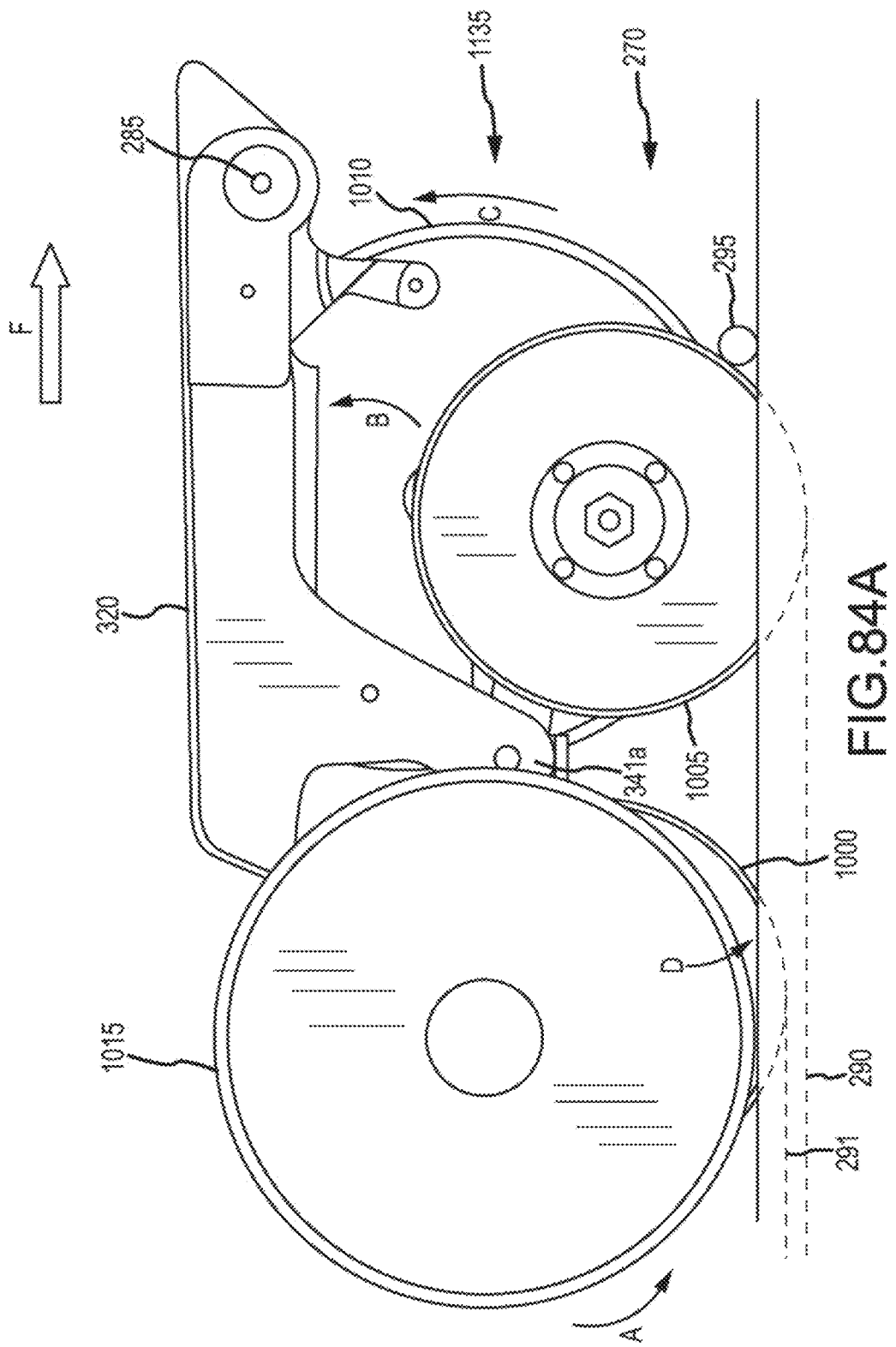

SEED PLANTER WITH EQUALIZER ASSEMBLY

CROSS-REFERENCE TO RELATED APPLICATIONS

This application is a continuation of U.S. patent application Ser. No. 16/113,701 filed 27 Aug. 2018 and issued as U.S. Pat. No. 10,830,274 on 10 Nov. 2020, which is a continuation of U.S. patent application Ser. No. 14/961,604 filed 7 Dec. 2015 and issued as U.S. Pat. No. 10,060,467 on 28 Aug. 2018, which is a continuation of U.S. patent application Ser. No. 13/428,922 filed 23 Mar. 2012 and issued as U.S. Pat. No. 9,204,590 on 8 Dec. 2015, which claims the benefit of priority to U.S. Provisional Patent Application No. 61/596,399 filed 8 Feb. 2012 and U.S. Provisional Patent Application No. 61/467,085 filed 24 Mar. 2011, and which is also a continuation-in-part of U.S. patent application Ser. No. 12/341,978 filed 22 Dec. 2008 and issued as U.S. Pat. No. 8,356,563 on 22 Jan. 2013, which claims the benefit of priority to U.S. Provisional Patent Application No. 61/118,217 filed 26 Nov. 2008 and U.S. Provisional Patent Application No. 61/016,386 filed on 21 Dec. 2007. The contents of each of the foregoing applications are hereby incorporated by reference in their entireties as if fully set forth herein.

TECHNICAL FIELD

The technical field relates to agricultural seed planters and drills. More specifically, the technical field relates to seed planters and drills that include apparatus adapted to properly place seeds in a seed furrow and further include liquid distribution apparatus for distributing liquids within the seed furrow.

BACKGROUND

Agricultural seed planting is typically accomplished by multi-row planters. Each planter may include multiple row units adapted for opening a seed furrow, depositing seeds within the furrow, and closing the seed furrow around the seeds. In some cases, each row unit of the planter may also open a fertilizer furrow adjacent to each seed furrow, deposit liquid fertilizer in each fertilizer furrow, and close each fertilizer furrow.

Some planters are equipped or retrofitted to be equipped with fertilizer depositing equipment (e.g., fertilizer furrow opener discs and fertilizer deposit tubes) located on a leading or front side of the planter. Planters so configured can have problems in fields with moist or wet soil. Specifically, disturbing the soil with the fertilizer equipment located in front of the planter gage wheels can cause the moist or wet soil to accumulate on the gage wheels. The soil accumulation increases the effective diameters of the gage wheels and causes the planter to run too shallow with respect to the depositing of the seed in the seed furrows.

Planters are increasing in size, resulting in planters with sides or wings that fold upwardly and/or upwardly and forwardly. Locating the fertilizer depositing equipment on the front or leading end of the planter can result in a planter that is still overly large after being folded or incapable of being folded without the removal of the fertilizer depositing equipment.

Planters are increasingly used in no-till situations, resulting in the planter traversing fields with substantial deviation in the field surface and a substantial amount of obstructions (e.g., debris, clods, stubble, old furrows, etc.). Furthermore, in certain Midwest farm areas, ditches must be plowed in fields between planting seasons to facilitate the drainage of spring showers from the fields. Most planters have proven ineffective in such rough field surface conditions. It is not unusual for the use of planters in rough field conditions to result in seed depths that radically range between too deep and too shallow. Also, it is not unusual for the use of planters in such field conditions to result in the planter components being damaged.

There is a need in the art for a planter capable of providing liquid fertilizer in rough fields without adverse impact on seed depth and damage to planter components. There is also a need in the art for a planter capable of providing liquid fertilizer and still able to be folded without requiring removal of the fertilizer providing equipment.

SUMMARY

In one embodiment of an agriculture planter, the planter may include a planter frame, a seed hopper and a trailing arm assembly. The planter frame may include a hitch tongue extending forwardly from the planter frame. The planter frame supports the seed hopper. The trailing arm assembly may be pivotally coupled to a rear portion of the planter frame, extend rearward from the planter frame, and include a trailing arm frame and a lever arm pivotally coupled to the trailing arm frame by a pivot point. The lever arm may include a leading end, a trailing end, and a middle portion. The disc may be rotatably mounted to the lever arm near the leading end. The first wheel may be rotatably mounted to the lever arm near the trailing end. The middle portion may be pivotally coupled to the pivot point.

In another embodiment of an agriculture planter, the planter may include a planter frame, a pivot point, and a walking axle assembly. The pivot point may be operably coupled to the planter frame. The walking axle assembly may include a lever arm, a furrow opening disc rotatably mounted on a leading end of the lever arm, and a first furrow closing wheel rotatably mounted on a trailing end of the lever arm. A middle portion of the lever arm may be pivotally coupled to the pivot point.

In yet another embodiment of an agriculture planter, the planter may include a frame, a trailing arm assembly, a rotatable furrow-opening disc, and a first rotatable furrow-closing wheel. The trailing arm assembly may be pivotally coupled to a trailing side of the planter frame. The rotatable furrow-opening disc may be operably coupled to the trailing arm assembly. The first rotatable furrow closing wheel may be operably coupled to the trailing arm assembly. Displacement of the first wheel relative to the trailing arm assembly causes displacement of the disc relative to the trailing arm assembly.

In another embodiment of an agriculture planter, the planter may include a frame, a pivot point, and a walking axle assembly. The pivot point may be operably coupled to the planter frame. The walking axle assembly may include a lever arm. The lever arm may include a leading end, a trailing end, and a middle portion. Further, the lever arm may include two or more mounting positions, and the middle portion of the lever arm may be pivotally coupled to the pivot point.

In still yet another embodiment of an agriculture planter, the planter may include a frame, a pivot point, and a walking axle assembly. The pivot point may be operably coupled to the planter frame. The walking axle assembly may include a lever arm. The lever arm may include at least a leading end, a trailing end, and a middle portion. Further, the walking axle assembly may include a furrow opening disc rotatably mounted on a trailing end of the lever arm, and a first furrow closing wheel rotatably mounted on a leading end of the lever arm. A middle portion of the lever arm may be pivotally coupled to the pivot point. In another embodiment, the furrow closing wheel may be rotatably mounted on a leading end of the lever arm. The leading end of the lever arm may include a bracket with a plurality of mounting positions thereon. In yet another embodiment, the furrow closing wheel may be rotatably mounted on a trailing end of the lever arm. The trailing end of the lever arm may include a mounting bracket with two or more mounting positions thereon.

In an embodiment of a bracket arm assembly for use with an agriculture planter that include a trailing arm frame defining a pivot point thereon, the bracket arm assembly may include a bracket. The bracket may include first, second, and third arms that each extend from a middle portion of the bracket. The bracket arm assembly may also include a furrow opening disc rotatably mounted on a mounting end of the first arm, a first furrow closing wheel rotatably mounted on a mounting end of the second arm, and a second furrow closing wheel rotatably mounted on a mounting end of the third arm. The middle portion of the bracket may be configured to be pivotally coupled to the trailing arm frame at the pivot point.

In an embodiment of an arm bracket assembly for use with an agriculture planter that includes a trailing arm frame, the arm bracket assembly may include a bracket. The bracket may be configured to be pivotally coupleable to the trailing arm frame. A fertilizer furrow opener disc and first and second furrow closer wheels may be rotatably joined to the bracket. When the bracket is joined to the trailing arm frame, pivoted displacement of the first furrow wheel in a first direction may cause a pivoted displacement of the second furrow wheel and the fertilizer furrow opener disc in a second direction opposite the first direction.

An embodiment of a bracket for use with an agriculture planter including a trailing arm frame defining a pivot point thereon may include first, second, third and fourth arms. Each of the arms may be joined to a middle portion of the bracket. Two of the arms may include a mounting end configured to rotatably and selectively receive a fertilizer furrow opener disc. The other two arms may include a mounting end configured to rotatably receive a furrow closer wheel. The two arms for receiving the fertilizer furrow opener disc may enable two fertilizer furrows to be opened on opposing sides of a seed furrow.

Another embodiment of an arm bracket assembly for use with an agricultural planter including a trailing arm frame may include an arm bracket. The arm bracket may be configured to be coupleable to the trailing arm frame. First and second fertilizer furrow opener discs and first and second furrow closer wheels may be rotatably joined to the arm bracket. The arm bracket may be configured so that when the arm bracket is joined to the trailing arm frame, a pivoted displacement of the one of the fertilizer furrow opener discs and furrow closer wheels in a first direction causes a pivoted displacement of the other fertilizer furrow opener disc and furrow closer wheel in a second direction opposite the first direction.

An embodiment of an agricultural planter may include an arm bracket. The arm bracket may include first, second, third and fourth arms. Each arm may be joined to middle portion of the arm bracket. Two of the arms may be configured to join first and second fertilizer furrow opener discs to the arm bracket and extend from the middle portion so that the fertilizer furrow opener discs form fertilizer furrows on two sides of a seed furrow. The other two arms may be configured to join first and second furrow closer wheels to the arm bracket and extend from the middle portion so that a pivoted displacement of one of the fertilizer furrow opener discs and the furrow closer wheels in a first direction causes a pivoted displacement of the other fertilizer furrow opener disc and furrow closer wheel in a second direction opposite the first direction.

While multiple embodiments of planters with equalizer assemblies are described herein, still other embodiments will become apparent to those skilled in the art from the following detailed description. As will be realized, planters with equalizer assemblies are capable of modifications in various aspects. Accordingly, the drawings and detailed description are to be regarded as illustrative in nature and not restrictive.

BRIEF DESCRIPTION OF THE DRAWINGS

FIG. 1 is a side view of an agriculture tractor pulling an agriculture planter towing a liquid fertilizer tank trailer.

FIG. 2 is a top-rear isometric view of the planter.

FIGS. 3-6 are the same side views of the planter, each illustrating a different state of the gage wheel and components of the trailing arm assembly as the planter passes over an obstruction in the field surface.

FIG. 7 is a cross section of a furrow opener of the trailing arm assembly as taken along section line 7-7 in FIG. 3.

FIG. 8 is a cross section of a leading furrow closer of the trailing arm assembly as taken along section line 8-8 in FIG. 3.

FIG. 17 is a rear view of the trailing arm assembly of FIG. 12.

FIG. 18 is an isometric view of the trailing arm assembly of FIG. 12, except employing a rebounder fertilizer assembly.

FIG. 19 is a rear view of the trailing arm assembly of FIG. 18.

FIG. 20 is a side view of the flexible concave member of the rebounder fertilizer assembly of FIGS. 18 and 19.

FIG. 21 is a view of the member of FIG. 20 as viewed from the same direction as FIG. 19.

FIG. 22 is an exploded isometric view of the member of FIG. 20 and the fertilizer tube.

FIG. 23 is a cross section through the concave member as taken along section line 23-23 in FIG. 20.

FIGS. 24-26 are the same side views of the planter, each illustrating a different mounting position of the furrow closer wheel with respect to the lever arm.

FIG. 30 is a side view of one embodiment of the lever arm.

FIG. 31 is a side view of another embodiment of the lever arm.

FIGS. 32-34 are the same side views of the planter, each illustrating a different state of the gage wheel and components of the trailing arm assembly as the planter passes over an obstruction in the field surface.

FIG. 35 is a top isometric view of one embodiment of a pivotable arm bracket.

FIG. 36 is a top view of the pivotable arm bracket of FIG. 35.

FIGS. 39A and 39B are top rear isometric views of a trailing arm assembly, FIG. 39A showing the pivotable arm bracket connected to the trailing arm frame such that the fertilizer furrow opener disc is in a leading position and FIG. 39B showing the connection for a trailing position.

FIG. 42 shows a side elevation view of the arm bracket of FIG. 35.

FIG. 43 shows a cross-section view of the arm bracket of FIG. 42, viewed along line 43-43 in FIG. 42.

FIG. 44 shows a cross-section view of the arm bracket of FIG. 42, viewed along line 44-44 in FIG. 42.

FIG. 45 shows a cross-section view of the arm bracket of FIG. 42, viewed along line 45-45 in FIG. 42.

FIG. 46 shows an isometric view of a furrow closer wheel arm for the arm bracket of FIG. 42.

FIG. 47 shows a top plan view of the furrow closer wheel arm of FIG. 46.

FIG. 48 shows a side elevation view of the furrow closer wheel arm of FIG. 46.

FIG. 49 shows another side elevation view of the furrow closer wheel arm of FIG. 46.

FIGS. 79A and 79B are right and left side views of the pivotable arm bracket of FIG. 77 connected to the trailing arm frame, FIG. 79A showing the pivotable arm bracket connected such that the fertilizer furrow opener discs arms are in a leading position and FIG. 79B showing the connection for a trailing position.

FIGS. 80A and 80B are right and left side views of the pivotable arm bracket of FIG. 77 connected to the trailing arm frame, FIG. 80A showing the pivotable arm bracket connected to the trailing arm frame such that the fertilizer furrow opener discs are in a leading position and FIG. 80B showing the connection for a trailing position.

FIG. 82 is a top view of another pivotable arm bracket including four arms.

FIG. 83 is a left side view of the pivotable arm bracket of FIG. 82 connected to the trailing arm frame in which one fertilizer furrow opener disc arm is in a leading position and a second fertilizer furrow opener disc arm is in a trailing position.

FIGS. 84A and 84B are left and right side views the pivotable arm bracket of FIG. 82 connected to the trailing arm frame in which one fertilizer furrow opener disc is in a leading position and a second fertilizer furrow opener disc is in a trailing position.

DETAILED DESCRIPTION

Figure 9:
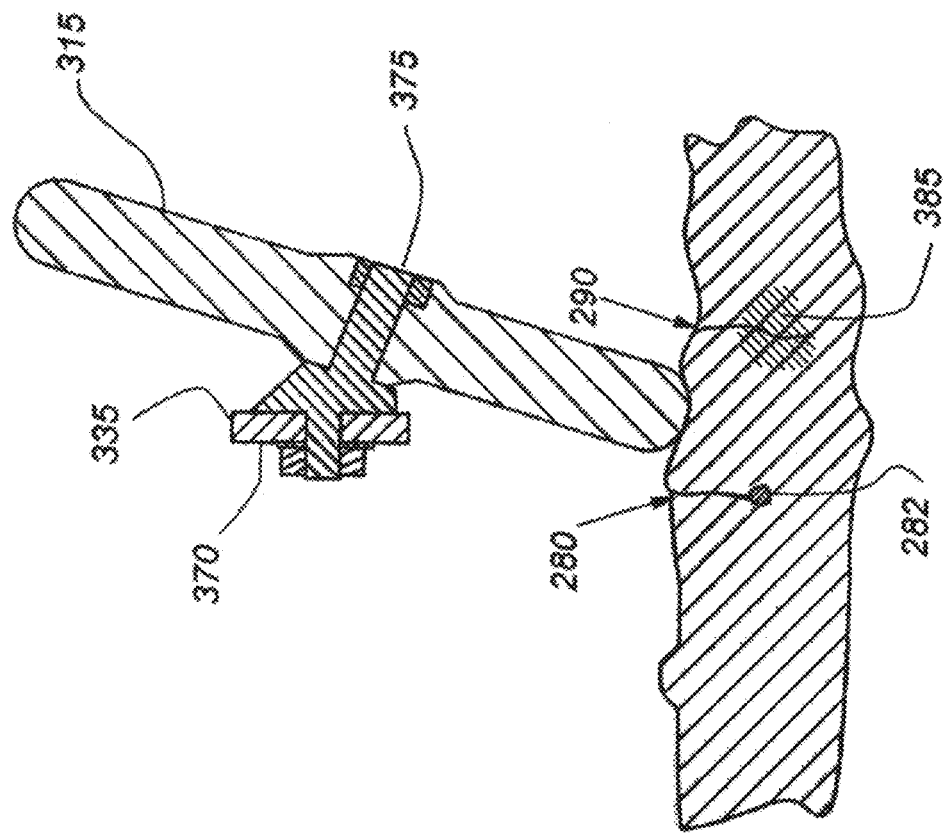
FIG. 9 is a cross section of a trailing furrow closer of the trailing arm assembly as taken along section line 9-9 in FIG. 3.

Disclosed herein, in at least one embodiment, is an agriculture planter 200 having a series of trailing arm assemblies 270 each equipped with a fertilizer furrow opener disc 305 and a trailing furrow closer wheel 315 mounted on a lever arm 335 to form a "walking axle" configuration or assembly 325. This configuration along with the location of the trailing arm assemblies 270 provides a number of advantages.

First, the walking axle assembly 325 allows the fertilizer furrow opener disc 305 and trailing furrow closer wheel 315 to follow the contours of the field, oscillating as the disc 305 and wheel 315 negotiate over or through an obstruction 295 in a field surface 300 without adversely impacting seed deposit depth or resulting in damage to the planter components. The ability of the disc 305 and wheel 315 to follow the contours of the field surface 300 facilitates: the disc 305 being in contact with the field surface 300 to open a fertilizer furrow 290; and the trailing furrow closer wheel 315 being in contact with the field surface 300 to close the seed and fertilizer furrows 280, 290.

Second, the ability of the walking axle assembly 325 to oscillate over variances in the field surface 300 allows the down pressure of the disc 305 and wheel 315 to balance between each other such that one or the other does not take all or substantially all of the downward pressure. In other words, the walking axle assembly 325 helps the disc 305 and wheel 315 to have relatively constant downward pressure, which avoids situations where one or the other takes a substantial portion of the downward pressure and causes the planter seed depth to become too shallow or too deep.

Third, the location of the walking axle assemblies 325 on the rear or trailing end of the planter 200 allows the planter 200 fold up without interference from the walking axle assemblies 325. Also, being located at the rear or trailing end of the planter 200 eliminates the issues with soil buildup on the gage wheels 265 caused by fertilizer equipment being located on the front or leading end of the planter 200.

For a detailed discussion of the planter 200 and its features, reference is made to FIGS. 1 and 2. FIG. 1 is a side view of an agriculture tractor 205 pulling the agriculture planter 200 towing a liquid fertilizer tank trailer 210. FIG. 2 is a top-rear isometric view of the planter 200.

As shown in FIG. 1, the planter 200 may include a tongue or hitch 215 for hitching the planter 200 to the hitch 220 of the tractor 205. The tractor 205 tows the planter 200 in the direction of arrow F and provides power to the planter 200 (e.g., via a power take off ("PTO")) for powering the operations of the planter 200.

As indicated in FIG. 1, the fertilizer trailer 210 may include a hitch 225 for coupling the trailer 210 to the rear of the planter 200, thereby allowing the trailer 210 to be towed behind the planter 200. The trailer 210 may include a tank 230 for holding liquid fertilizer and a pump 235 for pumping the fertilizer through a hose 240 extending between the tank 230 and the planter 200.

As illustrated in FIG. 2, the planter 200 may include a frame 245 from which the hitch 215 extends and the various planter components are supported. The various components of the planter 200 may include row units 250 and a liquid fertilizer distribution tube 255. The distribution tube 255 distributes the liquid fertilizer to the various row units 250.

Each row unit may include a furrow opener disc 260, a gage wheel 265, a trailing arm assembly 270, and a seed hopper 275. The seed furrow opener disc 260 creates a furrow 280 in which the planter 200 deposits seed 282 in a manner well known in the art. The gage wheel 265 assists in determining the depth at which the planter 200 deposits the seed. The gage wheel 265 is mounted to the frame 245 via a gage wheel lever arm 283, which is pivotally coupled to the frame 245 via a pivot pin 284. The seed hopper 275 serves as the seed reservoir for its row unit 250. The trailing arm assembly 270 may be pivotally coupled to the frame 245 via a pivot pin 285 and, as explained in the following discussion, may include components for opening a fertilizer furrow 290, delivering liquid fertilizer from the distribution tube 255 into the furrow 290, and closing the seed and fertilizer furrows 280, 290.

For a discussion of the various components of the trailing arm assembly 270 and the operation of those components, reference is made to FIGS. 3-9. FIGS. 3-6 are the same side views of the planter 200, each illustrating a different state of the gage wheel 265 and components of the trailing arm assembly 270 as the planter passes over an obstruction 295 in the field surface 300. FIG. 7 is a cross section of a fertilizer furrow opener disc 305 of the trailing arm assembly 270 as taken along section line 7-7 in FIG. 3. FIG. 8 is a cross section of a leading furrow closer wheel 310 of the trailing arm assembly 270 as taken along section line 8-8 in FIG. 3. FIG. 9 is a cross section of a trailing furrow closer wheel 315 of the trailing arm assembly 270 as taken along section line 9-9 in FIG. 3.

As depicted in FIG. 3, the trailing arm assembly 270 may include a trailing arm frame 320, the leading furrow closer wheel 310, a walking axle or lever arm assembly 325, and fertilizer deposit tube 330. The trailing arm frame 320 includes a pivot end pivotally coupled to the frame 245 via the pivot pin 285. The walking axle or lever arm assembly 325 includes a lever arm 335, the fertilizer furrow opener disc 305 and the trailing closer wheel 315.

As indicated in FIGS. 3 and 8, the lever arm assembly 325 is pivotally coupled to the trailing arm frame 320 via a pivot pin 340 extending through a middle portion of the lever arm 335. On the opposite side of the trailing arm frame 320, the leading furrow closer wheel 310 is pivotally coupled to the trailing arm frame 320 via a pivot pin 346, which is located generally directly opposite the pivot pin 340 of the lever arm 335. The leading closer wheel 310 may be tilted or inclined such that its pivotal axis is between approximately 13 degrees and approximately 25 degrees from being horizontal.

As shown in FIGS. 3 and 7, the fertilizer furrow opener disc 305 is pivotally coupled to the front or leading end 345 of the lever arm 335 via a pivot pin 350 extending through the lever arm 335. The fertilizer deposit tube 330 extends downwardly from the fertilizer distribution tube 255, through a bracket assembly 360 that couples the deposit tube 330 to the lever arm 335 slightly forward of the lever arm center pivot pin 340, and terminates in a flexible tubing 365, which may be separately replaceable from the rest of the deposit tube 330. The fertilizer deposit tube 330 may also extend through the flexible tubing 365 and may terminate at approximately the end of the flexible tubing 365. Additionally, the fertilizer deposit tube 330 may extend through the flexible tubing 365 and may terminate at any point within the flexible tubing 365. The flexible tubing 365 may be a polymer material reinforced or not reinforced with metal or other types of braiding. Candidate polymer materials may include polypropylene, ethyl vinyl acetate ("EVA"), ethylene propylene diene monomer rubber ("EPDM"), etc. Tubing 365 may not be flexible, but instead may be rigid.

As depicted in FIGS. 3 and 9, the trailing closer wheel 315 is pivotally coupled to the back or trailing end 370 of the lever arm 335 via a pivot pin 375 extending through the lever arm 335. The trailing closer wheel 315 may be tilted or inclined such that its pivotal axis is between approximately 13 degrees and approximately 25 degrees from being horizontal.

As indicated in FIGS. 2 and 7-8, in one embodiment, the trailing arm assembly 270 includes an adjustment lever 376. This lever 376 allows the down force exerted by the closer wheels 310, 315 to be adjusted. As is known in the art, a spring extends between a bottom end of the lever 376 and the planter main frame 245. The position of the lever 376 may be set to set the down force on the closing wheels 310, 315. When the lever 376 is in the forward position, the resulting down force on account of the spring is zero pounds, and when the lever 376 is the rearward position, the resulting force on account of the spring is at least 120 pounds.

Figure 11:
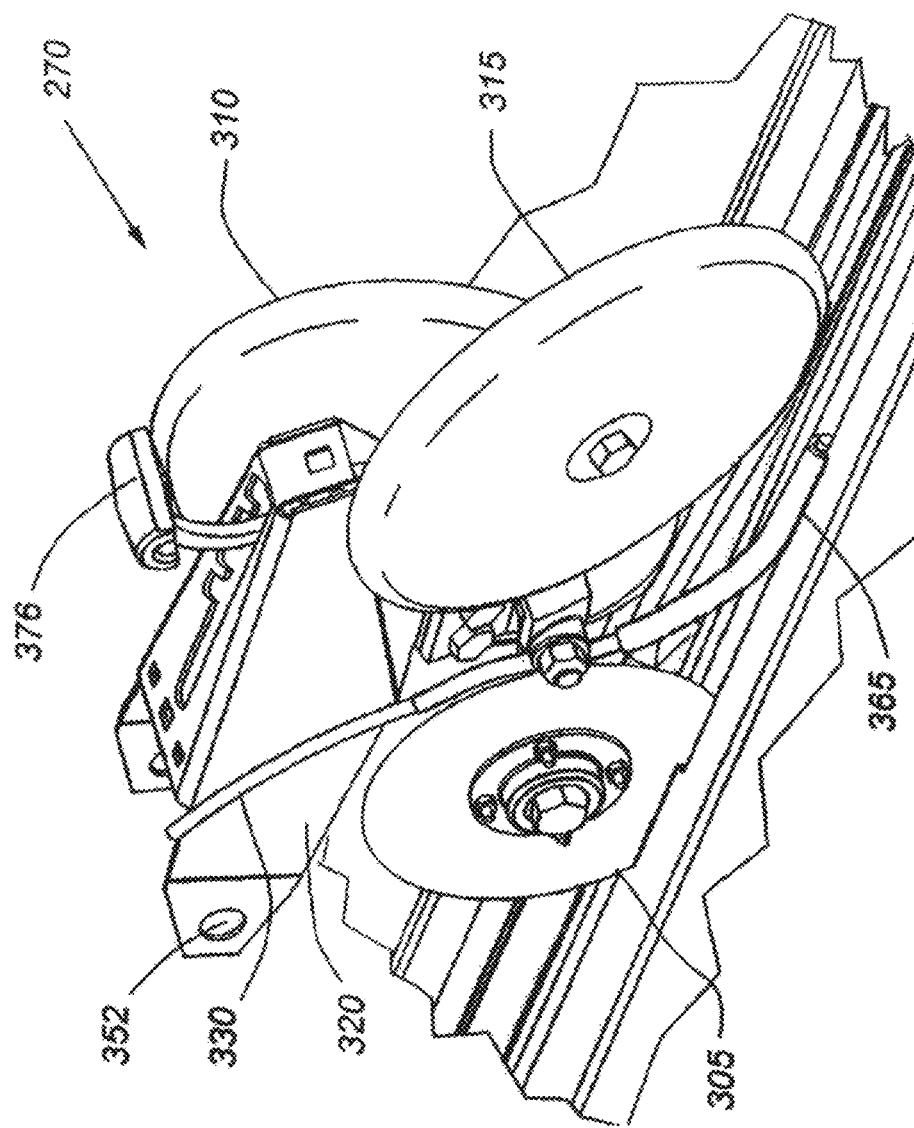
FIG. 11 is a rear isometric view of the trailing arm assembly similar to the viewing angle of FIG. 2, except the trailing arm is detached from the planter main frame.

FIG. 11 depicts one embodiment of the trailing arm assembly 270. FIG. 11 is a rear isometric view of the trailing arm assembly similar to the viewing angle of FIGS. 2 and 7-8, except the trailing arm assembly is detached from the planter main frame. Also similar to FIGS. 7 and 8, the adjustment lever 376 of FIG. 11 may adjust the down force exerted by the closer wheels 310, 315. Additionally, the trailing arm assembly 270 of FIG. 11 includes the liquid fertilizer distribution system, with the deposit tube 330 and the flexible tubing 365.

Figure 12:
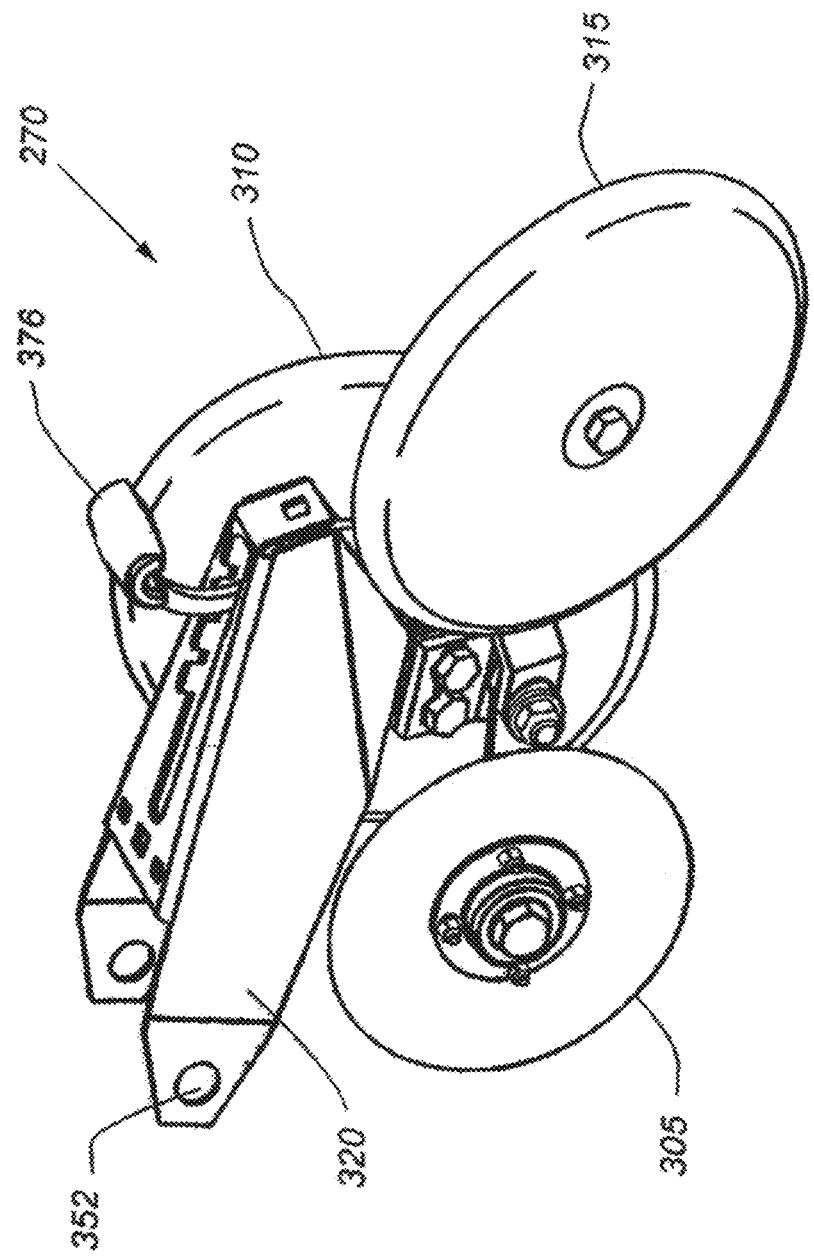
FIG. 12 is generally the same isometric view of the trailing arm depicted in FIG. 11, except the liquid fertilizer distribution system is not present.
Figure 13:
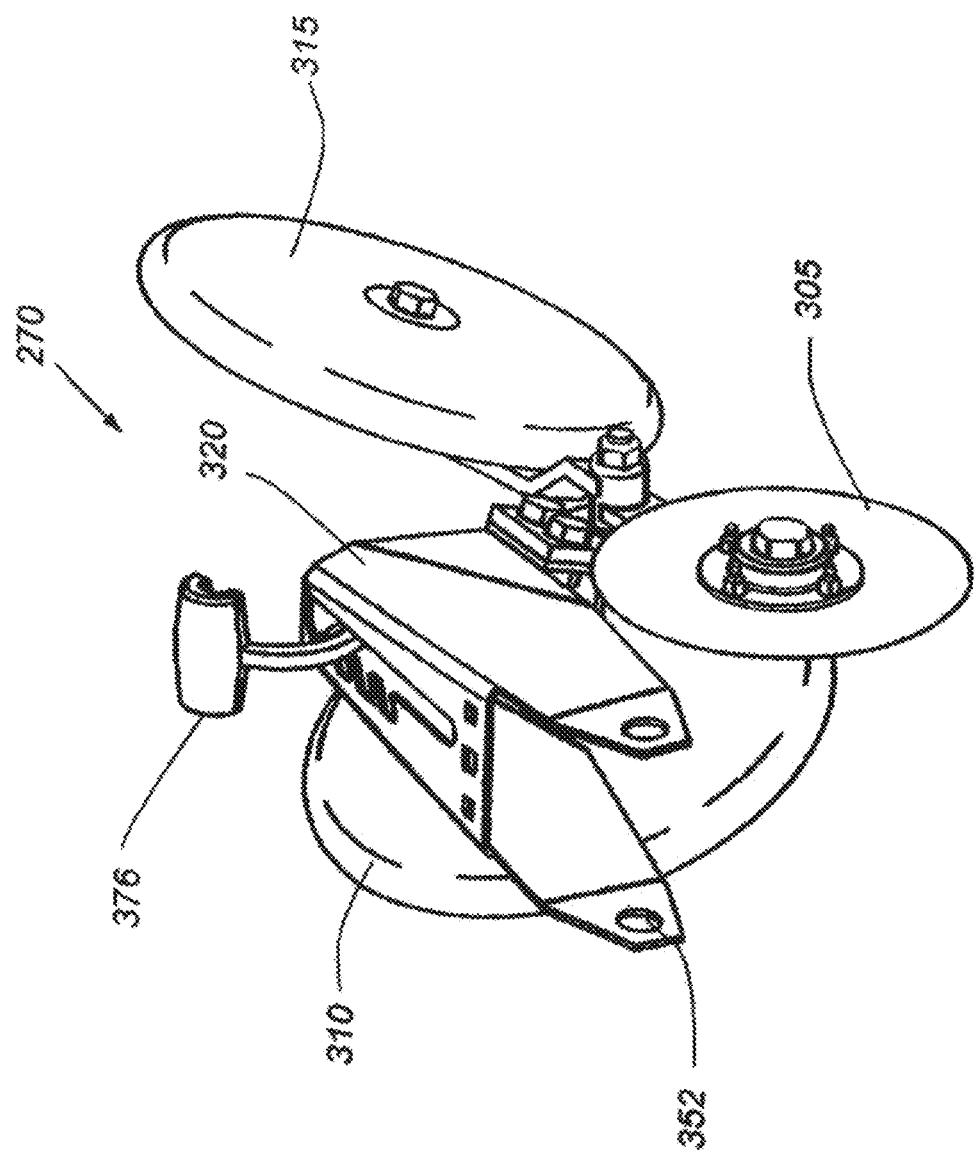
FIG. 13 is a front isometric view of the trailing arm assembly depicted in FIG. 12.
Figure 14:
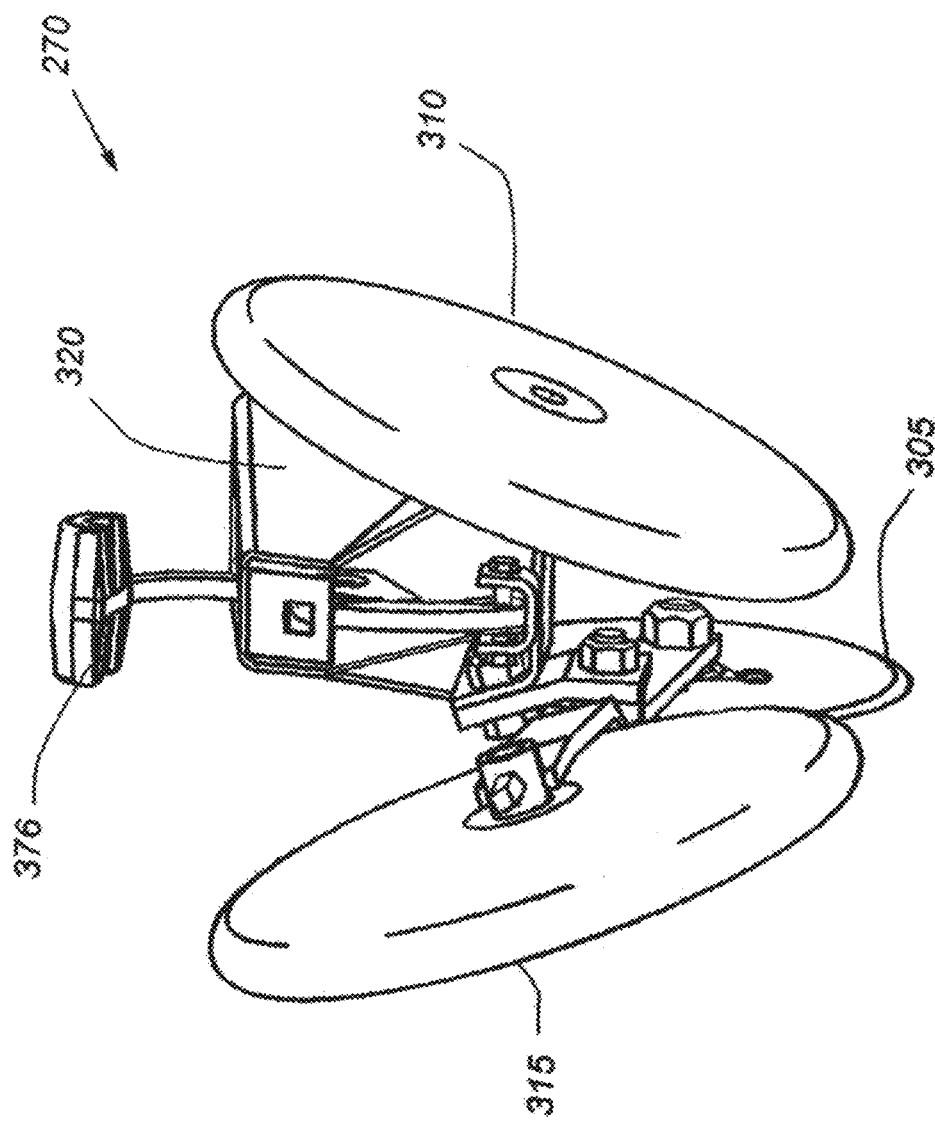
FIG. 14 is another isometric view of the trailing arm assembly of FIG. 12 as viewed from behind and below the trailing arm assembly.

FIGS. 12-17 also depict a similar embodiment of the trailing arm assembly 270, except FIGS. 12-17 are not shown in a field and do not show the liquid fertilizer distribution system. FIG. 12 is generally the same isometric view of the trailing arm depicted in FIG. 11 and, similarly, FIG. 13 is a front isometric view of the trailing arm assembly depicted in FIG. 12. Additionally, FIGS. 11-13 illustrate the trailing arm assembly mounting holes 352, the point at which the trailing arm assembly may attach to the planter main frame. FIG. 14 is another isometric view of the trailing arm assembly of FIG. 12 as viewed from behind and below the trailing arm assembly 270.

Figure 15:
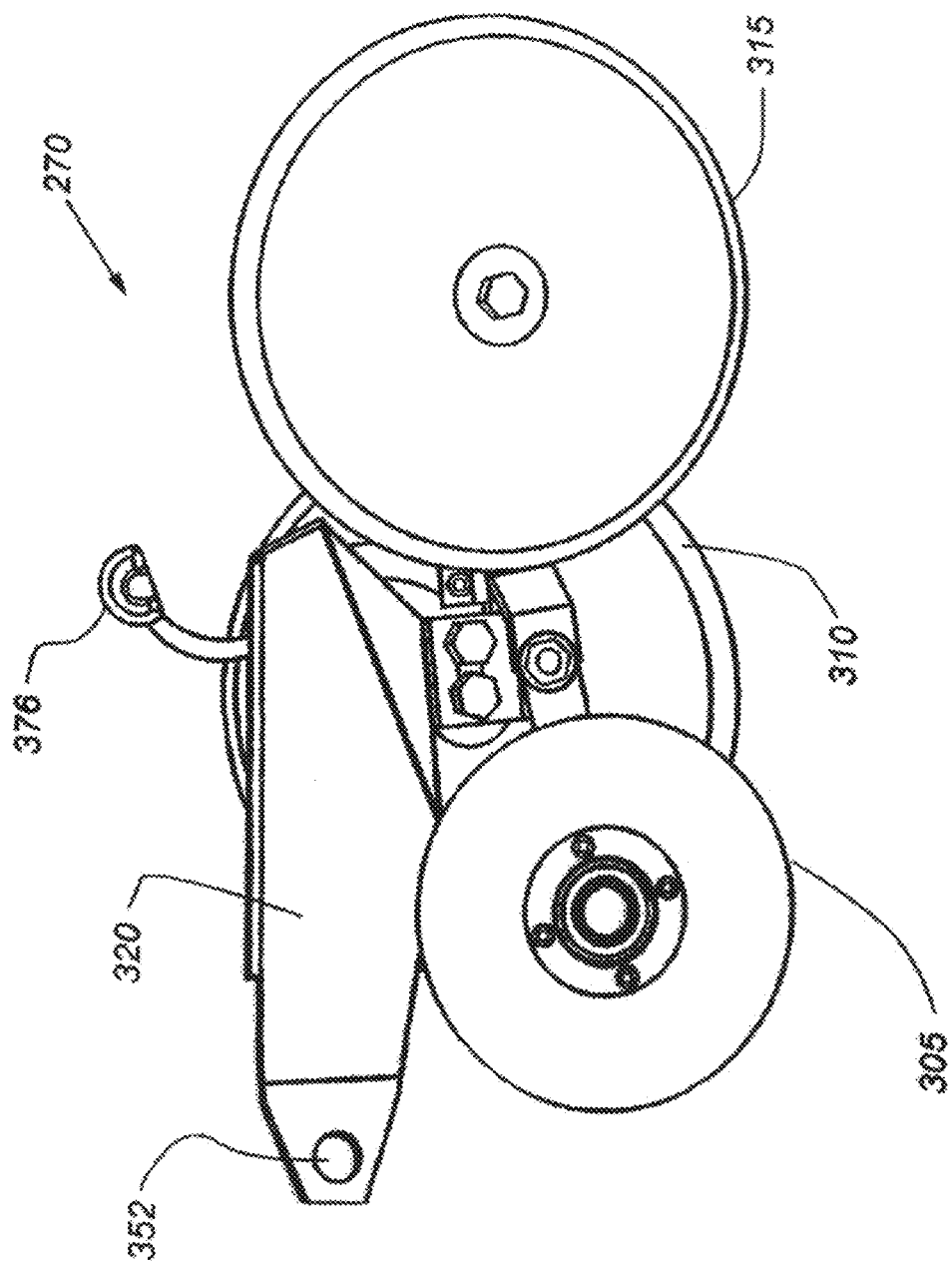
FIG. 15 is a side view of the trailing arm assembly of FIG. 12.
Figure 16:
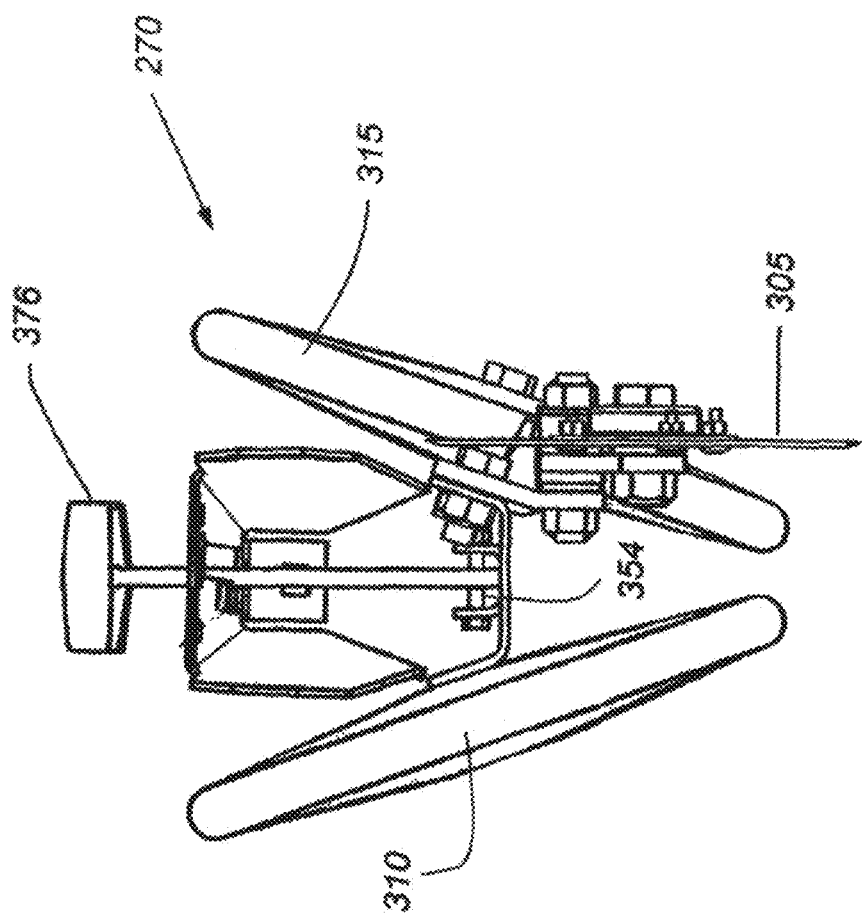
FIG. 16 is a front view of the trailing arm assembly of FIG. 12.

FIGS. 15-17 also depict different views of the trailing arm assembly of FIG. 12. Similar to FIGS. 11-13, FIG. 15 is a side view of the trailing arm assembly of FIG. 12 and illustrates the trailing arm assembly mounting holes 352, where the trailing arm assembly may attach to the planter main frame. FIG. 16 is a front view of the trailing arm assembly of FIG. 12. The spring, not shown in FIG. 16, but is previously discussed with respect to FIGS. 2 and 7-8, may extend between a bottom end of the lever 376 and the planter main frame 24. Furthermore, the spring may be various types of springs including, but not limited to a coil spring. Additionally, FIG. 17 is a rear view of the trailing arm assembly of FIG. 12. FIG. 17 illustrates an attachment point 354, in which the adjustment lever 376 may attach to the trailing arm assembly.

In other embodiments, the trailing arm assembly 270 includes a screw adjustment feature in place of the lever 376 depicted in FIGS. 2 and 7-8. As is known in the art, the screw adjustment feature can be screwed in or out to adjust a spring arrangement to set the down force on the closing wheels 310, 315.

Regardless of whether a down force is set via a lever arrangement or a screw adjustment arrangement, setting the down force for the maximum amount is not generally an ideal situation for any planter, including the planter disclosed herein. This is because the extreme down force causes an upward force on a planter when the seed boxes get low on seed. This, in turn, causes a planter to ride or plant shallower than when the seed boxes were full of seed. Also, extremely high down force settings can cause closer wheels to act like a trowel in concrete, thereby sealing the soil so tight that the plants have a hard time emerging or plants are crusted under. Such troweling often results in the field having to be replanted or low plant numbers. Reducing the down force eliminates the troweling effect. However, until the arrival of the walking axle assembly 325 disclosed herein, some operators found it necessary in certain field conditions to increase the down force in order to get adequate furrow closure. In any event, the instant disclosure may work under a variety of down force loads, including no increased down force loads.

As a benefit of the walking axle assembly 325 disclosed herein, the down force on the closer wheels 310, 315 does not have to be set for the maximum down pressure at the lever 376 or screw adjustment feature. Because the fertilizer disc 305 pivots about the axis 340 and the wheel 315 and disc 305 can oscillate, a steady pressure on the closer wheel 315 and disc 305 can be maintained without requiring maxing out the down force via the lever 376 or screw adjustment feature. Thus, the walking axle assembly 325 disclosed herein can provide good furrow closing while reducing the likelihood the seeder is going to lift or troweling will occur.

In one embodiment, the lever 376 or screw adjustment feature can be set to establish down force in the mid-range (e.g., 40 lbs. to 60 lbs.) and still achieve good down force for the closer wheels 310, 315. Such down force settings with the walking axle assembly 325 provides good furrow closing action in firm as well as soft soils.

As can be understood from FIGS. 3 and 7, the seed furrow opener disc 260 opens the seed furrow 280. A seed deposit tube 380, which follows the seed furrow opener disc 260 and extends down into the seed furrow 280, deposits the seed 282 in the seed furrow 280.

As can be understood from FIGS. 2, 3, 7 and 8, the fertilizer furrow opener disc 305 opens the fertilizer furrow 290. The flexible tubing 365 of the fertilizer deposit tube 330, which follows the fertilizer furrow opener disc 305 and extends close to or down into the fertilizer furrow 290, deposits the liquid fertilizer 385 in the fertilizer furrow 290. Depending on the soil firmness, the fertilizer tubing 365 may run on top of the fertilizer furrow or down into the fertilizer furrow. When on top, the fertilizer will filter down into the soil or slice/groove made by the fertilizer disc 305.

While a fertilizer deposit tube 330 employing an arrangement with flexible tubing 365 is depicted in FIGS. 2, 3, 7 and 8 and 11, in other embodiments the fertilizer depositing assembly will have configuration as depicted in FIGS. 18-23. This may be because in some soil conditions the flexible tubing 365 may bounce around. For example, the fertilizer disc 305 may only make a narrow fertilizer furrow in the soil. Consequently, unless the soil is soft, the tubing 365 may not enter into the fertilizer furrow very deep. As the fertilizer comes out of the tubing, it may soak into the soil or be drawn into the moist soil exposed by the disc 305. Sometimes the tubing 365 may bounce around as it encounters field residue or rough ground. This can cause the fertilizer to splatter onto the closer wheels 310, 315, thereby causing soil to build up on the wheels.

To overcome the issues that are sometimes presented by the tubing 365, the embodiment depicted in FIGS. 18-23 may be employed. As shown in FIGS. 18-23, the fertilizer dispensing assembly 500 employs a rebounder assembly 505 including a concave blade or member 510 coupled to the axle 340 in a pivotal and/or biased manner. Thus, the bottom end 515 of the concave member 510 is forced or maintained against the soil surface 300.

In one embodiment, the member 510 is flexible and made from a resilient and flexible metal or polymer material. As can be understood from FIGS. 20 and 23, which are, respectively, a side view of the member 510 and a cross section through the member 510 as taken along section line 23-23 in FIG. 20, the member is concave such that the concave surface 530 faces towards the soil surface 300 when used as depicted in FIGS. 18 and 19. The bottom end 515 may be blunt or concave.

As shown in FIGS. 18, 19 and 20, which are, respectively, side and rear view of the lever arm assembly 325 and a side view of the member 510, the deposit tube 330 may be mounted to the walking arm 335 before extending down the rebounder assembly 505 to terminate as a nozzle or end 525. The terms "walking arm" and "lever arm" may be used interchangeably throughout this discussion. As can be understood from FIG. 22, which is an exploded isometric view of the tube 330 and member 510, a hole 520 extends through the member 510 so that, as can be understood from FIGS. 18, 20 and 21, the nozzle 525 passes through or terminates in the hole 520. Accordingly, liquid fertilizer can exit the nozzle; pass through the member 510 and into the fertilizer furrow.

Thus, the fertilizer dispensing assembly 500 is able to place the liquid fertilizer in a straight shot into the fertilizer furrow 290 made by the disc 305. The concave design and flexibility of the member 510 helps to prevent fertilizer from ending up on the closer wheels 310, 315. The member 510 runs over the top of the furrow 290 depositing the fertilizer in the furrow, rather than in other locations that lead to soil buildup on the press wheels.

The fertilizer furrow opener disc 305 may be laterally offset relative to the seed furrow opener disc 260 such that the fertilizer furrow 290 is laterally offset from the seed furrow 280 a distance between approximately one inch and approximately three inches. The lateral offset between the two furrows 280, 290 assists in reducing the likelihood that the fertilizer 385 may burn the seed 282.

As can be understood from FIGS. 2, 3, 7-9, the leading closer wheel 310 partially closes the seed furrow 280, and the trailing closer wheel 315 then completes the full closure of the seed furrow 280. The trailing closer wheel 315 also closes the fertilizer furrow 290 via pressure exerted inward to the seed furrow 280 and outward to the fertilizer furrow 290. The closing wheels 310, 315 running at an angle will put pressure inward toward the seed furrow 280 and also some outward pressure toward the fertilizer furrow 290.

The double discs open up the seed furrow 280, wedging the soil out in to a V and creating side wall compaction. The fertilizer disc 305 will eliminate the side wall compaction resulting from the formation of the seed furrow by the double discs. This makes it much easier for the closer wheels 310, 315 to crush the soil around the seed. Such discs can be run on both sides of the seed furrow.

As indicated in FIG. 3, the planter 200 approaches an obstruction 295 (e.g., rock, dirt clod, stubble, branch, ditch, dip, etc.) as the planter 200 travels in the direction of arrow F. As shown in FIG. 4, the gage wheel 265 pivots upwardly in the direction indicated by arrow W via its gage wheel lever arm 283 and relative to the lever arm pivot pin 284 to clear the obstruction 295. Once the gage wheel 265 clears the obstruction 295, the gage wheel 265 returns to contacting the surface 300 as indicated in FIG. 3.

As depicted in FIG. 5, as the planter 200 continues in the direction of arrow F, fertilizer furrow opener disc 305 eventually encounters the obstruction 295. In doing so, the fertilizer furrow opener disc 305 and the leading end 345 of the lever arm 335 on which the disc 305 is mounted are caused to rotate upwardly about the lever arm center pivot pin 340, as indicated by arrow X. The resulting clockwise pivot of the disc 305 about the lever arm center pivot pin 340 causes the trailing closer wheel 315 and trailing end 370 of the lever arm 335 to clockwise pivot about the center pivot pin 340. Thus, the trailing closer wheel 315 presses harder against the field surface 300 as indicated by arrow Y. The downward pressure of the trailing closer wheel 315 coupled with the disc 305 clearing the obstruction 295 causes an upward force on the lever arm center pivot pin 340, which causes the pin 340 and the trailing arm frame 320 to rotate upwardly, as indicated by arrow Z, about the pivot pin 285 attaching the trailing arm frame 320 to the planter frame 245. Due to the trailing arm frame 320 rotating upwardly as indicated by arrow Z, the leading closer wheel 310 also raises upwardly as it travels with the trailing arm frame 320. Due to the lever arm 335 moving upwardly with its pivot pin 340, the bracket 360 moves along with the lever arm 335, which causes the flexible tubing 365 of the fertilizer deposit tube 330 to move upwardly and, perhaps, even temporarily out of the fertilizer furrow, as shown in FIG. 5. Once the disc 305 clears the obstruction 295, the trailing arm frame 320 and lever arm 335 return to normal operation as indicated in FIG. 3. As a result, the disc 305 again creates a furrow 290 in which the flexible tubing 365 again returns.

As illustrated in FIG. 6, as the planter 200 continues in the direction of arrow F, the trailing closer wheel 315 eventually encounters the obstruction 295. In doing so, the wheel 315 and the trailing end 370 of the lever arm 335 on which the wheel 315 is mounted are caused to rotate upwardly about the lever arm center pivot pin 340, as indicated by arrow Y'. The resulting counter clockwise pivot of the wheel 315 about the lever arm center pivot pin 340 causes the fertilizer furrow opener disc 305 and leading end 345 of the lever arm 335 to counter clockwise pivot about the center pivot pin 340. Thus, the disc 305 presses harder against the field surface 300 as indicated by arrow X'. The downward pressure of the disc 305 coupled with the wheel 315 clearing the obstruction 295 causes an upward force on the lever arm center pivot pin 340, which causes the pin 340 and the trailing arm frame 320 to rotate upwardly, as indicated by arrow Z', about the pivot pin 285 attaching the trailing arm frame 320 to the planter frame 245. However, due to the downward rotation of the disc 305 and the leading end 345 of the lever arm, the disc 305 may still create a furrow 290 despite the trailing arm frame 320 moving upwardly as indicated by Z'.

Due to the trailing arm frame 320 rotating upwardly as indicated by arrow Z', the leading closer wheel 310 also raises upwardly as it travels with the trailing arm frame 320. Due to the lever arm 335 moving upwardly with its pivot pin 340, the bracket 360 moves along with the lever arm 335, which causes the flexible tubing 365 of the fertilizer deposit tube 330 to move upwardly. However, due to the downward rotation of the disc 305 and the leading end 345 of the lever arm, the flexible tubing 365 may still remain in the furrow 290 despite the trailing arm frame 320 moving upwardly as indicated by Z'. Once the wheel 315 clears the obstruction 295, the trailing arm frame 320 and lever arm 335 return to normal operation as indicated in FIG. 3.

As can be understood from FIGS. 3-6, where the leading end length of the lever arm 335 (as measured between the pivots 340, 350) is generally shorter than the trailing end length of the lever arm 335 (as measured between the pivots 340, 375), the displacement of the wheel 315 relative to the trailing arm assembly 270 in an upward direction causes a generally smaller displacement of the disc 305 relative to the trailing arm assembly 270 in a downward direction. For example, the wheel 315 may move upwardly three inches when the disc 305 moves downwardly two inches. Thus, the lever arm arrangement provides a mechanical disadvantage such that an upward force on the wheel 315 creates a greater downward force on the disc 305 to force the disc 305 into hard soil. In one embodiment, the ratio of the leading end length of the lever arm 335 relative to the longer trailing end length of the lever arm 335 is approximately five to approximately seven. In another embodiment, the ratio of the leading end length of the lever arm 335 relative to the longer trailing end length of the lever arm 335 is approximately three to approximately five.

Where the leading end and trailing end lengths of the lever arm 335 are not equal, the displacement of the wheel 315 relative to the trailing arm assembly 270 in an upward direction causes a generally proportional displacement of the disc 305 relative to the trailing arm assembly 270 in a downward direction. In other words, the displacement distances will not be equal to each other, but they will be proportionally related to each other based on the proportional relationship of the respective lengths of the leading and trailing end lengths.

Figure 10:
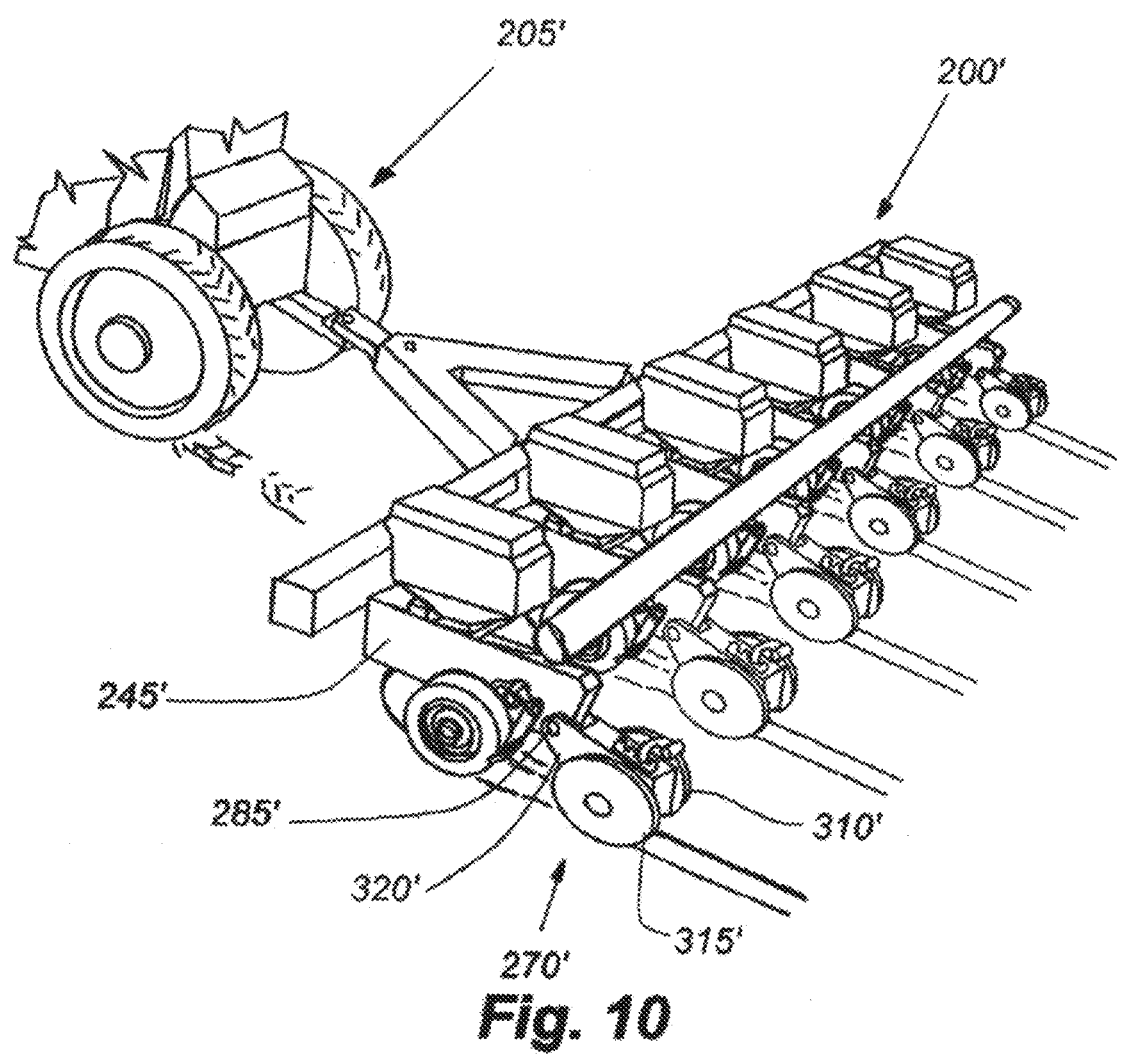
FIG. 10 is the same view as depicted in FIG. 2, except of a planter prior to being retrofitted with the walking axle described with respect to FIGS. 1-9.

In one embodiment, the walking axle 325 may be provided as a package and used to retrofit an existing planter 200' (as shown in FIG. 10) to have a fertilizer or improved fertilizer capability. For a discussion regarding making such a retrofit, reference is made to FIGS. 2 and 10. FIG. 10 is the same view as depicted in FIG. 2, except of a planter 200' prior to being retrofitted with the walking axle 325 described with respect to FIGS. 1-9. For purposes of discussing the retrofit, FIG. 2 represents the planter subsequent to the retrofit.

As shown in FIG. 10, the planter 200' may have a trailing arm assembly 270' pivotally coupled to the frame 245' of the planter 200'. The trailing arm assembly 270' may have two furrow closer wheels 310', 315' that are directly opposite from each other such that their respective axles may be generally aligned with each other or staggered approximately one to two inches. The planter 200' is not equipped for delivering fertilizer, but its owner would like it to be. Instead of purchasing a completely new planter with trailing arm assemblies 270 having walking axle assemblies 325 as discussed with respect to FIGS. 1-9, the owner purchases retrofit packages having the walking axle assemblies 325 and retrofits the existing planter 200' as follows.

As can be understood from FIGS. 2 and 10, for each of the trailing arm assemblies 270', one of the furrow closer wheels 310' is removed and a packaged walking axle assembly 325, as described above with respect to FIGS. 1-9, is mounted near the pivot point of the removed wheel 310'. The walking axle assembly 325, with its furrow opener disc 305, fertilizer tube 365, lever arm 335 and trailing wheel 315, is now able to follow the contours of the field surface 300 while delivering liquid fertilizer.

As can be understood from FIGS. 3-6, in one embodiment, the lever arm assembly 325 may be considered a "walking axle" configuration that allows the disc 305 and trailing closer wheel 315 to walk over an obstruction 295 in the field surface 300. In other words, the configuration of the lever arm assembly 325 allows the disc 305 and wheel 315 to follow the contours of the field surface. Thus, the depth of the fertilizer 385 can be held more constant than previously possible in field surfaces 300 with significant obstructions 295.

The configuration of the lever arm assembly 325 also results in a balance of the downward pressure exerted on the field surface 300 by the disc 305 and wheel 315. More specifically, the configuration of the lever arm assembly 325 assists in keeping downwardly pressure of the disc 305 and wheel 315 generally constant regardless of the obstructions or variation in the field surface 300. This generally balanced and constant downward pressure of the disc 305 and wheel 315 assists in maintaining a constant fertilizer depth, preventing variations in field surface conditions from causing fertilizer depth to become too shallow or too deep.

Figure 25:
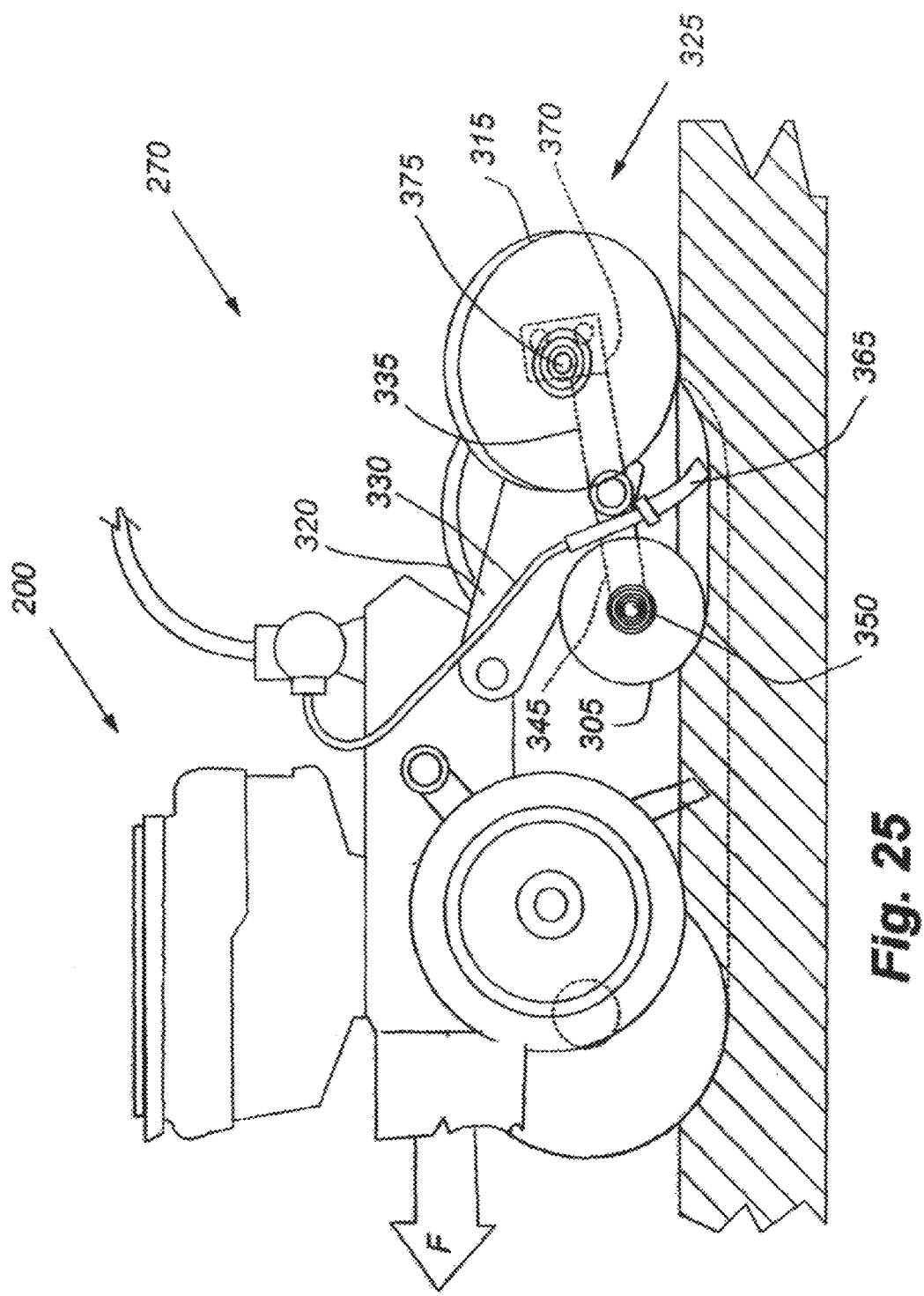
Figure 26:
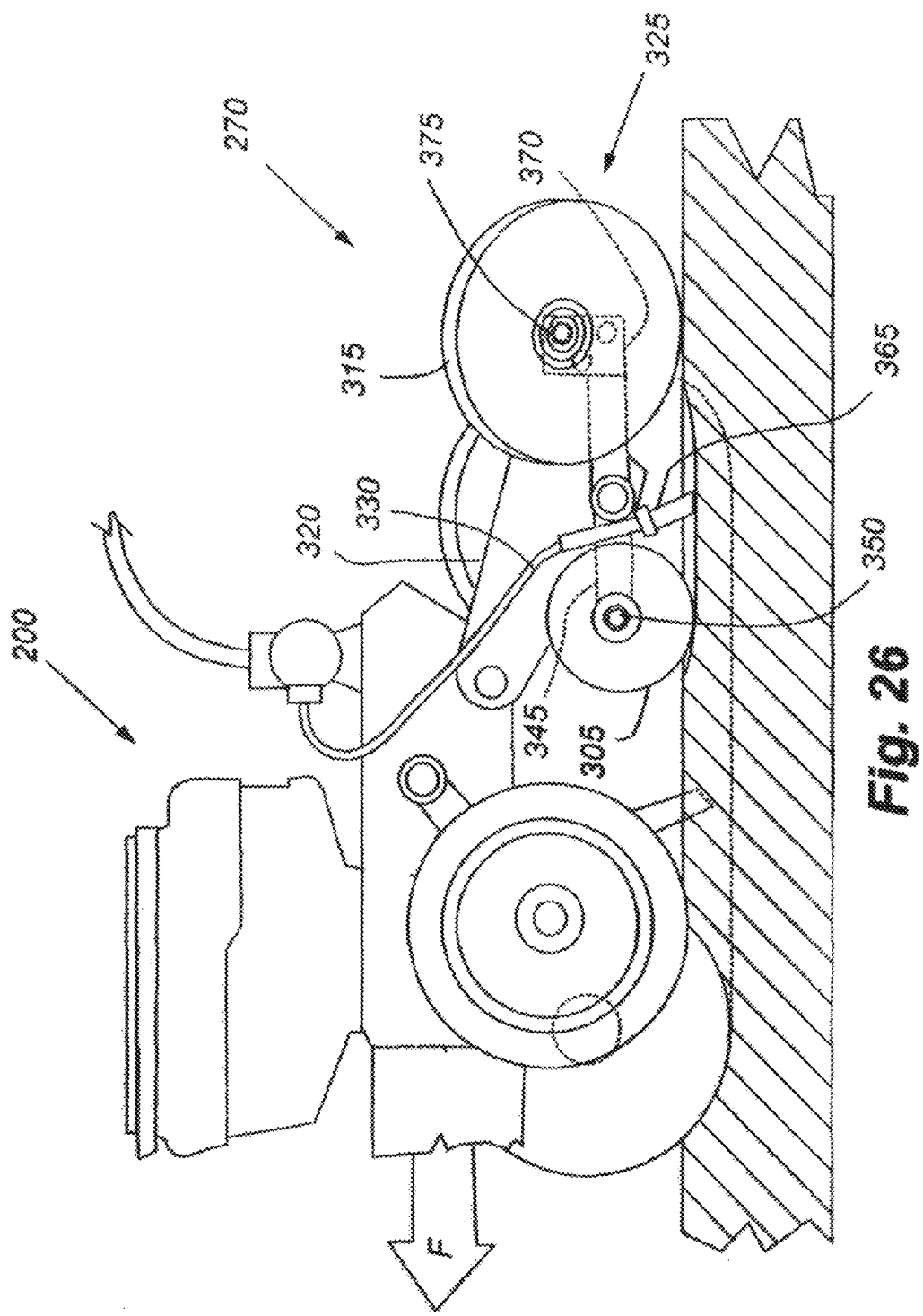
Figure 27:
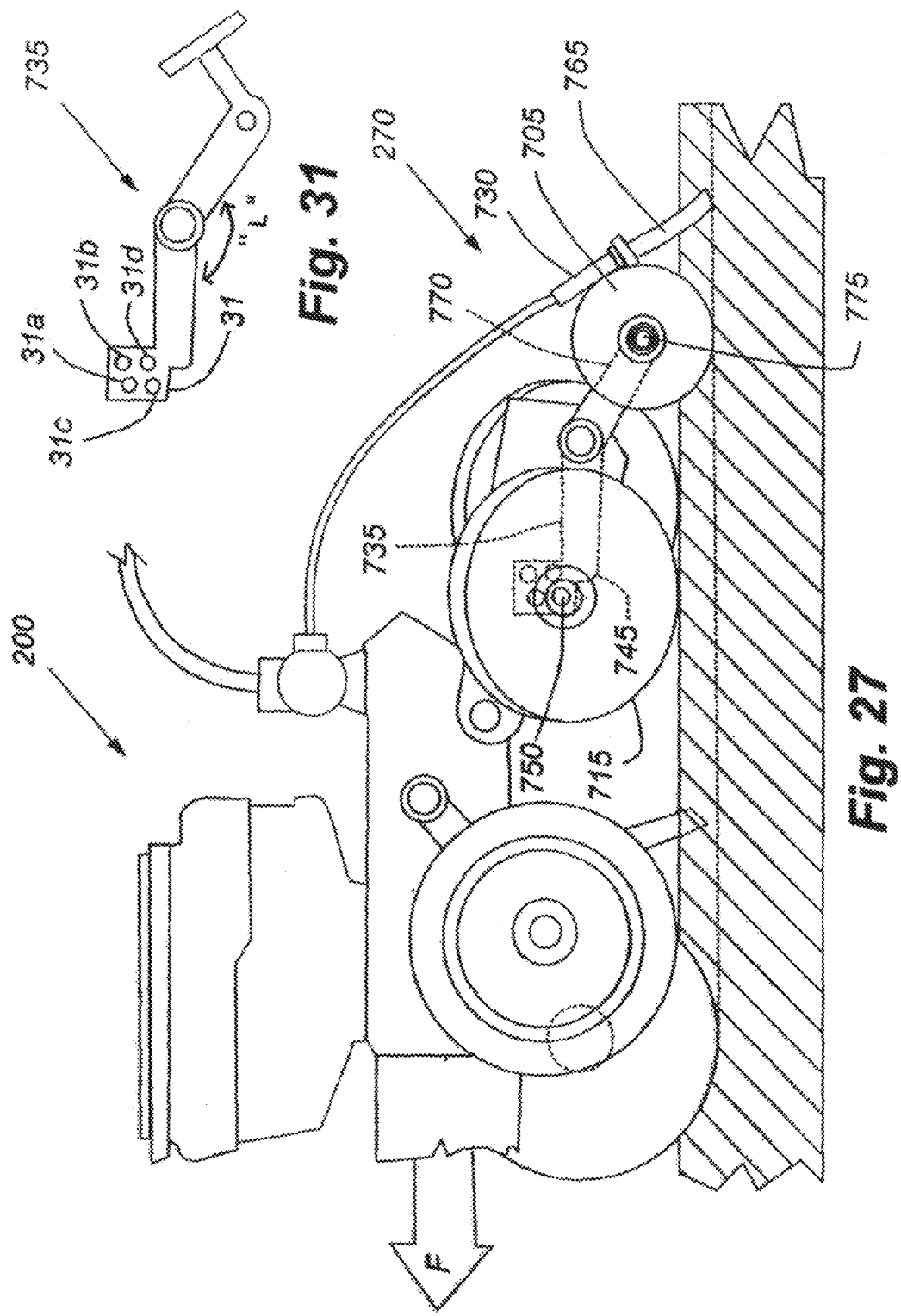
FIGS. 27-29 are the same side views of the planter, each illustrating a different mounting position of the furrow closer wheel with respect to the lever arm.
Figure 28:
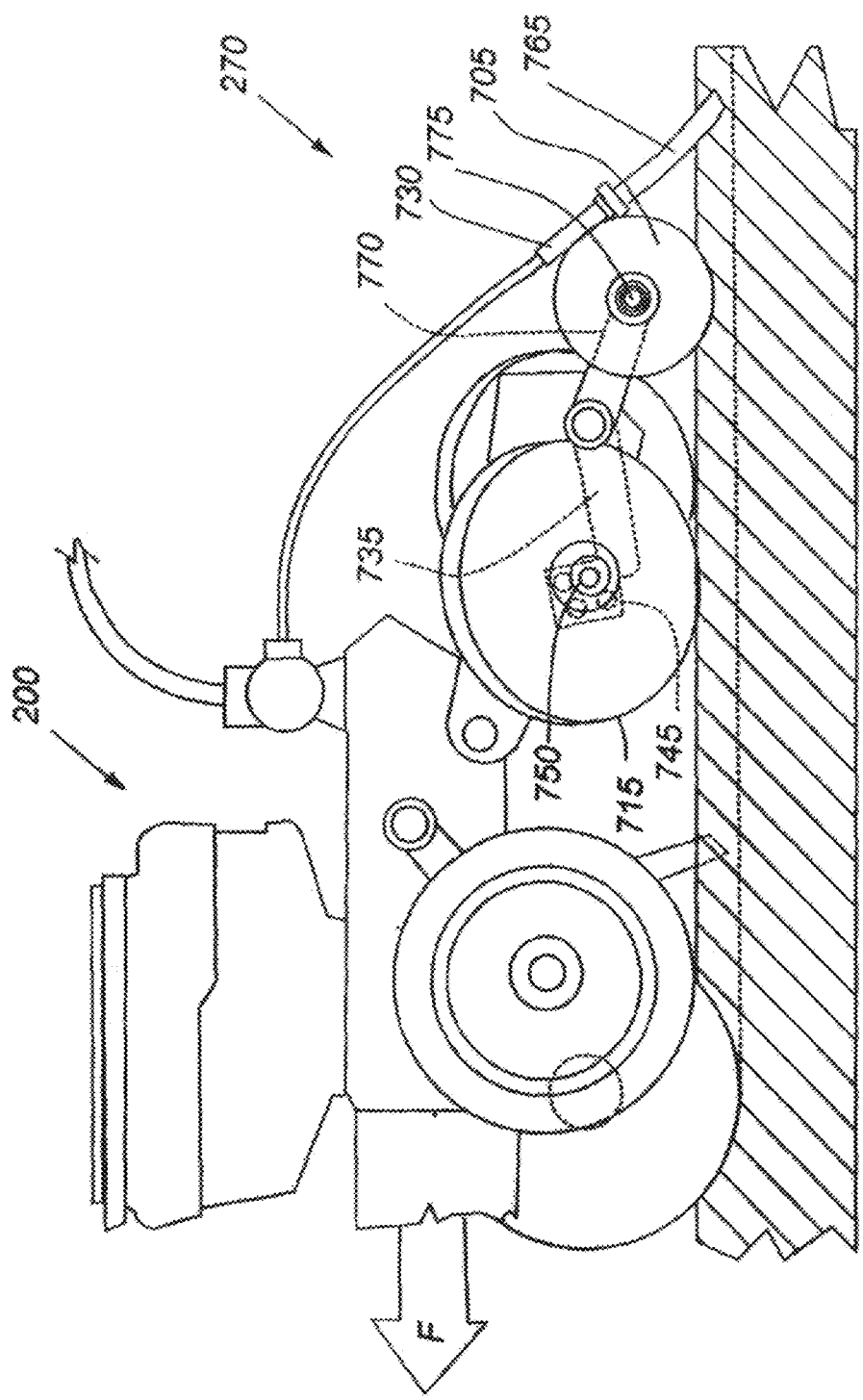
Figure 29:
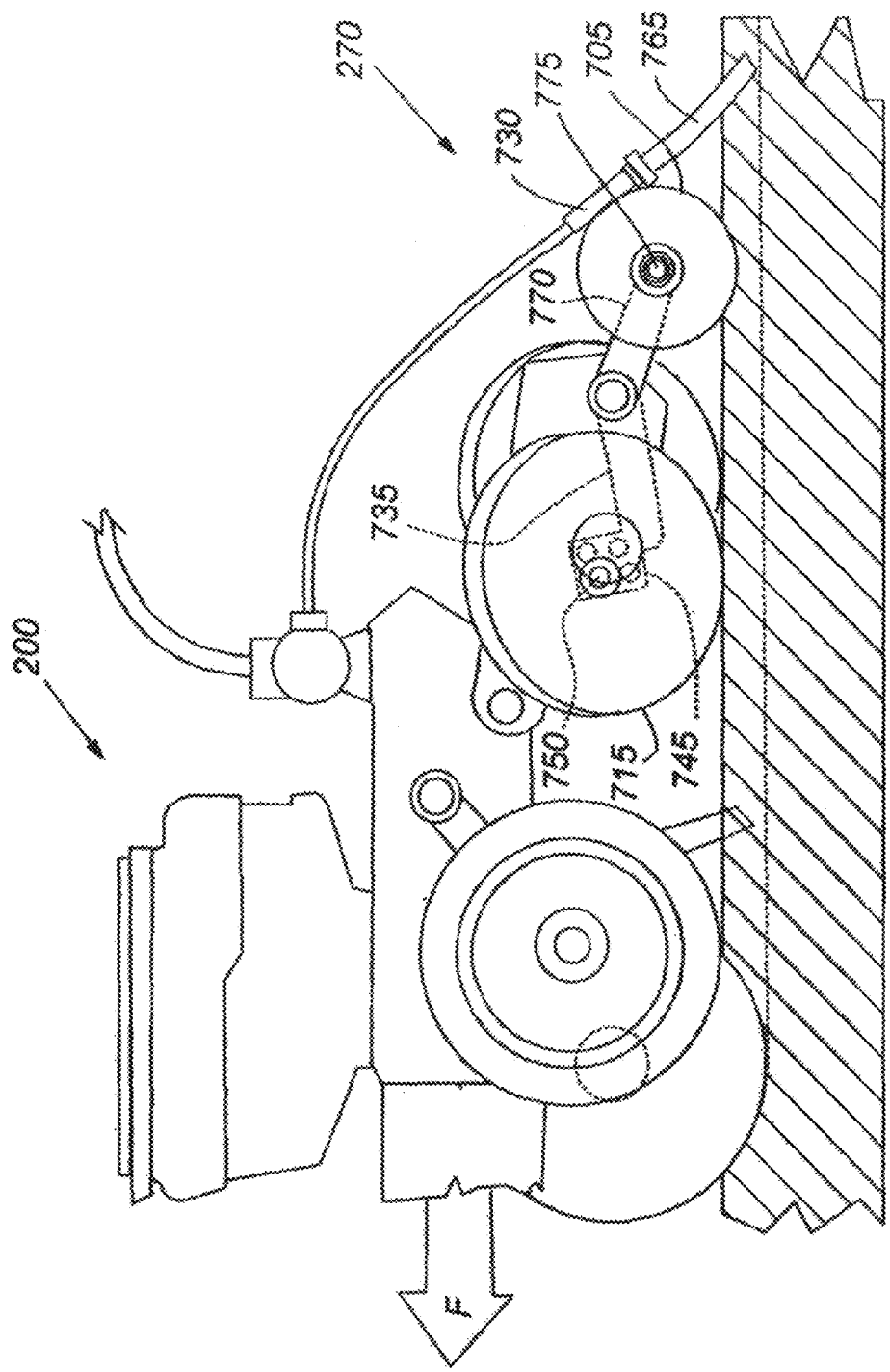

In a further embodiment, FIGS. 24-29 illustrate different configurations of the components of the trailing arm assembly 270. FIGS. 24-26 are the same side views of the planter 200, with each figure illustrating a different mounting position of the trailing furrow closer wheel 315 with respect to the lever arm 335. Further, FIGS. 24-26 illustrate that the trailing furrow closer wheel 315 may pivotally couple to the back or trailing end 370 of the lever arm 335 in any one of three mounting positions. FIGS. 27-29 are the same side views of the planter 200, with each figure illustrating a different mounting position of the furrow closer wheel 715 with respect to the lever arm 735, which includes four mounting positions. Further, FIGS. 27-29 illustrate the furrow closing wheel 715 pivotally mounted at the front or leading end 745 of the lever arm 735 and the furrow opening disc 705 at the back or trailing edge 770 of the lever arm 735. FIGS. 27-29 will be discussed in further detail below.

As depicted in FIGS. 30 and 31, the lever arm 335 may include two distinct segments, a first segment and a second segment, which may be connected at the middle portion of the lever arm 335. As previously discussed and illustrated in FIGS. 3 and 8, the lever arm 335 may pivotally connect to the trailing arm frame 320 via a pivot pin 340 extending through a pivot of the lever arm 335. The first segment and the second segment of the lever arm 335 may be approximately linear with respect to one another (as shown in FIG. 30) or at an angle with respect to one another (as shown in FIG. 31). Further, the first segment and the second segment may be one continuous lever arm, or may be two separate pieces configured to form a lever arm. For example, the first and second segments may be two separate pieces and the first segment may be attached to the second segment at the pivot.

Additionally, the movement of the first segment of the lever arm 335 may be directly related to the movement of the second segment. In one example, as the first segment of the lever arm 335 moves upwardly, the second segment may move downwardly by a proportional distance. In another example, the movement of the first segment of the lever arm 335 may be relative to the movement of the second segment. In this example, the first segment may move upwardly, but there may be some flexibility around the pivot, thus the second segment may move downwardly by a relative distance to the movement of the first segment (as the second segment may be somewhat flexible with respect to the first segment).

In FIG. 30, the back or trailing end 370 of the lever arm 335 may also include, for example, three possible mounting positions where the trailing furrow closer wheel 315 may pivotally couple to the back or trailing end 370 of the lever arm 335. Although three mounting positions are discussed and illustrated herein, this is done for explanatory purposes only. The lever arm 335 may have any number of mounting positions including one, two or more. The lever arm 335 may also include a mounting bracket, where the mounting bracket may include one or multiple mounting positions. As depicted in FIG. 30, the top mounting position 30*a* may allow the furrow opener disc 305 to run approximately one inch deep with respect to a field surface. The field surface may vary due to obstructions such as debris, clods, stubble and so on, thus the depth of the furrow opener disc 305 may vary depending on the deviations in the field surface. Further, the middle mounting position 30*b* may allow the furrow opener disc 305 to run approximately one and a half inches deep with respect to the field surface and, as previously discussed, the bottom mounting position 30*c* may allow the furrow opener disc 305 to run approximately two inches deep in the soil with respect to the field surface.

One embodiment set forth in FIG. 24 illustrates the trailing furrow closer wheel 315 mounted in the bottom mounting position of the back or trailing end 370 of the lever arm 335. In FIG. 24, the trailing furrow closer wheel 315 is also pivotally coupled to the lever arm 335 via a pivot pin 375. By mounting the trailing furrow closer wheel 315 in the bottom mounting position of the lever arm 335, the bottom mounting position on the lever arm 335 may allow the furrow opener disc 305 to run approximately two inches deep in the soil.

Moreover, as depicted in FIG. 24, fertilizer furrow opener disc 305 may be pivotally coupled to the front or leading end 345 of the lever arm 335 via a pivot pin 350. The fertilizer deposit tube 330 may be located in the middle portion of the lever arm 335 and the fertilizer tube 365 may extend downwardly from the fertilizer deposit tube 330.

Similar to FIG. 24, FIGS. 25 and 26 illustrate the trailing furrow closer wheel 315 in different mounting positions on the lever arm 335. For example, FIG. 25 depicts that the trailing furrow closer wheel 315 may be mounted in the approximately middle mounting position of the back or trailing end 370 of the lever arm 335. Similar to FIG. 24, the trailing furrow closer wheel 315 of FIG. 25 may be pivotally coupled to the lever arm 335 via a pivot pin 375. Additionally, FIG. 26 depicts the trailing furrow closer wheel 315 mounted in the top mounting position on the lever arm 335. Also, similar to FIGS. 24 and 25, the trailing furrow closer wheel 315 of FIG. 26 may pivotally couple to the back or trailing end 370 of the lever arm 335.

In a further embodiment illustrated in FIGS. 27-29, the furrow closer wheel 715 may be pivotally coupled to the front or leading end 745 of the lever 735. As depicted in FIGS. 27-29, the front or leading end 745 of the lever 735 includes multiple mounting positions for the furrow closer wheel 715. Also, FIGS. 27-29 are the same side views of the planter 200, with each figure illustrating a different mounting position of the furrow closer wheel 715 with respect to the lever arm 735.

As illustrated in FIGS. 27-29, the furrow opener disc 705 may be pivotally coupled to the back or the trailing end 770 of the lever arm 735. Accordingly, in this embodiment, the furrow closer wheel 715 may be pivotally coupled to the front or leading end 745 of the lever arm 735. Furthermore, the fertilizer deposit tube bracket 730 may be positioned near the back or trailing end 770 of the portion of the lever arm 735, and the fertilizer tube 765 may extend downwardly into and through the fertilizer deposit tube bracket 730, to extend into the furrow. The fertilizer tube may extend into the bracket 730 with a replaceable extension extending from the bracket into the fertilizer furrow. This would allow replacement or repair of only the end portion of the flexible tubing 365 rather than the entire tube. Further, the fertilizer deposit tube may extend downwardly through a fertilizer deposit tube bracket 730 that couples the deposit tube to the lever arm 735 slightly forward of the lever arm center pivot pin, and terminates in a flexible tubing 765, which may be separately replaceable from the rest of the deposit tube. The fertilizer deposit tube may also extend through the flexible tubing 765 and may terminate at approximately the end of the flexible tubing 765. Additionally, the fertilizer deposit tube may extend through the flexible tubing 765 and may terminate at any point within the flexible tubing 765.

Benefits of the lever arm assembly 725 where the furrow opener disc 705 may be mounted to the back or trailing end 770 of the lever arm 735, may include, but are not limited to, less side pressure on the equalizer arm and reducing the likelihood that the furrow opener disc 305 may dive down into loose soils. Further, liquids may not splash onto the planter because the high pressure fertilizer tips or nozzles may be mounted behind the furrow opener disc 705, thus placing the liquid dispersal behind the planter 200. Moreover, due to the reduced fertilizer and/or mud build up on the planter units and wheels, the planter 200 may not dog leg or pull to the side while traveling down the field.

In one embodiment described herein, the fertilizer disc is positioned at the front end of the lever arm and may be more effective in forming a furrow in harder soil, or soil which is untilled. In another embodiment described herein, the fertilizer disc is positioned at the rear end of the lever arm and may be more effective in forming a furrow in softer soil.

As shown in FIG. 27, the furrow opener disc 705 may be rotatably coupled to the back or the trailing end 770 of the lever arm 735 via a pivot pin 775 extending through the lever arm 735 at a mounting position 31*c* (see FIG. 31). Additionally, the furrow closer wheel 715 may be rotatably coupled to the front or leading end 745 of the lever arm 735 via a pivot pin 750 extending through the lever arm 735. Further, in FIG. 27, the furrow closer wheel 715 may be mounted to any of four mounting positions included on the lever arm 735 (see FIG. 31). Although four mounting positions are discussed and illustrated herein, this is done for explanatory purposes only. The lever arm 735 may include any number of mounting positions including one, two or more.

The multiple mounting positions are formed in the lever arm 735 of FIGS. 27-29 in a mounting bracket. In FIG. 30, three are shown, and as depicted in FIG. 31, the lever arm 735 may have four mounting positions. In FIG. 31, the top mounting position 31*a* may allow the furrow opener disc 705 to run approximately a half inch deep into the soil with respect to the field surface. Further, the middle mounting position 31b may allow the furrow opener disc 705 to run approximately one inch deep in the soil with respect to the field surface and the mounting position 31d may allow the furrow opener disc 705 to run approximately one and a half inches deep in the soil with respect to the field surface. Also, the bottom mounting position 31c may allow the furrow opener disc 705 to run approximately two inches deep in the soil with respect to the field surface. These one half inch increments are variable depending on the depth desired for the fertilizer furrow. By running the furrow opener disc 705 deeper in the soil, the fertilizer also may be deposited deeper into the soil.

Similar to FIG. 27, in FIGS. 28 and 29, the furrow opener disc 705 may be pivotally coupled to the back or trailing end 770 of the lever arm 735. In FIGS. 28 and 29, the furrow closer wheel 715 may also be pivotally coupled to the front or leading end 745 of the lever arm 735. As depicted in FIG. 28, the furrow closer wheel 715 may be mounted in the mounting position 31d and in FIG. 29; the furrow closer wheel 715 may be mounted in the mounting position 31a on the lever arm 735. Furthermore, the fertilizer deposit tube bracket 730 may be located toward the back or trailing end 770 of the lever arm 735 and the fertilizer tube 765 may extend downwardly from the fertilizer deposit tube 730, as mentioned above.

On occasion, the planter 200 may traverse obstructions in the field. Such obstructions may occur in no-till farming and also may include obstructions such as debris, clods and so on. By locating the furrow opener disc 705 toward the back or trailing end 770 of the lever arm 735, as the planter 200 traverses the field and encounters obstructions, the amount of build up on the furrow opener disc 705 may be minimized. Less build up may occur on the furrow opener disc 705 because as the furrow opener disc 705 is pulled over obstructions, it may upwardly rotate about the pivot. The furrow opener disc 305 will also not likely burrow down into the soil when an obstacle is encountered. Since it is being pulled, and not pushed, the disc 705 should move over the obstacle more easily.

Figure 34:
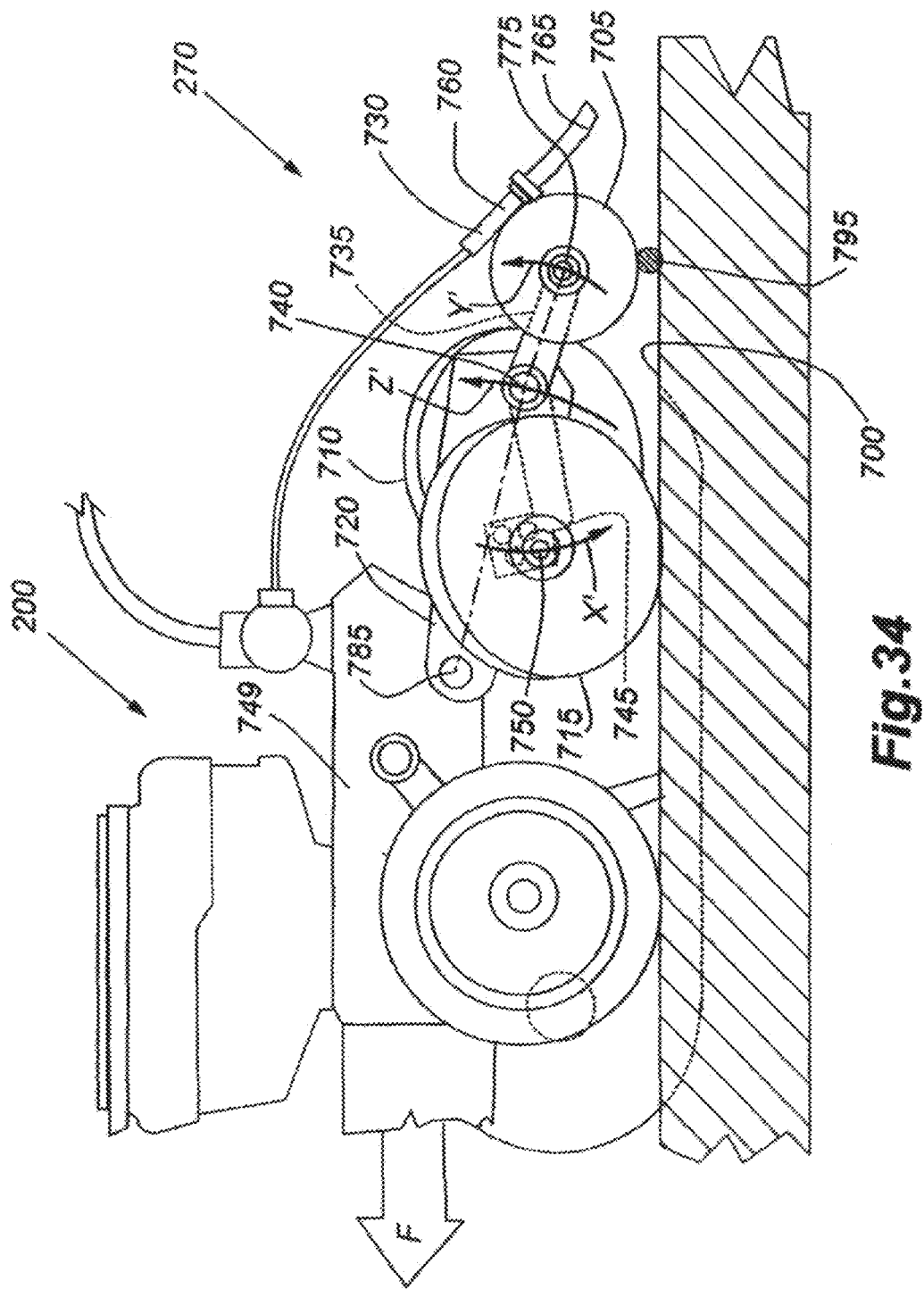

As indicated in FIGS. 32-34, the planter 200 approaches an obstruction 795, the gage wheel 765 may pivot upwardly in the direction indicated by arrow W via its lever arm 783 and relative to the lever arm pivot pin 784 to clear the obstruction 795. FIGS. 32-34 depict a similar example as previously discussed FIGS. 4-6. Thus, the progression of the furrow closer wheel 715 and the furrow opener disc 705 of FIGS. 32-34 is also similar to the previous discussion of FIGS. 4-6.

Similar to FIG. 5, the planter 200 of FIG. 33 continues in the direction of arrow F and furrow closer wheel 715 eventually encounters the obstruction 795. As the furrow closer wheel 715 travels over the obstruction 795, the planter 200 may move upwardly in two ways. First, the trailing arm frame 720 may rotate upwardly about the pivot pin 785, thus causing the entire lever arm 735, including the lever arm center pivot pin 740, to also move upwardly in the Z direction. Second, the furrow closer wheel 715 and the furrow opener disc 705 may rotate about the center pivot pin 740.

Further to the second way, the furrow closer wheel 715 and the front or leading end 745 of the lever arm 735 on which the furrow closer wheel 715 is mounted are caused to rotate upwardly about the lever arm center pivot pin 740, as indicated by arrow X. The resulting clockwise pivot of the furrow closer wheel 715 about the lever arm center pivot pin 740 causes the furrow opener disc 705 and back or trailing end 770 of the lever arm 735 to clockwise pivot about the center pivot pin 740. Thus, the furrow opener disc 705 presses harder against the field surface 700 as indicated by arrow Y and possibly forming a deeper fertilizer furrow. The downward pressure of the furrow opener disc 705 coupled with the furrow closer wheel 715 clearing the obstruction 795 causes an upward force on the lever arm center pivot pin 740, which causes the pin 740 and the trailing arm frame 720 to rotate upwardly, as indicated by arrow Z, about the pivot pin 785 attaching the trailing arm frame 720 to the planter frame 749. Due to the trailing arm frame 720 rotating upwardly as indicated by arrow Z, the closer wheel 710 also raises upwardly as it travels with the trailing arm frame 720. Once the furrow closer wheel 715 clears the obstruction 795, the trailing arm frame 720 and lever arm 735 return to normal operation as indicated in FIG. 27. However, due to the downward rotation of the furrow closer wheel 715 and the front or leading end 745 of the lever arm 735, the furrow opener disc 705 may still create a furrow 790 despite the trailing arm frame 720 moving upwardly as indicated by Z.

As illustrated in FIG. 34 (and similar to FIG. 6), as the planter 200 continues in the direction of arrow F, the furrow opener disc 705 eventually encounters the obstruction 795. In doing so, the furrow opener disc 705 and the back or trailing end 770 of the lever arm 735 on which the furrow opener disc 705 is mounted may be caused to rotate upwardly about the lever arm center pivot pin 740, as indicated by arrow Y'. The resulting counter clockwise pivot of the furrow opener disc 705 about the lever arm center pivot pin 740 causes the furrow closer wheel 715 and leading end 745 of the lever arm 735 to counter clockwise pivot about the center pivot pin 740. Thus, the furrow closer wheel 715 presses harder against the field surface 700 as indicated by arrow X'. The downward pressure of the furrow closer wheel 715 coupled with the furrow opener disc 705 clearing the obstruction 295 causes an upward force on the lever arm center pivot pin 740, which causes the pin 740 and the trailing arm frame 720 to rotate upwardly, as indicated by arrow Z', about the pivot pin 785 attaching the trailing arm frame 720 to the planter frame 749.

Due to the trailing arm frame 720 rotating upwardly as indicated by arrow Z' about the pivot pin 785, the furrow closer wheel 710 also raises upwardly as it travels with the trailing arm frame 720. Due to the lever arm 735 moving upwardly with its pivot pin 740, the bracket 760 moves along with the lever arm 735, which causes the flexible tubing 765 of the fertilizer deposit tube 730 to move upwardly. Once the furrow opener disc 705 clears the obstruction 795, the trailing arm frame 720 and lever arm 735 return to normal operation as indicated in FIG. 27. In clearing the obstacle, the opener disc 705 may or may not disengage from the soil. Since it is being pulled, and not pushed, it is less likely to burrow down into the soil.

As can be understood from FIGS. 32-34, where the leading end length of the lever arm 735 (as measured between the pivots 740, 750) is generally shorter than the trailing end length of the lever arm 735 (as measured between the pivots 740, 775), the displacement of the furrow opener disc 705 relative to the trailing arm assembly 270 in an upward direction causes a generally smaller displacement of the furrow closer wheel 715 relative to the trailing arm assembly 270 in a downward direction. For example, the furrow opener disc 705 may move upwardly three inches when the furrow closer wheel 715 moves downwardly two inches. Thus, the lever arm arrangement provides a mechanical disadvantage such that an upward force on the furrow opener disc 705 creates a greater downward force on the furrow closer wheel 715 to force the furrow closer wheel 715 into hard soil.

In one embodiment, the ratio of the leading end length of the lever arm 735 relative to the shorter trailing end length of the lever arm 735 is approximately seven to approximately five. In another embodiment, the ratio of the leading end length of the lever arm 735 relative to the shorter trailing end length of the lever arm 735 is approximately five to approximately three. Additionally, as illustrated in FIG. 31, the first segment and the second segment of lever arm 735 may form an angle such that the furrow opener disc 705 may be positioned relatively lower than the closer wheel with respect to the field surface to form a fertilizer furrow 790 in the soil. The lesser the angle "L" of FIG. 31, between the first segment and the second segment of the lever arm 735, the lower the furrow opener disc 705 may be positioned with respect to the furrow closer wheel 715. Moreover, the furrow opener disc 705 may leave a deeper fertilizer furrow 790 as the angle between the first and second segment of the lever arm 735 decreases.

Where the leading end and trailing end lengths of the lever arm 735 are not equal, the displacement of the furrow opener disc 705 relative to the trailing arm assembly 270 in an upward direction causes a generally proportional displacement of the furrow closer wheel 715 relative to the trailing arm assembly 270 in a downward direction. In other words, the displacement distances will not be equal to each other, but they will be proportionally related to each other based on the proportional relationship of the respective lengths of the leading and trailing end lengths.

In still a further embodiment of the present disclosure, as depicted in FIGS. 35-41B, a pivotable arm bracket 835 may be provided in place of the lever arm 335, 735 as described above. The pivotable arm bracket 835, as set forth in greater detail below, may serve to coordinate the relative movements of both furrow closer wheels and the fertilizer furrow opener disc, as compared to the previously described lever arm 335, 735, which only coordinates the relative movement between a single furrow closer wheel and the fertilizer furrow opener disc (the second furrow closer wheel being independent therefrom). This "three-way" coordination may be accomplished by the pivotable arm bracket 835, which has three arms extending from a middle portion, as compared to the two arms of the lever 335, 735 extending from the middle portion 340, 740 in the embodiments described above. FIG. 35 shows the arm bracket 835, and FIGS. 39A and 39B show the arm bracket 835 in use in a trailing arm assembly 270.

It may be beneficial to have the relative movement of both furrow closer wheels coordinated with one another, along with the movement of the fertilizer furrow opener disc. In particular, such coordination may result in the furrow closer wheels maintaining constant and uniform pressure, and/or equal amounts of pressure, on both sides of the seed furrow. With constant or even pressure on both furrow closing wheels, a farmer can go from no-till, firm ground to sandy or conventionally tilled ground in the same field without adjusting to the downward pressure settings. Thus, the step of resetting downward pressures in different soil types (using the adjustment lever 376 as described above with regard to FIG. 11) may be substantially reduced, making for a more efficient, expeditious overall planting process.

With reference now to FIGS. 35 and 36 in particular, the pivotable arm bracket 835 may include three arm portions extending from a central hub or middle portion 840. Specifically, extending from the middle portion 840 may be a first furrow closer wheel arm 836, a furrow opener disc arm 837, and a second furrow closer wheel arm 838. The first furrow closer wheel arm 836 may be configured to pivotably receive a furrow closer wheel at a mounting end 845 thereof, using a pivot pin 850. The first furrow closer wheel arm 836 may be connected to the middle portion 840 at an end opposite the mounting end 845. The furrow opener disc arm 837 may be configured to pivotably receive a furrow opener disc at a mounting end 870 thereof, using a pivot pin inserted in one of several (three shown in FIG. 35) mounting positions 41a-41c. The first furrow closer wheel arm 837 may be connected to the middle portion 840 at an end opposite the mounting end 870. The second furrow closer wheel arm 838 may be configured to pivotably receive a furrow closer wheel at a mounting end 846 thereof, using a pivot pin 851. The second furrow closer wheel arm 838 may be connected to the middle portion 840 at an end opposite the mounting end 846.

In general, arms 836, 837, 838 may be rectangular in shape, with the length dimension being substantially longer than either the width or height dimensions. Of course, other shapes are possible, such as cylindrical, polygonal, etc. The arms 836, 837, 838 may be substantially uniform (straight) along their length, or they may be slightly irregular, with various bends or curves, as shown in FIG. 35. The overall shape of arms 836, 837, 838 need not be consistent with one another. The arms 836, 837, 838 may be rigidly affixed, connected, or secured to the middle portion. That is, for example, the arms 836, 837, 838 may be welded to the middle portion, or the arms 836, 837, 838 may be molded therewith to form a single piece. As such, the motion of one arm relative to the middle portion may cause corresponding motion in each of the other arms. Other rigid type connections may also be provided.

The middle portion 840 may be provided as a cylinder with a hollow bore 844 extending therethrough. In other embodiments, the middle portion 840 may be provided in other shapes, for example, rectangular, polygonal, etc. The hollow bore 844 may be adapted to receive a pivot sleeve 841 that allows the middle portion 840 (and consequently the entire arm bracket 835) to be pivotably connected with the trailing arm frame 320, in the manner discussed above with regard to the connection between the lever arm 335, 725 and the trailing arm frame 320. The middle portion 840 may be securely and pivotably connected to the trailing arm frame by means of a bolt 842 extending through the pivot sleeve 841, the bolt 842 secured in place by a nut 843. Other pivotable fastening mechanisms or devices may also be used.

With reference to FIG. 35, the first furrow closer wheel arm 836 may be provided on a generally opposite side of the middle portion 840 from the fertilizer furrow opener disc arm 837 and the second furrow closer wheel arm 838. However, the geometric relationship between the first furrow closer wheel arm and the other two arms 837, 838 may or may not be linear. The fertilizer furrow opener disc arm 837 and the second furrow closer wheel arm 838 may be parallel to one another or an angular relationship may be provided. For example, an angle L1 may define the angle between the first furrow closer wheel arm 836 and the fertilizer furrow opener disc arm 837, and an angle L2 may define the angle between the first furrow closer wheel arm 836 and the second furrow closer wheel arm 838. Angles L1, L2, for example, may range from 150 degrees to 210 degrees, 160 to 200 degrees, 160 to 180 degrees, or 170 to 180 degrees. Other angles may also be used and may be selected to provide suitable relationships between the furrow closer wheels and the furrow opener disc. Thus, the angle between the fertilizer furrow opener disc arm 837 and the second furrow closer wheel arm 838 may be approximately 360 degrees minus the sum of L1 and L2. Such angle, for example, may be 5, 10, 15, 20 degrees, etc.

Mounting ends 845, 846 may be tilted at an angle (L3, L4, respectively) offset from vertical (a reference vertical axis for angles L3, L4 is shown in FIG. 35), as described above with regard to the level arm 335, 735. Such angles L3, L4 (which need not be the same for both mounting ends 845, 846) may be 0, 5, 10, 15, 20, 25 degrees, or any angle therebetween, etc. The angles need not be in increments of 5 and may be larger or smaller than the angles provided. Any suitable angle may be selected. The angle L3, L4 at which the mounting ends 845, 846 are offset from vertical causes the furrow closer wheels, when mounted thereto, to be offset from vertical to a respective like degree (see FIGS. 40A-40B, for example). The mounting end 870 of the furrow disc arm is typically vertical or close to vertical to allow the fertilizer furrow opener disc to furrow straight down into the field. Of course, variations are possible where the mounting end 870 may be angled as with ends 845, 846.

Figure 38A:
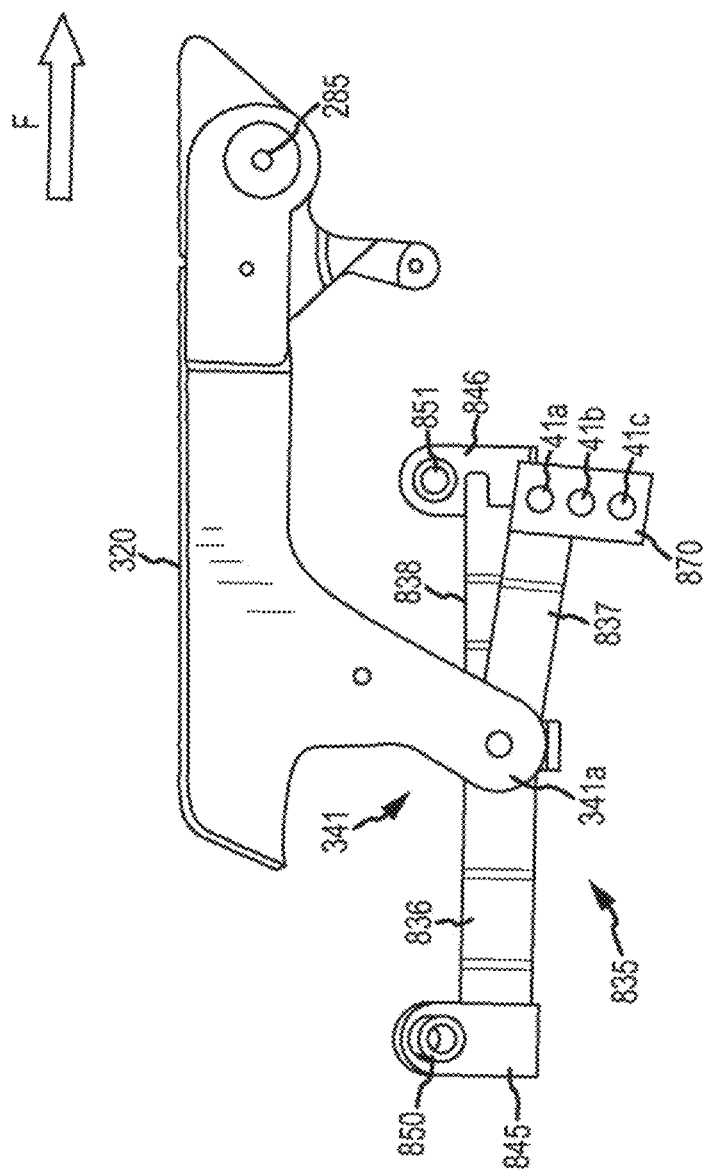
FIGS. 38A and 38B are right and left side views of a pivotable arm bracket connected to the trailing arm frame, FIG. 38A showing the pivotable arm bracket connected such that the fertilizer furrow opener disc is in a leading position and FIG. 38B showing the connection for a trailing position.
Figure 38B:
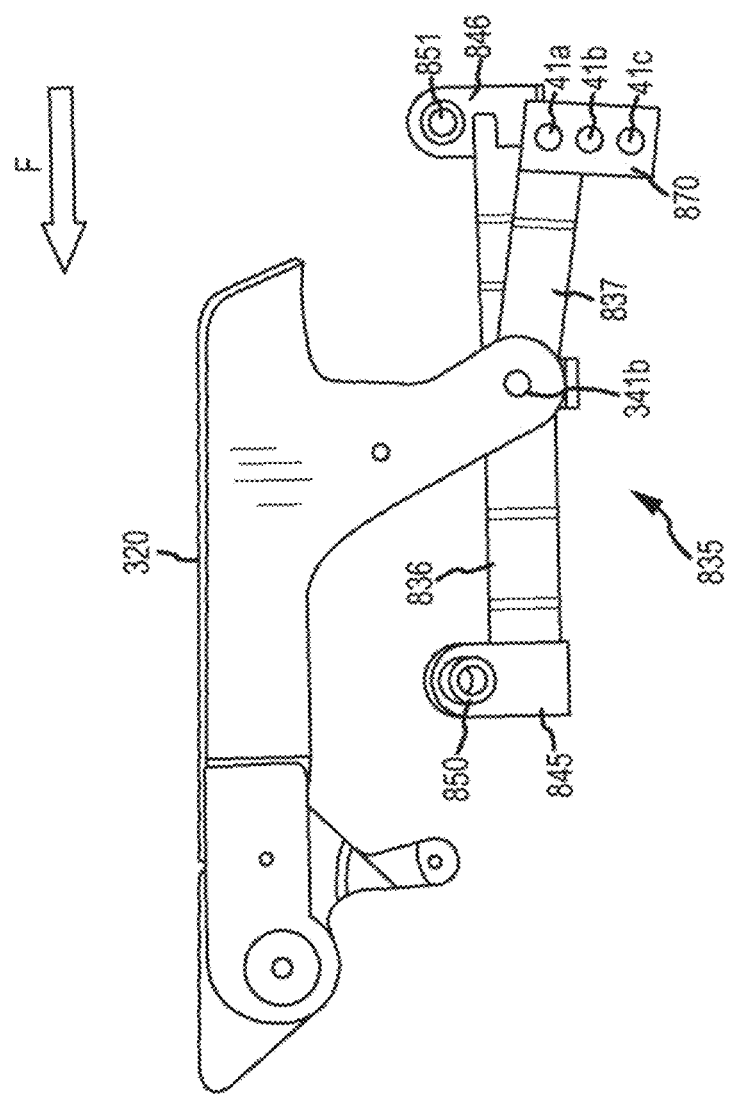

FIGS. 38A and 38B show the arm bracket 835 pivotably connected to the trailing arm frame 320. An arm bracket connection portion 341 of the trailing arm frame 320 may extend downwardly from the body of the frame 320 to meet with the middle portion 840 (not visible) of the arm bracket 835. The connection portion 341 may have two identical sides 341a, 341b (only one side being visible in each FIGS. 38A and 38B), with the distance therebetween being substantially equal to the width of the middle portion 840, such that the middle portion 840 may be inserted securely and snugly between the connection portion sides 341a, 341b. The bolt 842 and nut 843 assembly may be inserted through the hollow bore 844 (and pivot sleeve 841 positioned therein) and through both sides 341a, 341b of the connection portion, thereby securely and pivotably connecting the arm bracket 835 to the trailing arm frame 320. Other fastening mechanisms or devices may also be used to secure the arm bracket 835 to the trailing arm frame 320.

A particular feature of the arm bracket 835 is that it can be connected to the trailing arm frame 320 in two orientations. In a first orientation, the fertilizer furrow opener arm 837 is in a forward position (FIG. 38A, arrow F indicating the forward movement of the planter 200). In a second orientation, the fertilizer furrow opener arm 837 is in a rearward position (FIG. 38B). The two orientations may be made possible, in part, by the cylinder of the middle portion 840 being made identical on both sides—that is, the arm bracket 835 described may be connected to the trailing arm frame 320 so that either side of the middle portion 840 is adjacent to either side 341a, 341b of the connection portion 341. FIGS. 38A and 38B show each of these orientations. To switch from one orientation to another, the farmer or other user may simply remove the bolt 842 and nut 843 assembly from the middle portion 840 and sides 341a, 341b, rotate the arm bracket 180 degrees about its vertical axis (axis A shown in FIG. 35), and then re-insert the bolt 842 and nut 843 assembly.

Figure 40A:
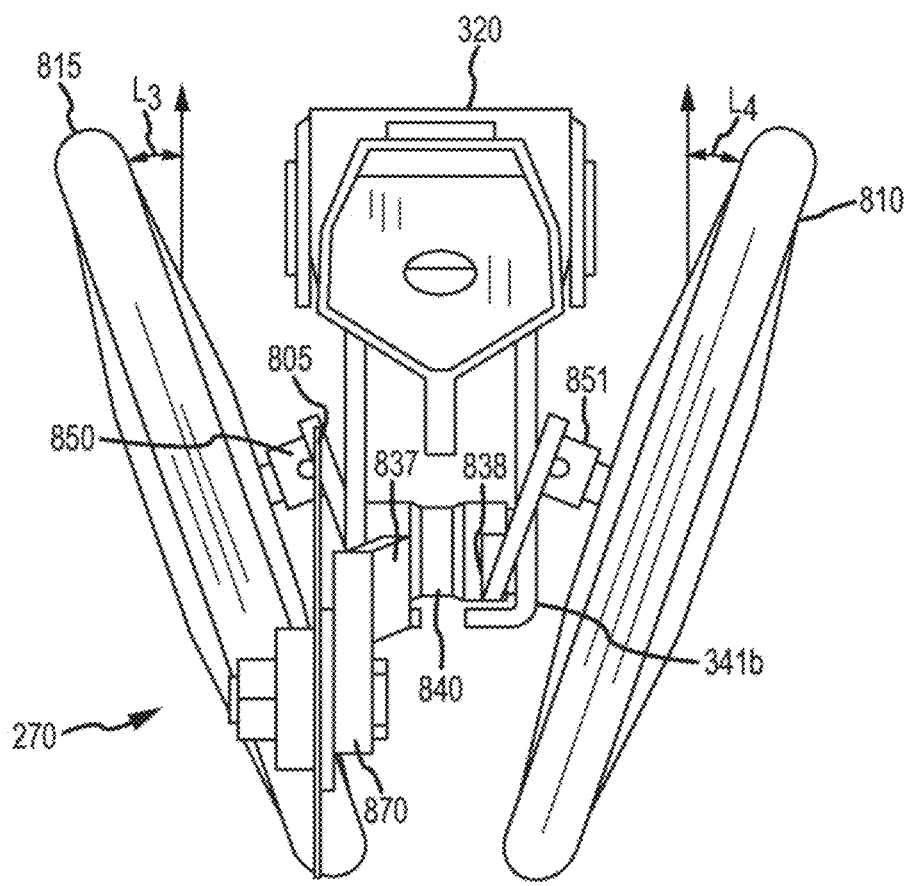
FIGS. 40A and 40B are front and rear views, respectively, of a trailing arm assembly, FIG. 40A showing the pivotable arm bracket connected to the trailing arm frame such that the fertilizer furrow opener disc is in a leading position and FIG. 40B showing the connection for a trailing position.
Figure 40B:
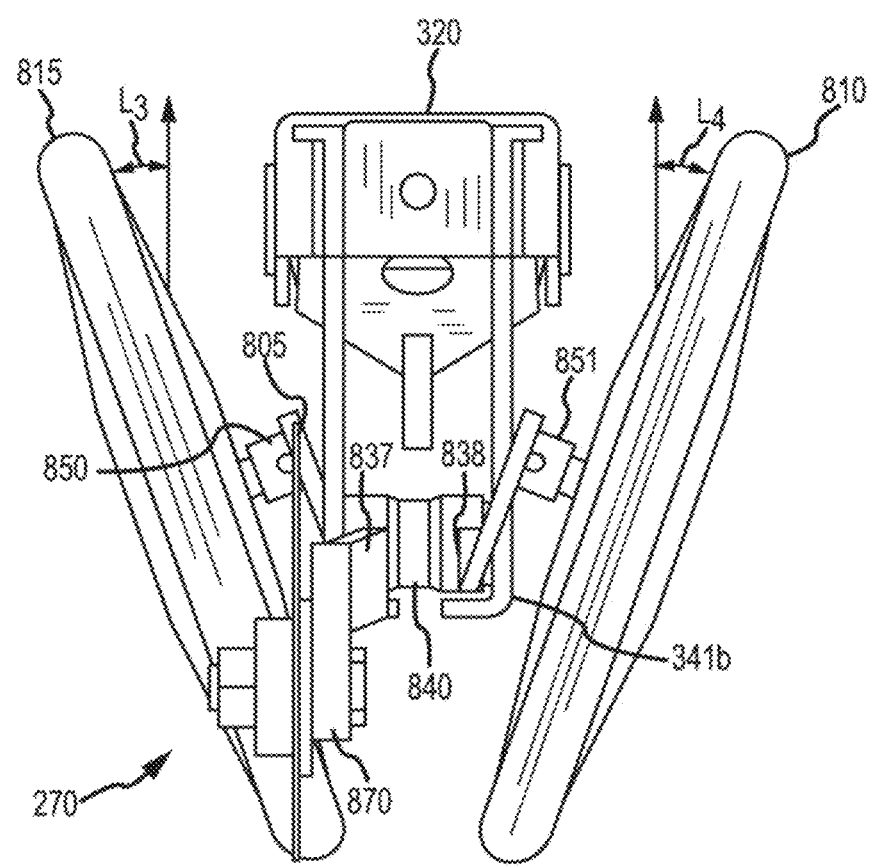
Figure 41A:
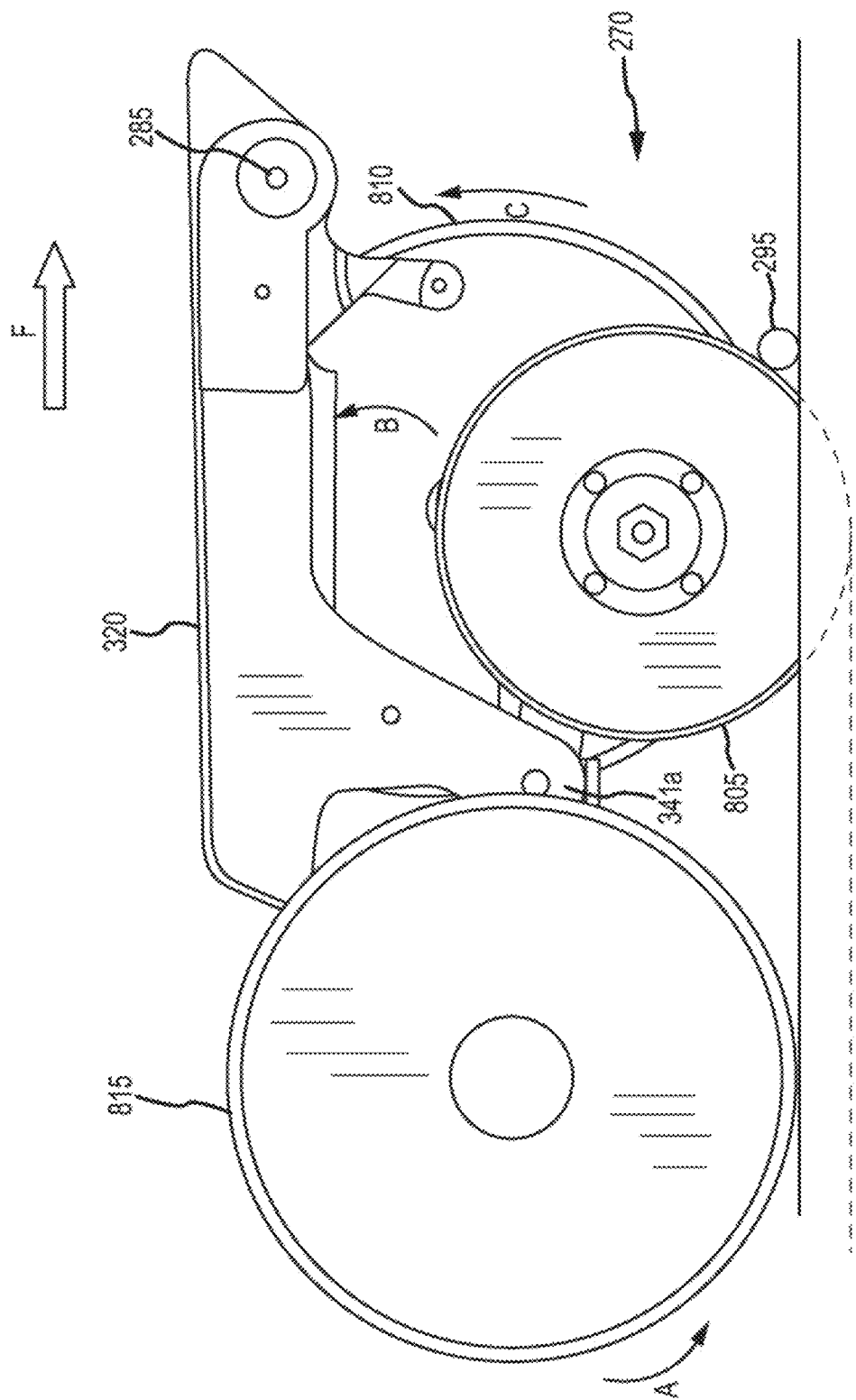
FIGS. 41A and 41B are right and left side views, respectively, of a trailing arm assembly, FIG. 41A showing the pivotable arm bracket connected to the trailing arm frame such that the fertilizer furrow opener disc is in a leading position and FIG. 41B showing the connection for a trailing position.
Figure 41B:
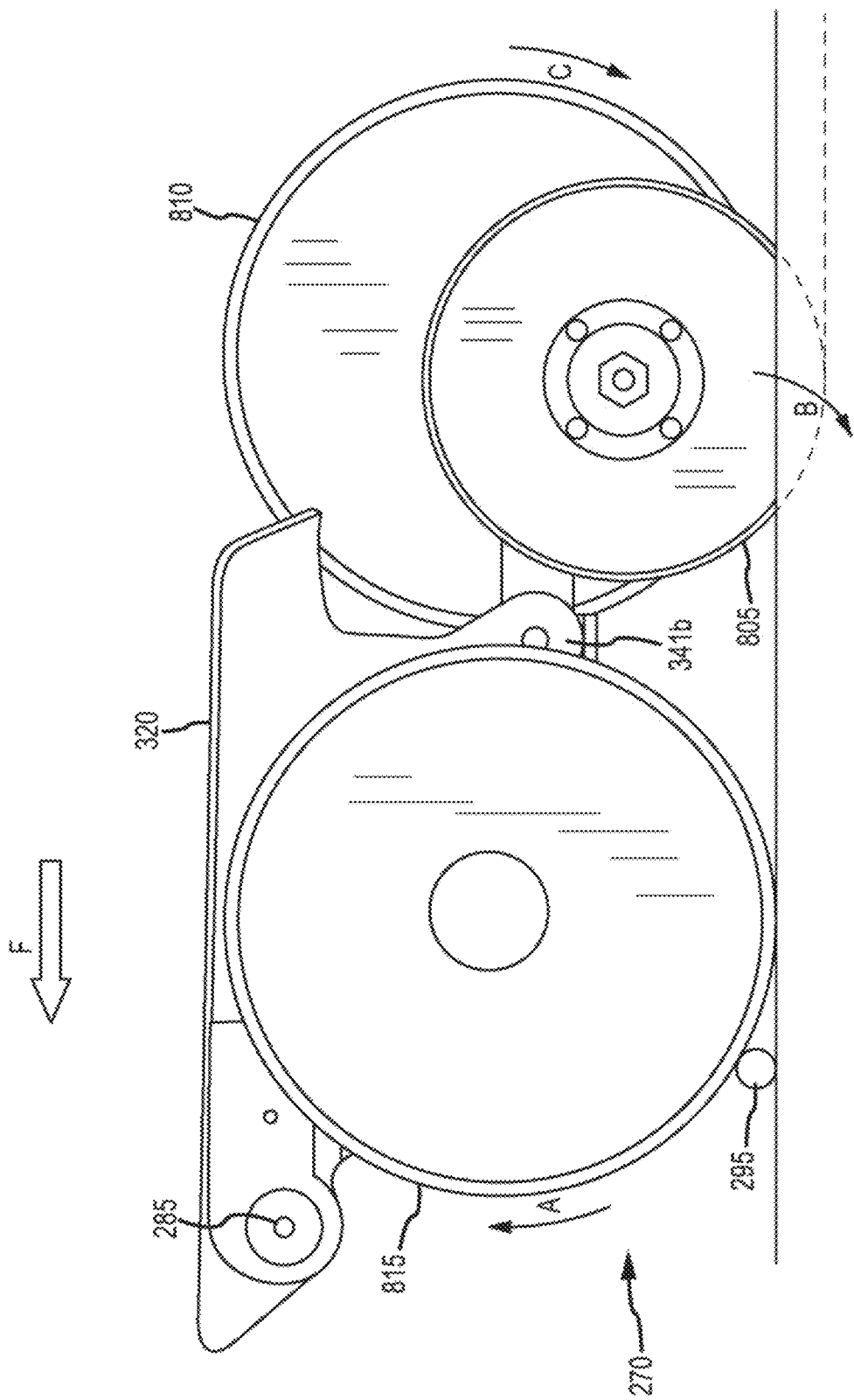

FIGS. 39A and 39B (in isometric views), FIGS. 40A and 40B (in front an rear views), and FIGS. 41A and 41B (in right and left side views) illustrate the two orientations of FIGS. 38A, 38B, but with a fully assembled trailing arm assembly 270, which also includes a first furrow closer wheel 815, a second furrow closer wheel 810, and a fertilizer furrow opener disc 805. The wheels 815, 810 are shown pivotably connected to their respective arm 836, 838, at mounting ends 845, 846. The orientation of FIG. 38A, with the fertilizer furrow opener arm 837 in the forward position, results, when the trailing arm assembly 270 is fully assembled (FIGS. 39A, 40A, and 41A), in an "out-the-front" fertilizer placement, as disclosed in FIGS. 3-8, 11-19, and 24-26, above. Conversely, the orientation of FIG. 38B, with the fertilizer furrow opener arm 837 in the rearward position, when the trailing arm assembly 270 is fully assembled (FIGS. 39B, 40B, and 41B), will result in an "out-the-back" fertilizer placement, as disclosed in FIGS. 27-29 and 32-34, above. Thus, a single pivotable arm bracket 835 is capable of being used in two fertilizing orientations.

Out-the-back fertilizer orientations may generally be used for softer soil conditions, and out-the-front fertilizer orientations may work better in firmer soil conditions. Furthermore, under some conditions, it is occasionally encountered that the fertilizer furrow opener disc does not seal as well in an out-the-back orientation as it does in an out-the-front configuration. Thus, in general, different soil types, moisture conditions, and so on in different fields can make for better placement of fertilizer either out-the-back or out-the-front, depending on what types of soil or planting conditions are present. Arm bracket 835 may allow a farmer or other user to employ a single component on the planter 200, with the ability to easily change orientations (e.g., by rotating the arm bracket 835) as soil conditions dictate.

With reference now to the operation of a planter configured with the arm bracket 835, as shown in FIGS. 41A and 41B, the planter may occasionally encounter a rock or other field impediment 295 during normal operation. In an out-the-front fertilizing configuration, as shown in FIG. 41A, the second furrow closer wheel 810, the fertilizer furrow opener disc 805, or both may first encounter the impediment 295 as the planter 200 moves in a forward direction, indicated by arrow F. The impediment may cause both the wheel 810 and the disc 805 to rotate counterclockwise upwardly (resulting in softer contact with the field surface), as indicated by arrows B and C, with rotation occurring about the pivot point at middle portion 840. Since the wheel 810 and disc 805 are both "tied" to one another because of their mutual connection to middle portion 840, even if only one of either the wheel 810 or the disc 805 hits the impediment 295, both may be caused to rotate. At the same time, because of the upward counterclockwise rotation of wheel 810 and disc 805, the second furrow closer wheel 815 may be caused to rotate counterclockwise downwardly (resulting in harder contact with the field surface), also about the pivot point at middle portion 840 and as indicated by arrow A, by its connection to middle portion 840.

In contrast, in an out-the-back fertilizing configuration, as shown in FIG. 42B, first furrow closer wheel 815 may first encounter the impediment 295 as the planter 200 moves in the forward direction, indicated by arrow F. The impediment 295 may cause the wheel 815 to rotate counterclockwise upwardly (resulting in softer contact with the field surface), as indicated by arrow A, with rotation occurring about the pivot point at middle portion 840. At the same time, because of the upward counterclockwise rotation of wheel 815, the second furrow closer wheel 810 and fertilizer furrow opener disc 805 may be caused to rotate counterclockwise downwardly (resulting in harder contact with the field surface), also about the pivot point at middle portion 840 and as indicated by arrows B and C, because of their mutual connection to middle portion 840.

As the planter continues over the impediment 295, the arm bracket 835 will be caused to rotate or pivot in the same manner as described above with regard to FIGS. 5-6 (for the out-the-front fertilizer configuration) and FIGS. 33-34 (for the out-the-back fertilizer configuration), except, however, that as the second furrow closer wheel 810 is also connected to the middle portion 840 of the arm bracket 835, and therefore is effectively tied to the movements of the first furrow closer wheel 815 and the fertilizer furrow opener disc 805, the wheel 810 will move in the same manner as disc 805, to which it is adjacent (i.e., on the same side of the middle portion 840). In contrast, in FIGS. 5-6 and FIGS. 33-34, the wheel 310, 710 is not caused to rotate about the middle portion 840 pivot point when the wheel 315, 715 and the disc 305, 705 of the lever arm 335, 735 rotate and pivot as a result of encountering the impediment 295. In those embodiments, the wheel 310, 710 is independent of the lever arm 335, 735 (and in fact is connected to the trailing arm frame 320 at the pivot point), whereas in the present embodiment, the wheel 810 is "tied" to the wheel 815 and disc 805 because of their mutual connection to the middle portion 840.

FIGS. 42-45 show various views of the arm bracket 835. With reference to FIG. 42, the first furrow closer wheel arm 836 and the second furrow closer wheel arm 838 may be located at substantially the same elevation with each having central longitudinal axes that are contained with a common horizontal plane. The fertilizer furrow opener disc arm 837 may have a central longitudinal axis that is contained within a plane that defines an acute angle with the horizontal plane containing the central longitudinal axes of the first and second furrow closer wheel arms 836, 838. In some embodiments, the angle may be approximately eight degrees. However, any angle may be defined by these two planes. In other words, the fertilizer furrow opener disc arm 837 may extend downward from the middle portion 840 of the arm bracket 835 at a predefined slope relative to the first furrow closer wheel arm 836. This downward relative slope causes a lower edge of the fertilizer furrow disc arm 837 to be at a lower elevation than a lower edge of the first furrow closer wheel arm 838 along at least a portion of the lower edge of the fertilizer furrow disc arm 837.

Turning to FIGS. 43 and 44, the mounting end 846 of the second furrow closer wheel arm 838 may be joined to the second furrow closer wheel arm 838 proximate a lower portion of the mounting end 846. From this connection location, the mounting end 846 may extend away from the second furrow closer wheel arm 838 at an angle, L4, as described in more detail above. As viewed along a longitudinal axis of the second furrow closer wheel arm 838, a lower corner of the mounting end 846 may be substantially flush with a lower corner of the second furrow closer wheel arm 838. The pivot pin 851 may be sized so that at least a portion of the pivot pin 851 is received within a hole defined by the mounting end 846. Further, in some embodiments, an outer diameter of the pivot pin 851 may be approximately the same as the diameter of the hole defined by the mounting end 846. The configuration of the pivot pin 850, the mounting end 845, and the first furrow closer wheel arm 836 may be similar to the configuration of the pivot 851, the mounting end 846, and the second furrow closer wheel arm 838.

With reference to FIG. 45, the mounting end 870 of the fertilizer furrow opener disc arm 837 may include a plate or the like that is joined to the fertilizer furrow opener disc arm 837. A pair of flanges may extend from the plate. Each flange may be positioned proximate an edge of the plate and may extend along the length of the plate from top end of the plate to a bottom end of the plate. The flanges may be positioned on the same side of the plate.

FIGS. 46-49 show various views of an example of the first furrow closer wheel arm 836 for the arm bracket 835. The second furrow closer wheel arm 838 may be generally similar to the first furrow closer wheel arm 836, and thus is neither pictured nor described since the illustrations of the first furrow closer wheel arm 836 in FIGS. 46-49 and the following description of it are generally applicable to the second furrow closer wheel arm 838. With reference to FIGS. 46-49, the first furrow closer wheel arm 836 may generally include a first end portion 1800, a second end portion 1802 that is distal from the first end portion 1800, and a central portion 1804 that joins the first end portion 1800 to the second end portion 1802. The first end, second end, and central portions 1800, 1802, 1804 of the first furrow closer wheel arm 836 may be generally plate-like bodies. The first end, second end, and central portions 1800, 1802, 1804 of the first furrow closer wheel arm 836 may be formed form separate pieces of material that are suitably joined together, or may be formed from a single piece of material that is suitably cast, cut, or otherwise reshaped to define each of these three portions.

As viewed in a top or bottom plan view, a longitudinal axis of the second end portion 1802 of first furrow closer wheel arm 836 may be laterally offset from a longitudinal axis of the first end portion 1800 of the first furrow closer wheel arm 836. Such an offset may be utilized to join the first furrow closer wheel arm 836 to a middle portion 840 of the arm bracket 835 that has a length that is less than the desired offset of the furrow closer wheel from a mid-point of the middle portion 840 as located along a longitudinal axis of the middle portion 840. However, in some embodiments, the middle portion 840 of the arm bracket 835 may be sufficiently long that no offset of the longitudinal axis of the second portion 1802 of the first furrow closer wheel arm 836 from the first portion 1800 of the first furrow closer wheel arm 836 is required. When the first end portion 1800 of the first furrow closer wheel arm 836 is offset from the second end portion 1802 of the first furrow closer wheel arm 836, a longitudinal axis of the central portion 1804 may define predetermined angles with the longitudinal axes of the first and second end portions 1800, 1802.

The first end portion 1800 of the first furrow closer wheel arm 836 may be configured for attachment to the middle portion 840 of the arm bracket 835. In particular, the first end portion 1800 may include a curved or otherwise suitably shaped edge 1806 that matches at least a portion of an exterior perimeter of the middle portion 840. This suitably shaped edge 1806 of the first end portion 1800 may generally contact and abut the corresponding portion of the exterior perimeter of the middle portion 840.

The second end portion 1802 of the first furrow closer wheel arm 836 may include a stepped region where the height of the second end portion 1802 is significantly reduced. Beyond this stepped region, in a direction away from the first end portion 1800 of the first furrow closer wheel arm 836, the second end portion 1802 may include a flange-like element 1808 that cantilevers from a main body 1810 of the second end portion 1802. This flange-like element 1808 may be sized to facilitate joining the mounting end 845 for the first furrow wheel to the first furrow closer wheel arm 836 at a desired angle, L3, relative to a vertical plane defined by the first furrow closer wheel arm 836.

Figure 52:
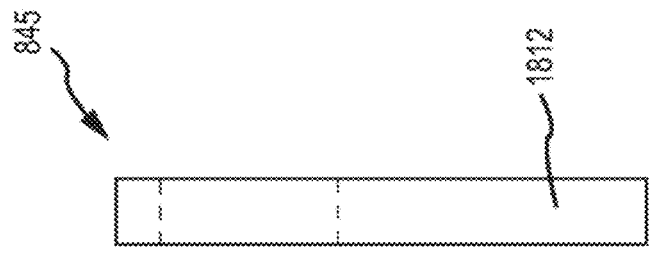
FIG. 52 shows a side elevation view of the mounting end of FIG. 50.
Figure 51:
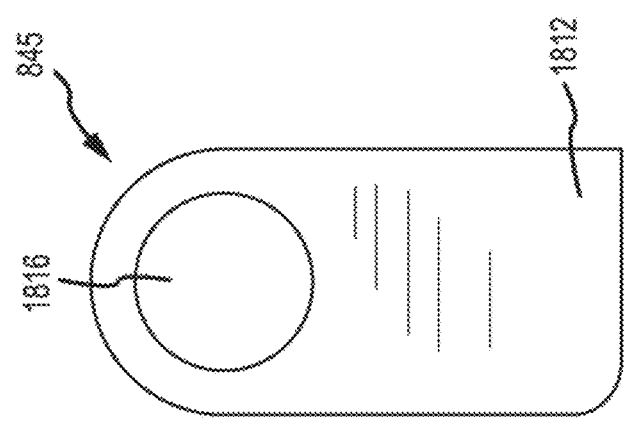
FIG. 51 shows a front elevation view of the mounting end of FIG. 50.
Figure 50:
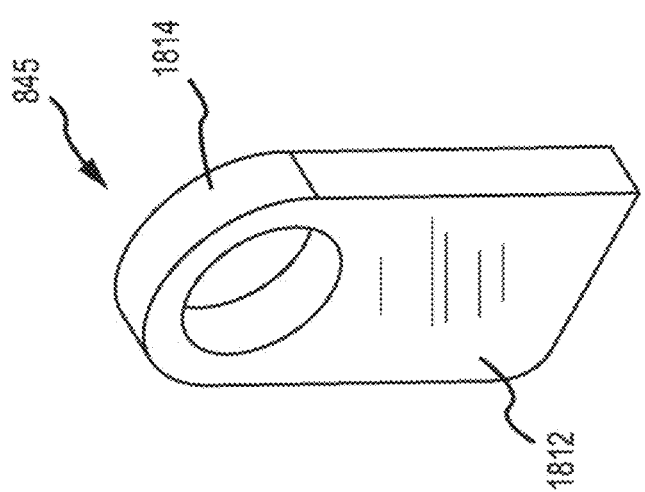
FIG. 50 shows an isometric view of a mounting end for the furrow closer wheel arm of FIG. 46.

FIGS. 50-52 show various views of an example of the mounting end 845 for first furrow closer wheel. The mounting end 846 for the second furrow closer wheel arm may be generally similar to the mounting end 845 for the first furrow closer wheel, and thus is neither pictured nor described since the illustrations of the mounting end 845 for first furrow closer wheel in FIGS. 50-52 and the following description of it are generally applicable to the mounting end 846 for second furrow closer wheel. Turning to FIGS. 50-52, the mounting end 845 for the first furrow closer wheel may be a generally rectangular shaped plate member 1812 with upper corner portions removed to define a generally curved upper edge 1814. The mounting end 845 may further include a pivot pin hole 1816 defined by the plate member 1812. The pivot pin hole 1816 may be positioned within an upper portion of the plate member 1812, may be sized to receive a pivot pin therein, and may be circular or otherwise suitably shaped for receiving the pivot pin therein. In some embodiments, the mounting end 845 for the first furrow closer wheel may have the following dimensions: a height of approximately 3 inches, a width of approximately 1.5 inches, a thickness of approximately ⅜ of an inch, and pivot pin hole diameter of approximately 1". The foregoing dimensions are merely illustrative of some potential dimensions for the mounting end 845 for the first furrow wheel closer. Accordingly, the mounting end 845 for the first furrow wheel closer may be sized using any suitable dimensions for the height, width, thickness, and hole diameter of it.

Figure 54:
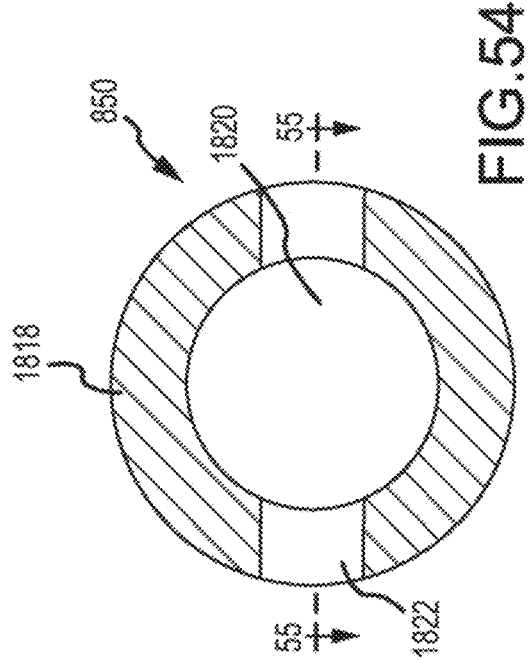
FIG. 54 shows a cross-section view of the pivot pin of FIG. 53, viewed along line 54-54 in FIG. 53.
Figure 55:
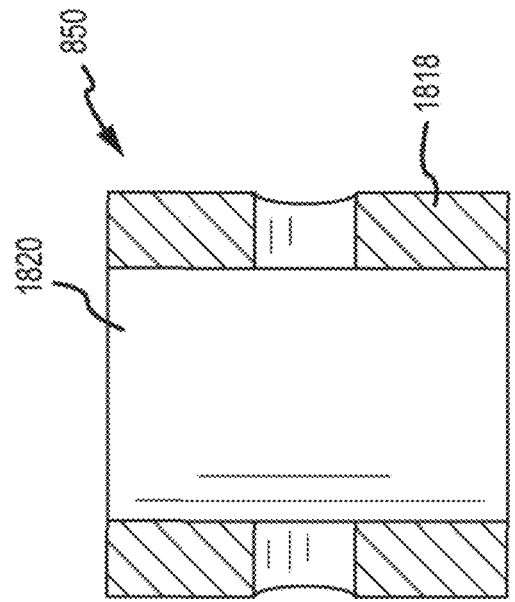
FIG. 55 shows a cross-section view of the pivot pin of FIG. 53, viewed along line 55-55 in FIG. 54.
Figure 53:
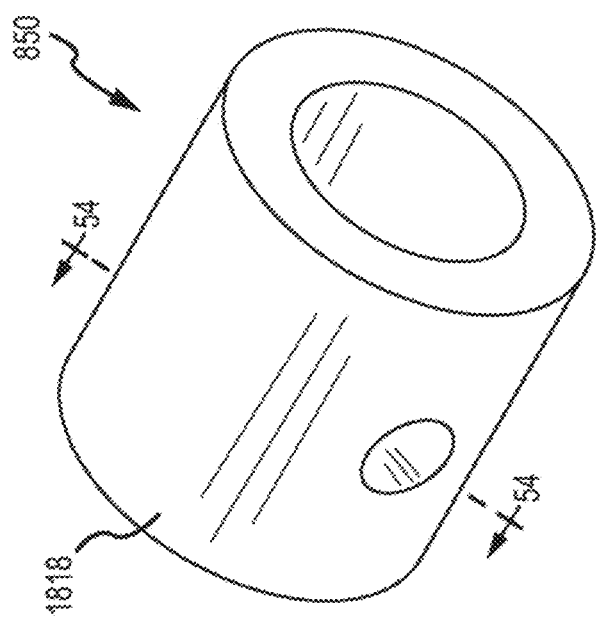
FIG. 53 shows an isometric view of a pivot pin for the mounting end of FIG. 50.
Figure 57:
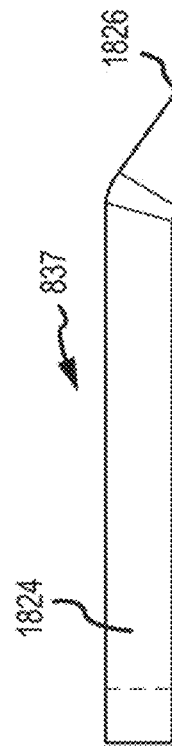
FIG. 57 shows a top plan view of the furrow opener disc arm of FIG. 56.
Figure 58:
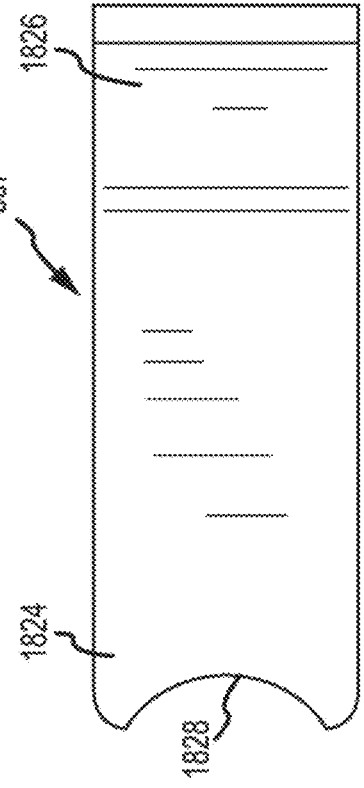
FIG. 58 shows a side elevation view of the furrow opener disc arm of FIG. 56.
Figure 59:
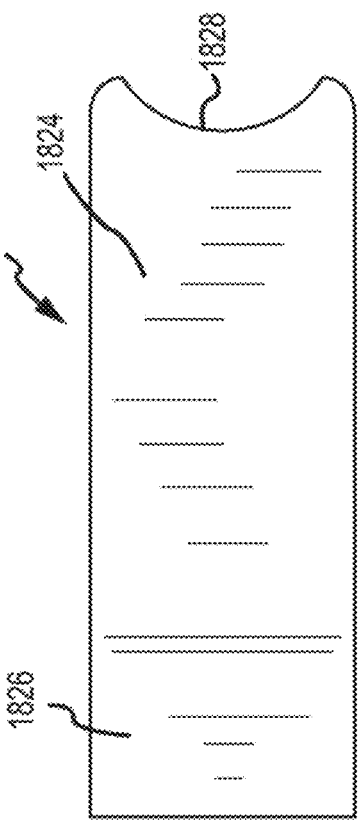
FIG. 59 shows another side elevation view of the furrow opener disc arm of FIG. 56.
Figure 56:
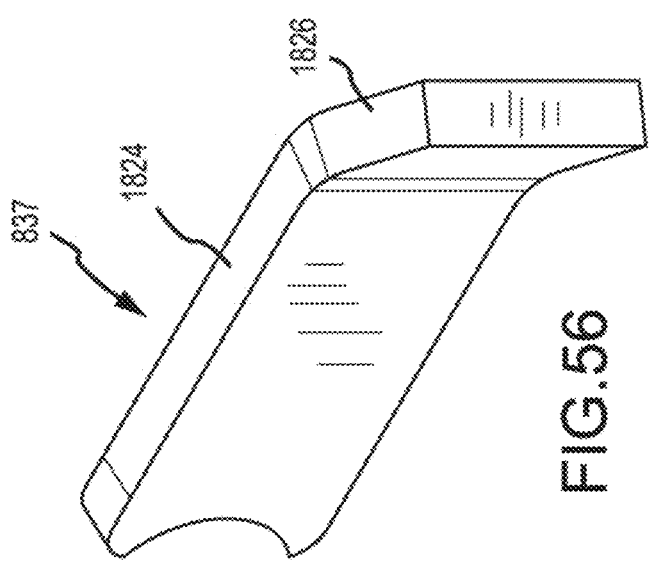
FIG. 56 shows an isometric view of a furrow opener disc arm for the arm bracket of FIG. 42.

FIGS. 53-55 show various views of an example of the pivot pin 850 for first furrow closer wheel. The pivot pin 851 for the second furrow closer wheel may be generally similar to the pivot pin 850 for the first furrow closer wheel, and thus is neither pictured nor described since the illustrations of the pivot pin 850 for first furrow closer wheel in FIGS. 53-55 and the following description of it are generally applicable to the pivot pin 851 for second furrow closer wheel. With reference to FIGS. 53-55, the pivot pin 850 may be a generally cylindrical body 1818 that defines a central hole 1820 that extends along a longitudinal axis of the pivot pin 860. The central hole 1820 may be generally circular along its axial dimension and may be sized to receive an axle or other shaft for the first furrow closer wheel. A pair of pin holes 1822 may further be defined in the pivot pin's cylindrical body 1818. The pin holes 1822 may be generally circular along an axial dimension, may be co-axially aligned on opposite sides of the cylindrical body 1818, and may have axial axes that are generally transverse to an axial axis of the central hole 1820. The pin holes 1822 may be further configured to receive a pin, such as a roll pin or the like. The pin may be used to secure to axle for the first furrow closer wheel to the pivot pin 850 for the first furrow closer wheel. In some embodiments, the pivot pin 850 may have the following dimensions: an axial dimension of approximately 19/20 of an inch, an outer diameter of approximately 1 inch, a central hole diameter of approximately ⅝ of an inch, and pin hole diameters of approximately ¼ of an inch. Further, the center of the pin holes 1822 may be positioned approximately halfway along the axial dimension of the pivot pin 850 as measured from an end of the pivot pin 850. The foregoing dimensions are merely illustrative of some potential dimensions for the pivot pin 850 for the first furrow wheel closer. Accordingly, the pivot pin 850 for the first furrow wheel closer may be sized using any suitable dimensions for the axial dimension, outer diameter, central hole diameter, and pin hole diameters and locations.

FIGS. 56-59 show various views of an example of the fertilizer furrow opener disc arm 837 for the arm bracket 835. With reference to FIGS. 56-59, the fertilizer furrow opener disc arm 837 may generally include a first portion 1824 joined to a second portion. The first and second portions 1824, 1826 of the fertilizer furrow opener disc arm 837 may be generally plate-like bodies. The first and second portions 1824, 1826 of the fertilizer furrow opener disc arm 837 may be formed form separate pieces of material that are suitably joined together, or may be formed from a single piece of material that is suitably cast, cut, or otherwise reshaped to define each of these two portions.

As viewed in a top or bottom plan view, a longitudinal axis of the second portion 1826 of fertilizer furrow opener disc arm 837 may define an acute angle with a longitudinal axis of the first portion 1824 of the fertilizer furrow opener disc arm 837. Such angling of the second portion 1826 to the first portion 1824 may be utilized to laterally offset the mounting end 870 of the fertilizer furrow opener disc arm 837 from an end of the middle portion 840 when the middle portion 840 has a length that is less than the desired offset of the fertilizer furrow opener disc from a mid-point of the middle portion 840 as located along a longitudinal axis of the middle portion 840. However, in some embodiments, the middle portion 840 of the arm bracket 835 may be sufficiently long that no offset of an end of second portion 1826 of the fertilizer furrow opener disc arm 837 from the end of first portion 1824 of the fertilizer furrow opener disc arm 837 that is joined to the middle portion 840 is required.

The first portion 1824 of the fertilizer furrow opener disc arm 837 may be configured for attachment to the middle portion 840 of the arm bracket 835. In particular, the first portion 1824 may include a curved or otherwise suitably shaped edge 1828 that matches at least a portion of an exterior perimeter of the middle portion 840. This suitably shaped edge 1828 of the first portion 1824 may generally contact and abut the corresponding portion of the exterior perimeter of the middle portion 840.

Figure 62:
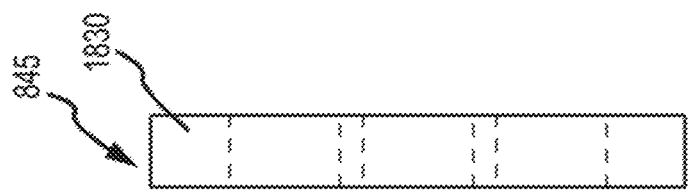
FIG. 62 shows a side elevation view of the mounting end of FIG. 60
Figure 61:
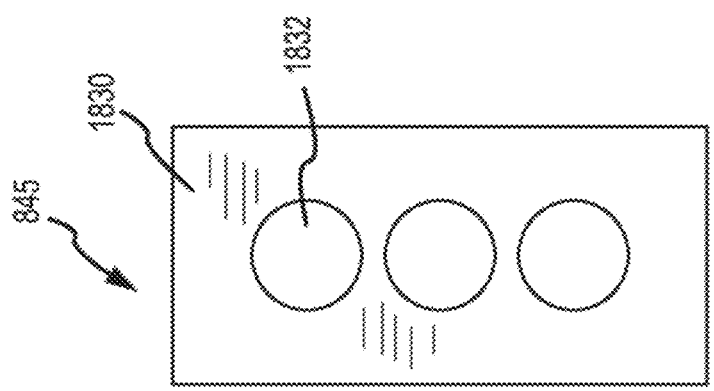
FIG. 61 shows a front elevation view of the mounting end of FIG. 60.
Figure 60:
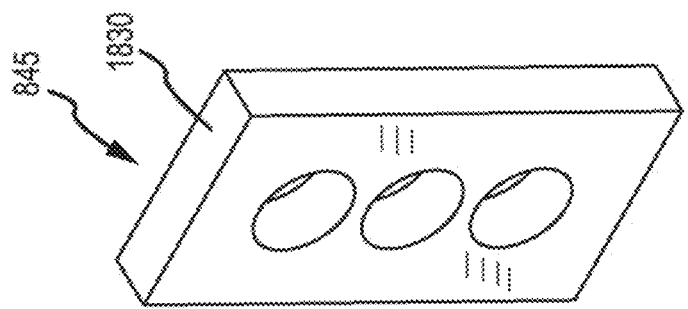
FIG. 60 shows an isometric view of a mounting end for the furrow opener disc arm of FIG. 56.

FIGS. 60-62 show various views of an example of the mounting end 870 for fertilizer furrow disc opener. With reference to FIGS. 60-62, the mounting end 870 for the fertilizer furrow disc opener may be a generally rectangular shaped plate member 1830. The mounting end 845 may further include one or more fertilizer disc holes 1832 defined by the plate member 1830. Three fertilizer disc holes 1832 are defined by the plate member 1830. However, more or less than fertilizer disc holes 1832 may be defined. Generally, more fertilizer disc holes 1832 provide for a greater range of potential furrow depths that can be created in the soil by the fertilizer furrow disc opener. Each fertilizer disc hole 1832 may be sized to receive a fastener, such as a bolt or the like, therein, and may be circular or otherwise suitably shaped for receiving the fastener therein. In some embodiments, the mounting end 870 for the fertilizer furrow disc opener may have the following dimensions: a height of approximately 3 inches, a width of approximately 1.5 inches, a thickness of approximately ⅜ of an inch, and fertilizer disc hole diameters of approximately ⅝ of an inch. The foregoing dimensions are merely illustrative of some potential dimensions for the mounting end 870 for the fertilizer furrow disc opener. Accordingly, the mounting end 870 for the fertilizer furrow disc opener may be sized using any suitable dimensions for the height, width, thickness, and hole diameters of it.

Figure 64:
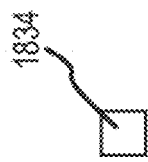
FIG. 64 shows a top plan view of the flange of FIG. 63.
Figure 65:
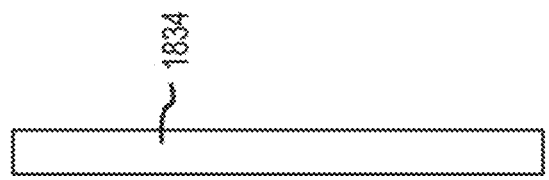
FIG. 65 shows a front elevation view of the flange of FIG. 65.
Figure 63:
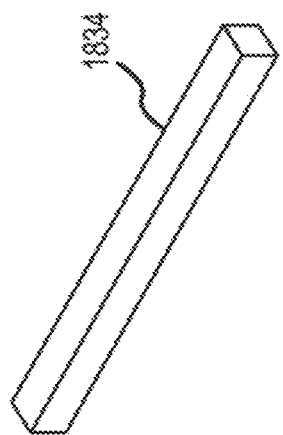
FIG. 63 shows an isometric view of a flange for the mounting end of FIG. 60.

FIGS. 63-65 depict various views of one of the flanges 1834 of the mounting end 870 for the fertilizer furrow disc opener. Each flange 1834 may be a generally rectangular prism bar or any other suitable shaped bar. Generally, each flange 1834 may be elongated or otherwise have a length dimension that is relatively sufficiently greater than its width or thickness dimensions. In some embodiments, each flange may have the following dimensions: a height of approximately 3 inches, a width of approximately ¼ of an inch, a thickness of approximately ¼ of an inch. The foregoing dimensions are merely illustrative of some potential dimensions for each flange. Accordingly, each flange may be sized using any suitable dimensions for the height, width, and thickness of it.

The arm bracket 835 may include any of the additional components of the planter as described above with regard to the previous embodiments (e.g., with regard to the lever arm 335, 735). For example, the arm bracket 835 may include a fertilizer tube in any of the configurations described in FIGS. 20-23, etc., and positioned with respect to the fertilizer furrow opener disc 805 as shown in FIGS. 3-8 or FIGS. 27-34, etc.

Figure 66:
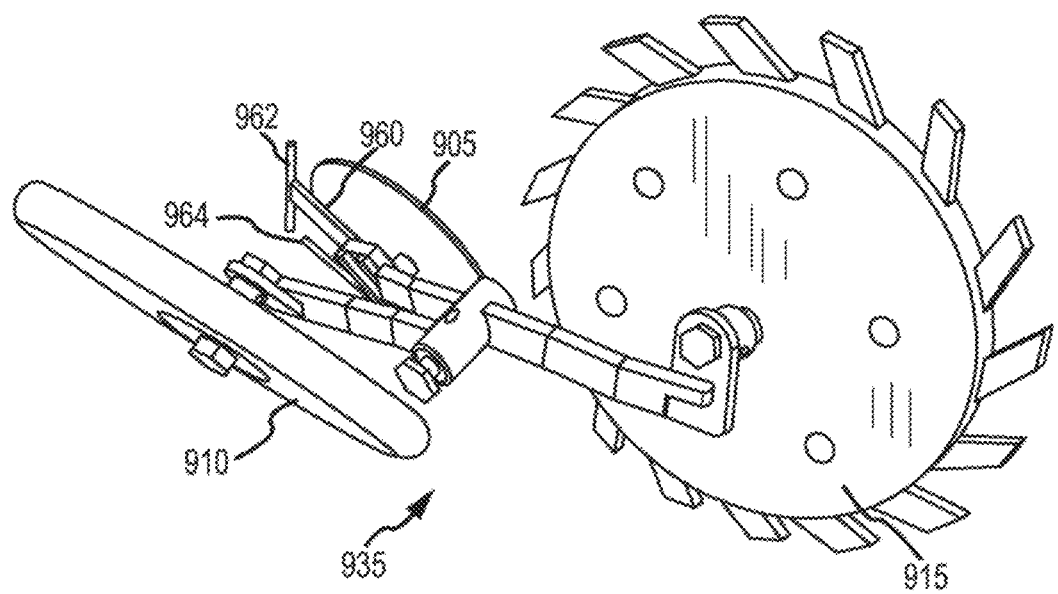
FIGS. 66-68 are several perspective views of one embodiment of a pivotable arm bracket including an arm bracket and sleeve, a smooth surface closing wheel, a toothed or cleated closing wheel, and a fertilizer furrow forming disc.
Figure 67:
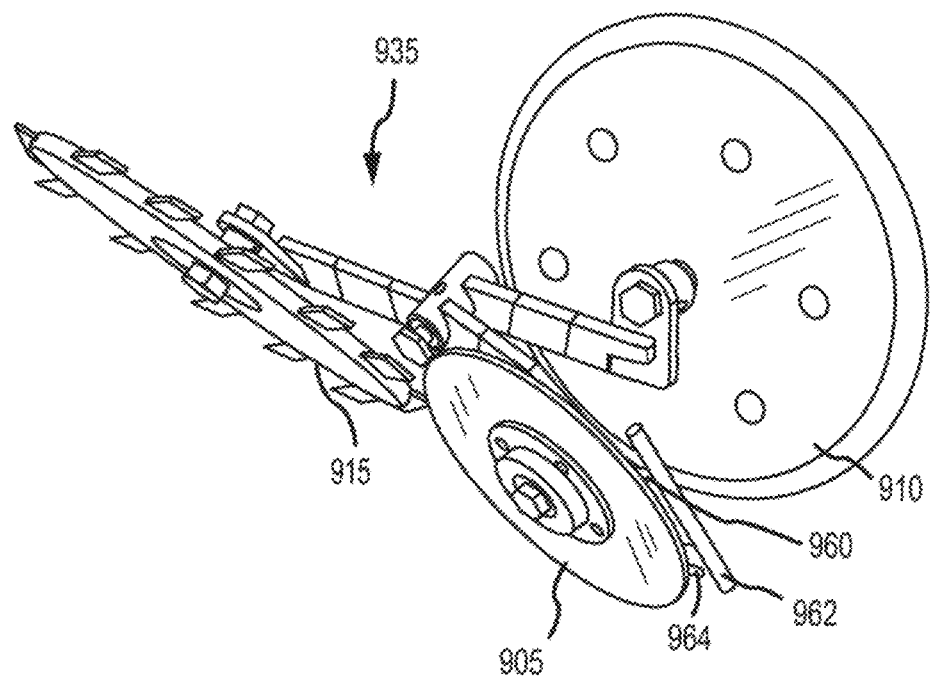
Figure 68:
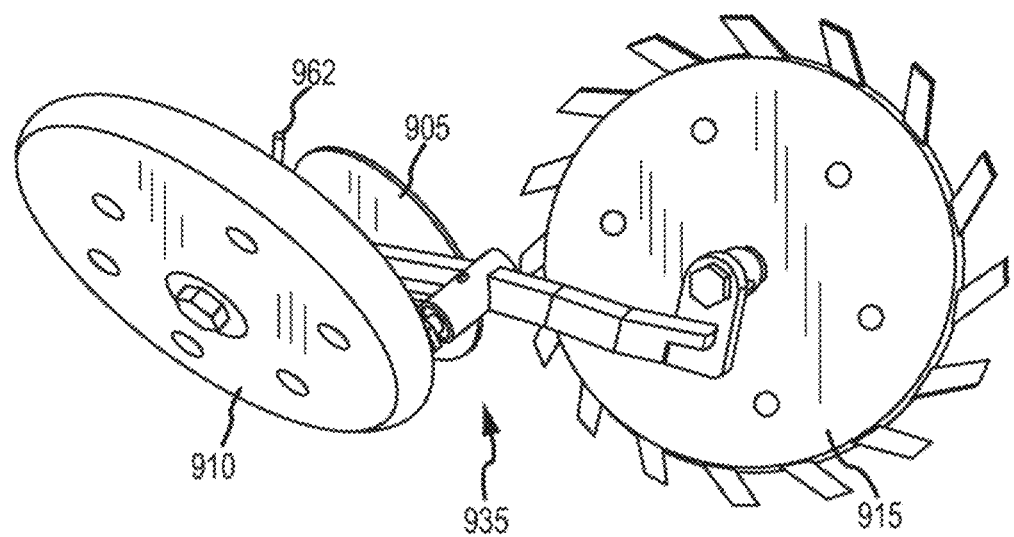

Another embodiment of an arm bracket 935 is shown in FIGS. 66-68. In this embodiment, a smooth closing wheel 910 and a toothed or cleated closing wheel 915 are shown together with a fertilizer furrow forming disc 905. The bracket 935 also includes an adjustable bracket 960 and sleeve 962 for support and positioning of a fertilizer tube for placement of fertilizer in the furrow following the forming disc 905. Other devices such as liquid tubes, fertilizer furrow closing devices, or other devices may also be supported and positioned with the bracket 960 and sleeve 962. The bracket 935 may also include a scraper 964 for clearing mud or debris from the opener disc 905.

Figure 69:
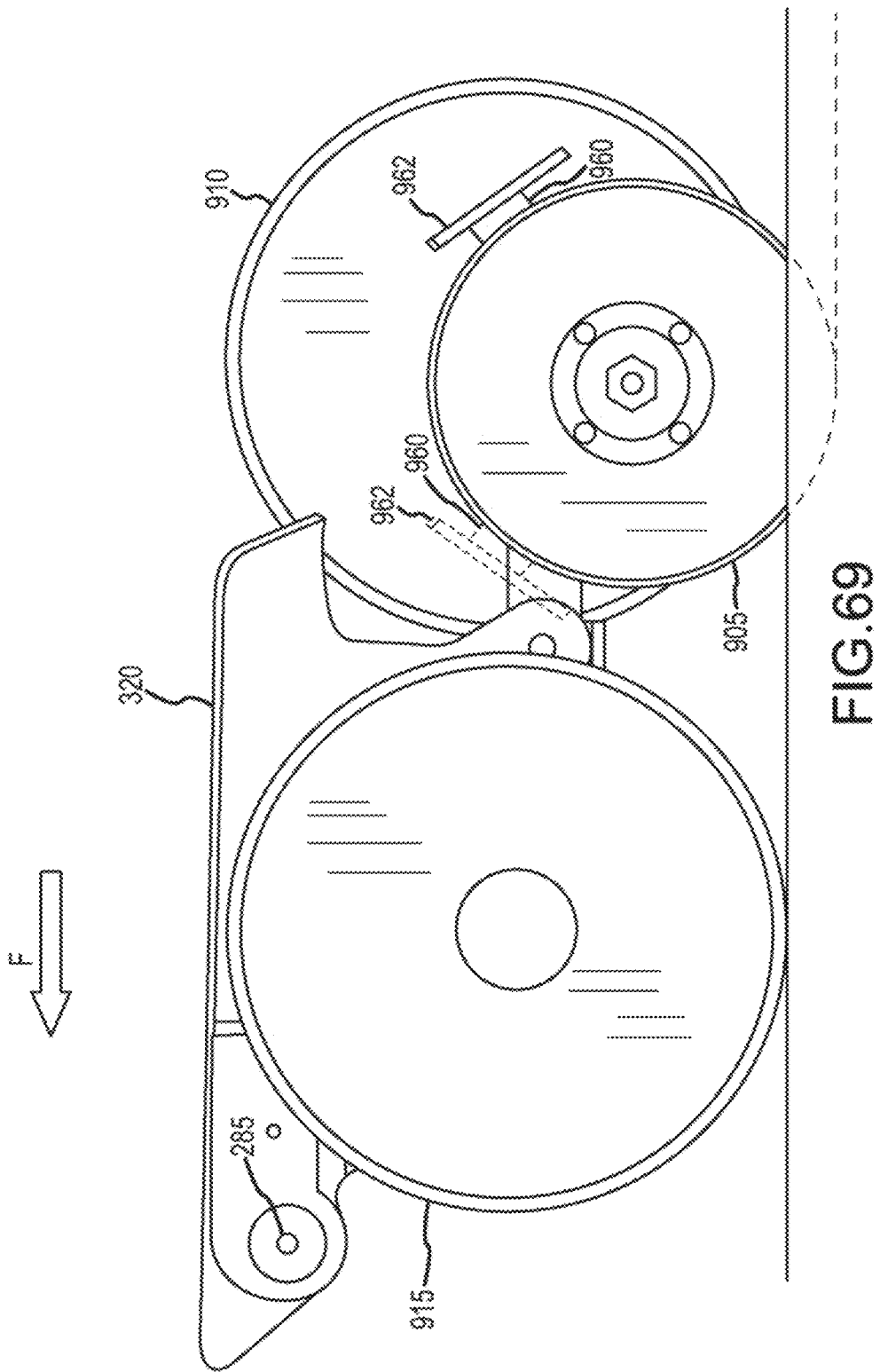
FIG. 69 is a side view of the embodiment of FIGS. 66-68 showing two positions for the adjustable bracket.
Figure 70:
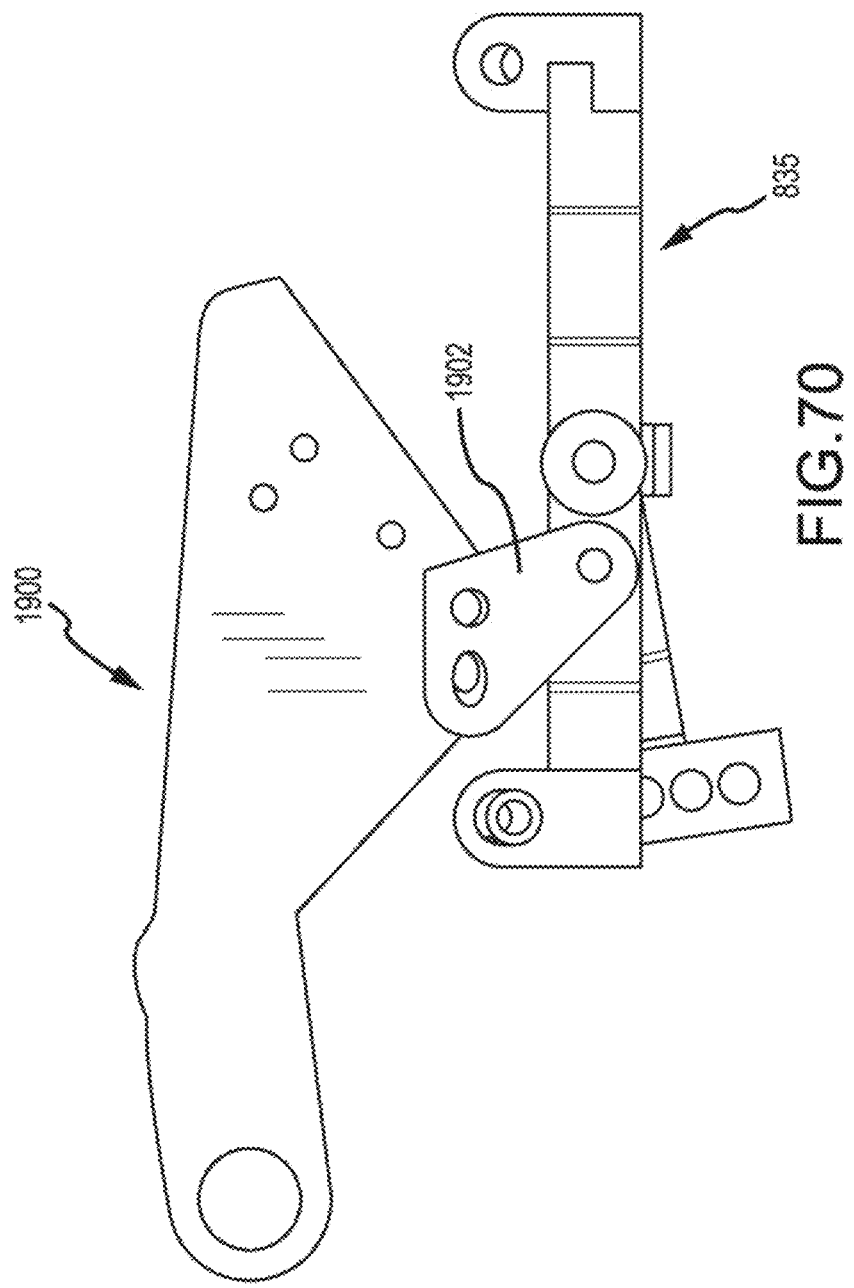
FIG. 70 is a left side elevation view of the pivotable arm bracket connected to another version of a trailing arm frame.
Figure 71:
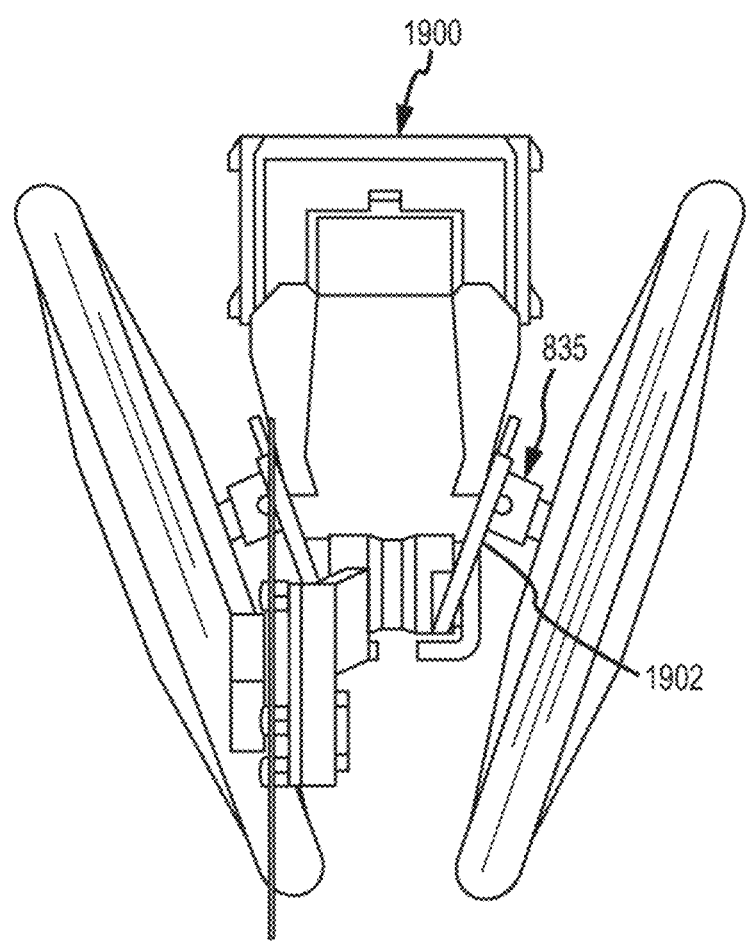
FIG. 71 is a front elevation of a trailing arm assembly showing the pivotable arm bracket connected to the trailing arm frame of FIG. 70 such that the fertilizer furrow opener disc is in a leading position.
Figure 72:
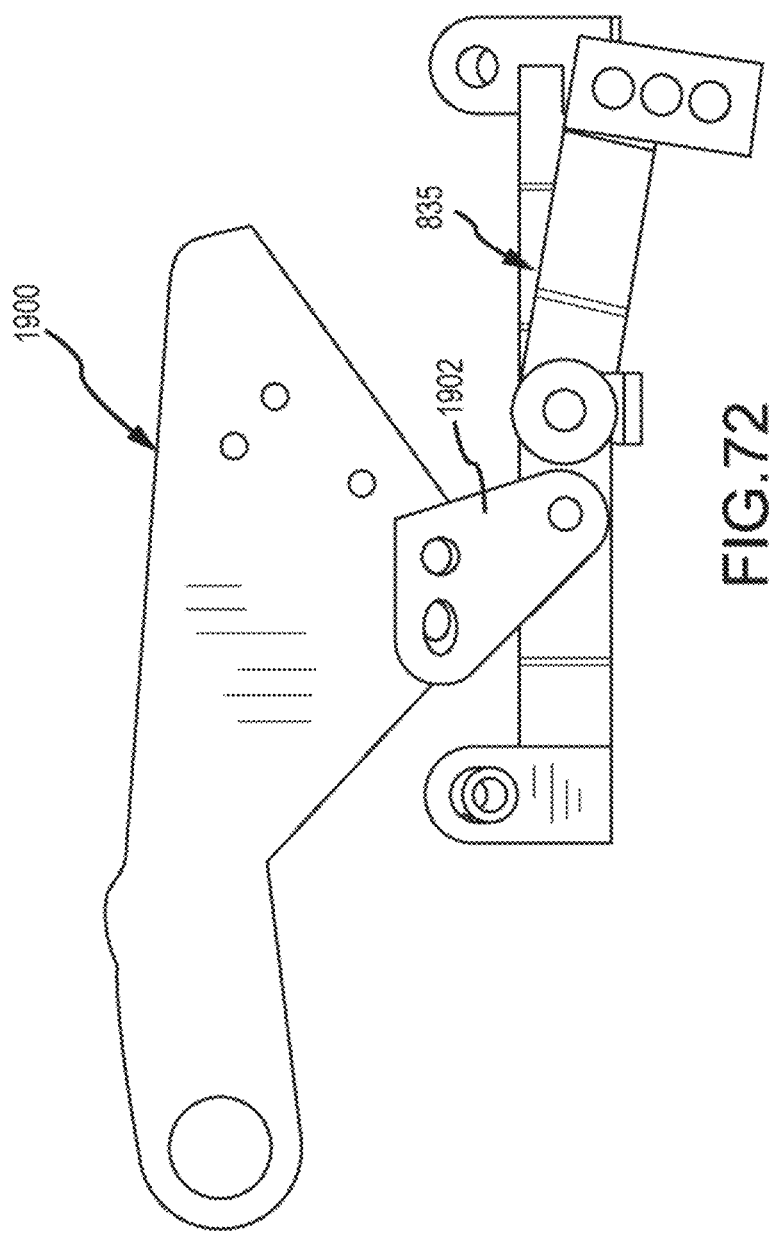
FIG. 72 is another left side elevation view of the pivotable arm bracket connected to the trailing arm frame of FIG. 70.
Figure 73:
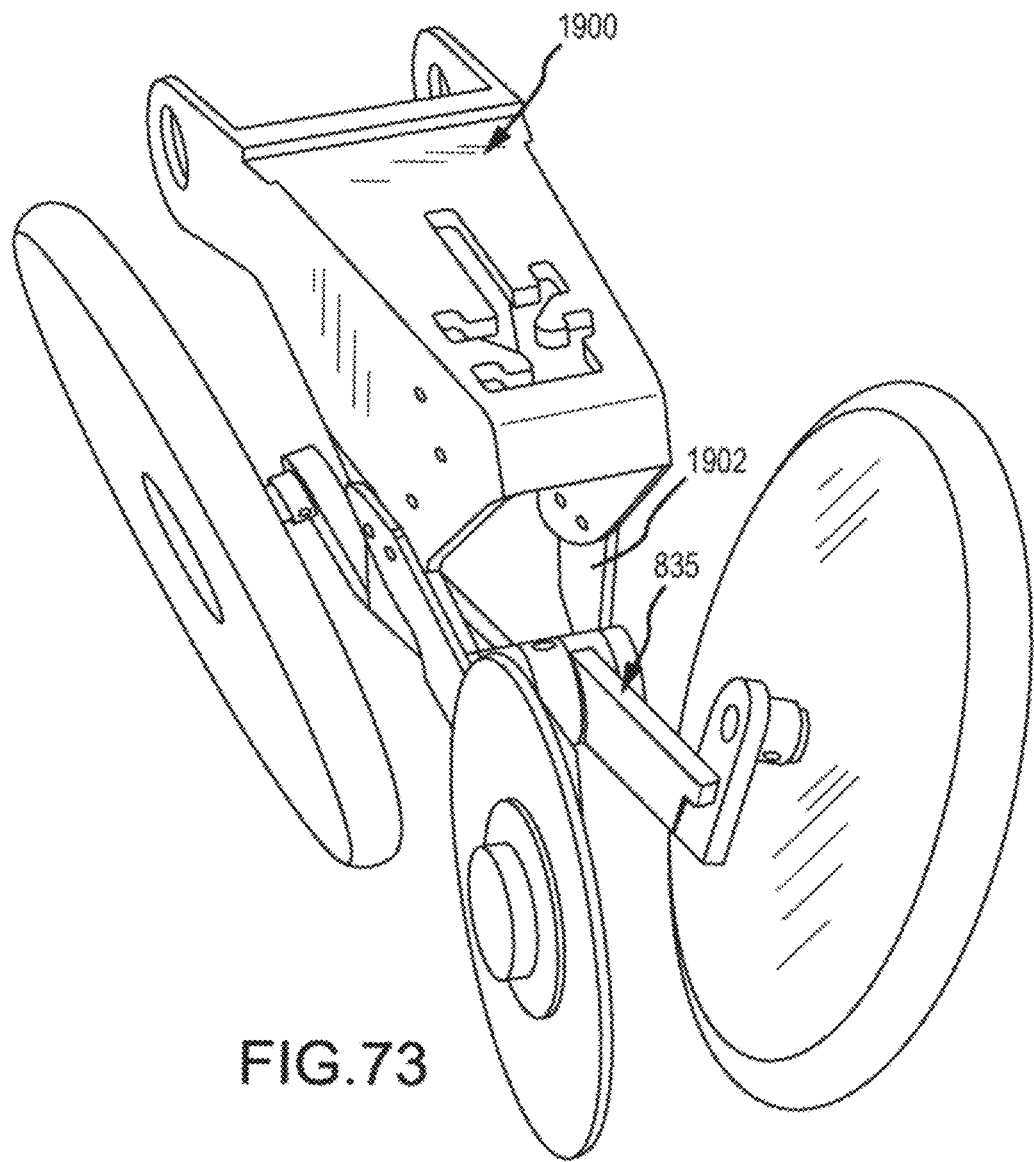
FIG. 73 is a top rear isometric view of a trailing arm assembly showing the pivotable arm bracket connected to the trailing arm frame of FIG. 70 such that the fertilizer furrow opener disc is in a trailing position.
Figure 74:
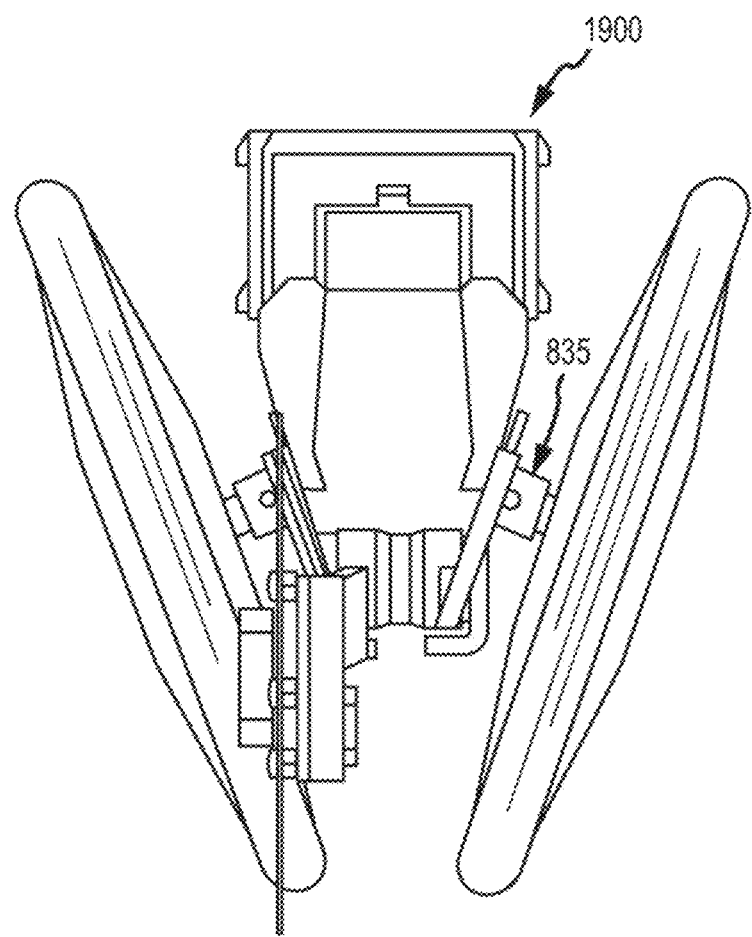
FIG. 74 is a rear elevation of a trailing arm assembly showing the pivotable arm bracket connected to the trailing arm frame of FIG. 70 such that the fertilizer furrow opener disc is in a trailing position.

The adjustable bracket 960 and sleeve 962 may pivot relative to the axis of the forming disc 905. That is, as shown in FIG. 69, an out-the-back arrangement is shown and the adjustable bracket 960 is arranged at approximately 2 o'clock with respect to the forming disc 905. In this position, a fertilizer tube, for example may be positioned in the sleeve 962 allowing fertilizer to be deposited behind the traveling forming disc 905 and in line with the fertilizer furrow allowing fertilizer to be deposited thereon. As shown in dashed lines, the adjustable bracket 960 and sleeve 962 may be pivoted about the axis of the forming disc 905 for an out-the-front arrangement of the arm bracket 935. That is, if the bracket 935 was turned around for an out-the-front arrangement, the 2 o'clock position shown would cause the sleeve 962 to be located in the front of the forming disc 905. The adjustable bracket 960 may thus be rotated about the forming disc axis to the 10 o'clock position thereby positioning the sleeve 962 behind the forming disc 905.

The adjustable bracket 960 may include a lock or series of locks allowing the bracket 960 to be locked into position in one of the two positions shown or in other positions. For example, a lock in the form of a spring loaded pin adapted to engage holes or slots in the arm bracket 935 or hub of the forming disc 905 may be provided. Other locking mechanisms may also be provided.

In this embodiment and other embodiments, the seed furrow closing wheels may be smooth, cleated, toothed, or otherwise adapted to close the seed furrow. Any of these wheels may be used and any combination of these wheels may be used and may be selected to suitably close the seed furrow. The selection may be based on the soil type encountered by the seed planting unit.

Figure 75:
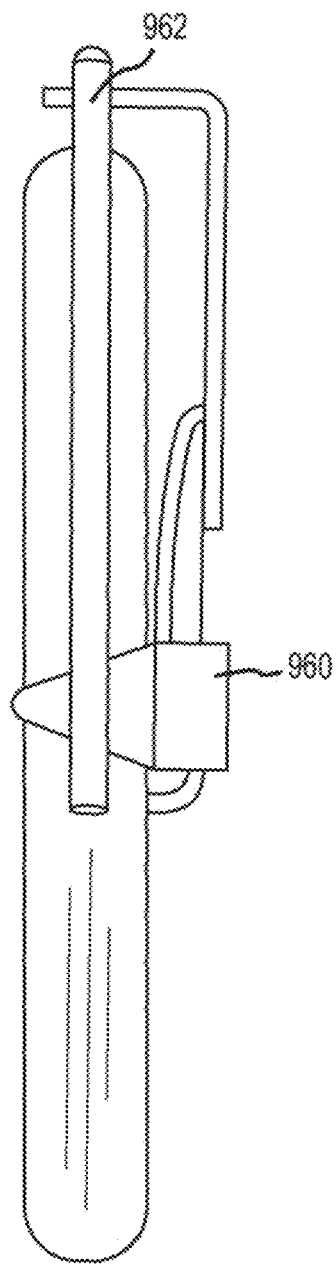
FIG. 75 is a rear elevation view of a fertilizer furrow disc opener showing a sleeve for a fertilizer tub joined to the fertilizer furrow disc opener.

FIGS. 70-76 show various views of the pivotable arm bracket 835 joined to another version of a trailing arm frame. The pivotable arm bracket 835 may be substantially similar to the pivotable arm bracket 835 shown in FIGS. 35-65. With reference to FIG. 75, the arm bracket 835 may further include an adjustable bracket 960 and sleeve 962 that are substantially similar to the adjustable bracket 960 and sleeve 962 that are described in more detail above with reference to FIGS. 66-69. With reference to FIGS. 70-74, the trailing arm frame 1900 may also be substantially similar to the trailing arm frame 320 shown in FIGS. 38A-41B. However, the trailing arm frame 1900 may differ from the other trailing arm frame 320 in that mounting plates 1902 may be utilized to join the pivotable arm bracket 835 to the trailing arm frame 1900. Additionally, the slotted hole design for the adjustment lever, which is described in more detail above with reference to FIGS. 2, 7, 8 and 11 may differ slightly from the slotted hole design of the trailing arm frame 320 shown in FIGS. 38A-41B.

Figure 76:
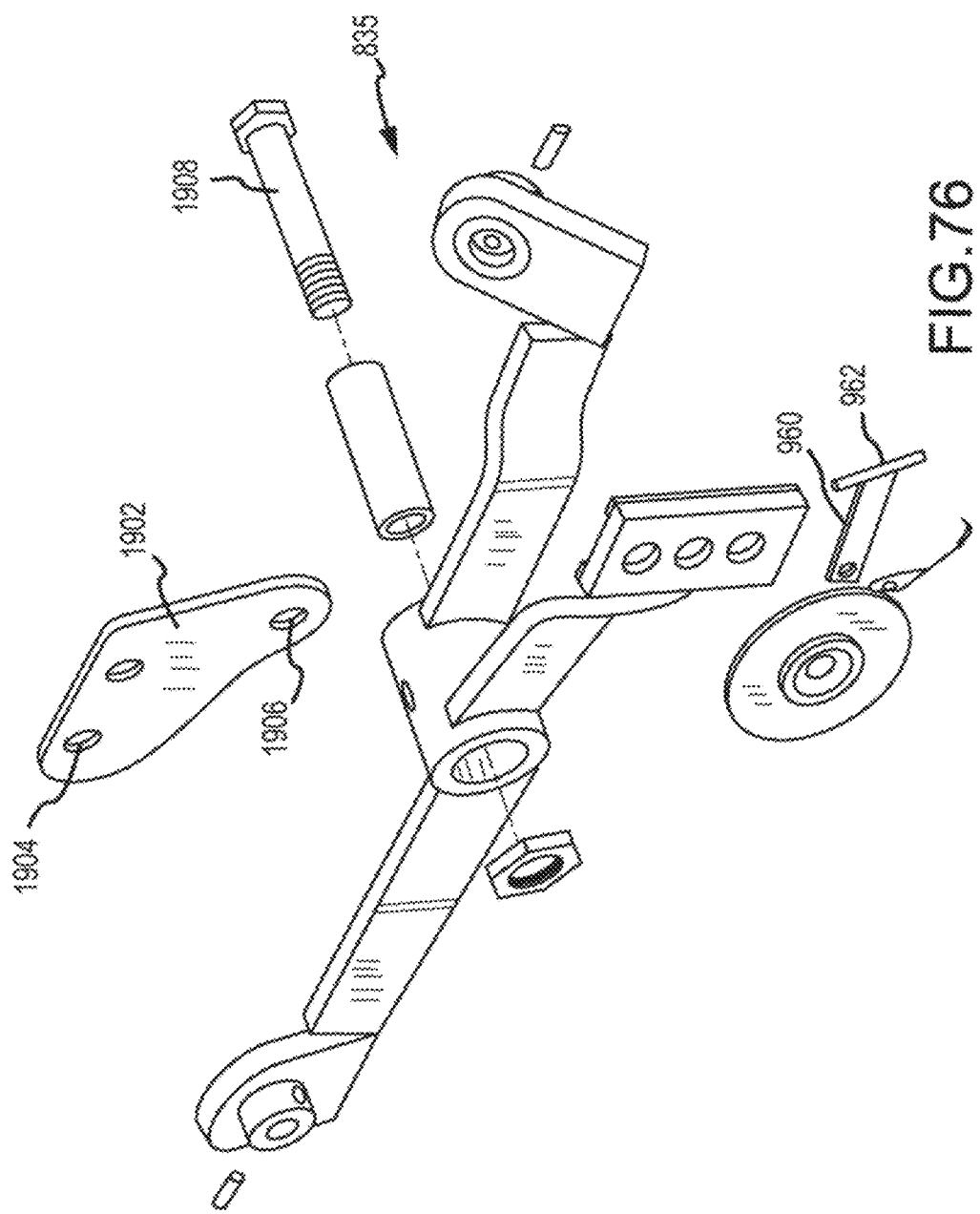
FIG. 76 is an exploded view of a portion of a trailing arm assembly according to certain embodiments.

With reference to FIG. 76, each mounting plate 1902 may be generally triangular in shape. However, any desired shape may be used for the mounting plates 1902. Each mounting plate 1902 may further include a pair of trailing arm connection holes 1904 positioned in an upper portion of the each mounting plate 1902 and an arm bracket connection hole 1906 positioned in a lower portion of each mounting plate 1902. The trailing arm connection holes 1904 for each mounting plate 1902 may be generally circular or otherwise suitably shaped, may be configured to co-axially align with similar holes formed on the trailing arm frame 1900, and may be further configured to receive fasteners therethrough that are also received through the holes on the trailing arm frame 1900 in order to join each mounting plate 1902 to the trailing arm frame 1900. The arm connection hole 1906 for each mounting plate 1902 may be generally circular or otherwise suitably shaped, may be configured to co-axially align with the hollow bore 844 defined by the middle portion 840 of the arm bracket 835, and may be further configured to receive a fastener 1908 therethrough that is also received through the hollow bore 844 in the middle portion 840 of the arm bracket 835 in order to join each mounting plate 1902 to the arm bracket 835.

Figure 77:
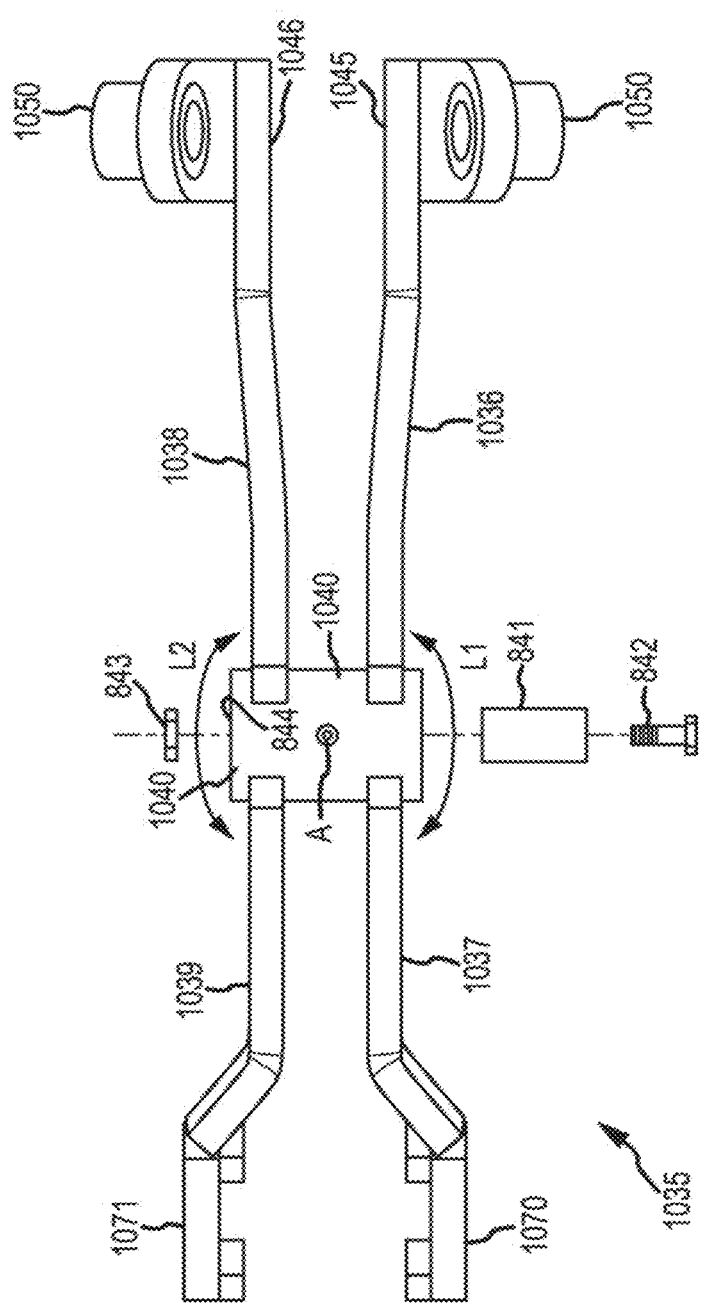
FIG. 77 is a top view of another pivotable arm bracket including four arms.
Figure 78:
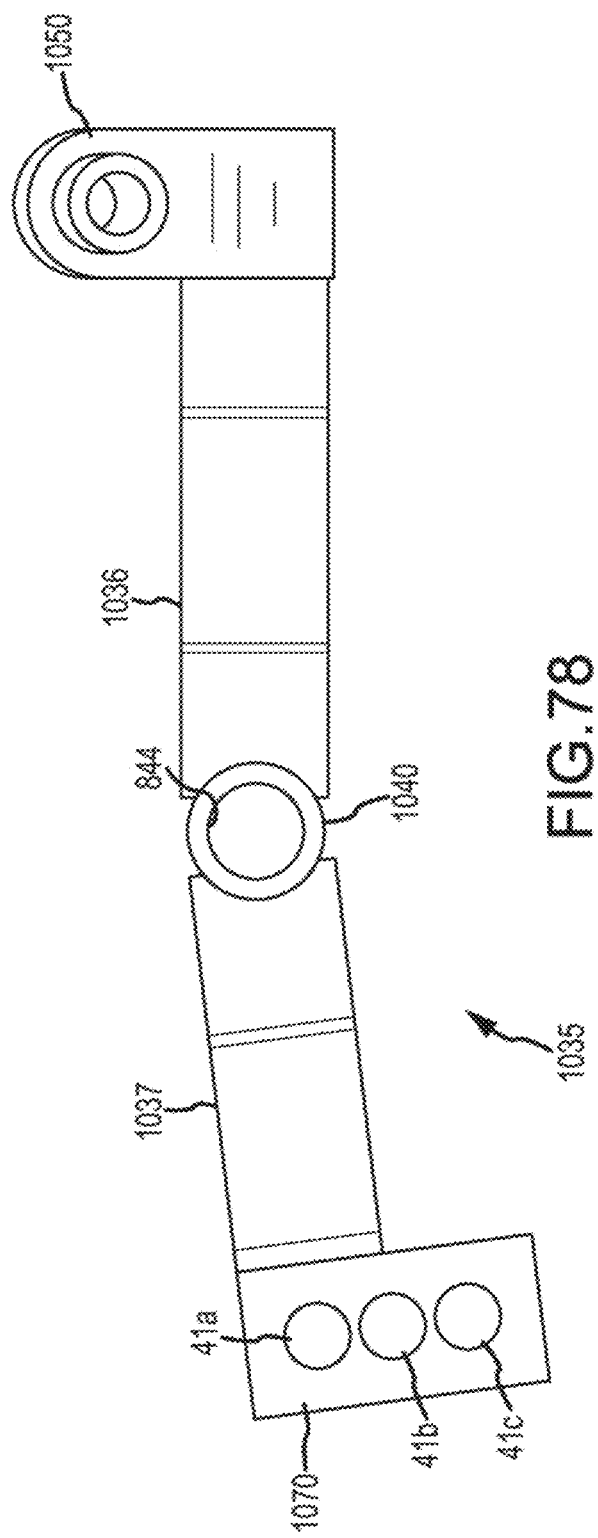
FIG. 78 is a side view of the pivotable arm bracket of FIG. 77.

In yet another embodiment, as depicted in FIGS. 77-81, a pivotable arm bracket 1035 may be provided in place of the lever arm 335, 735 and the pivotable arm brackets 835, 935 as described above. The pivotable arm bracket 1035 may serve to coordinate the relative movements of both furrow closer wheels and two fertilizer furrow opener discs, as compared to the previously described lever arm 335, 735, which only coordinates the relative movement between a single furrow closer wheel and a single fertilizer furrow opener disc (the second furrow closer wheel being independent therefrom) or the "three-way" coordination described above in connection with the pivotable arm bracket 835, which coordinates relative movement between two furrow closer wheels and a single fertilizer furrow opener disc. In this "four-way" coordination of the pivotable arm bracket 1035, the pivotable arm bracket 1035 includes four arms extending from a middle portion, as compared to the two arms of the lever 335, 735 extending from the middle portion 340, 740 and the three arms of the pivotable arm bracket 835 in the embodiments described above. FIG. 77 shows a top plan view of the pivotable arm bracket 1035, FIG. 78 shows a side view of the pivotable arm bracket 1035 and FIGS. 79A and 79B shows the pivotable arm bracket 1035 in use in a fully assembled trailing arm assembly 270.

It may be beneficial to deposit fertilizer on both sides of a furrow. Providing the pivotable arm bracket 1035 with two fertilizer furrow opener discs on opposing sides of the arm bracket 1035 may enable two fertilizer furrows to be opened for even distribution of fertilizer in the two fertilizer furrows, an additional amount of fertilizer to be deposited adjacent the seed furrow, or both. In addition, the pivotable arm bracket 1035 may coordinate the relative movement of adjacently arranged furrow closer wheels with one another, the movement of adjacently arranged fertilizer furrow opener discs with one another, or both. It may also be beneficial to have the relative movement of the furrow closer wheels and the fertilizer furrow opener discs coordinated with one another, which may enable the furrow closer wheels and furrow opener discs to distribute down pressure more equally on both sides of the seed furrow and in areas where the fertilizer furrows are opened. Providing the pivotable arm bracket with four arms may facilitate providing a more equal distribution of down pressure.

With reference now to FIGS. 77 and 78 in particular, the pivotable arm bracket 1035 may include four arm portions extending from a central hub or middle portion 1040. In particular, a first furrow closer wheel arm 1036, a first furrow opener disc arm 1037, a second furrow closer wheel arm 1038, and a second furrow opener disc arm 1039 may extend from the middle portion 1040 of the pivotable arm bracket 1035. The first and second furrow closer wheel arms 1036, 1038 may each be configured to pivotably receive a furrow closer wheel at a mounting end 1045, 1046, respectively thereof, using a pivot pin 1050. The first and second furrow opener disc arm 1037, 1039 may each be configured to pivotably receive a furrow opener disc at a mounting end 1070, 1071 respectively, using a pivot pin inserted in one of several mounting positions 41a-41c (three shown in FIG. 78). Each of the arms 1036-1039 may be joined to the middle portion 1040 at an end opposite their respective the mounting ends, e.g., mounting ends 1045, 1046, 1070 and 1071.

Figure 37A:
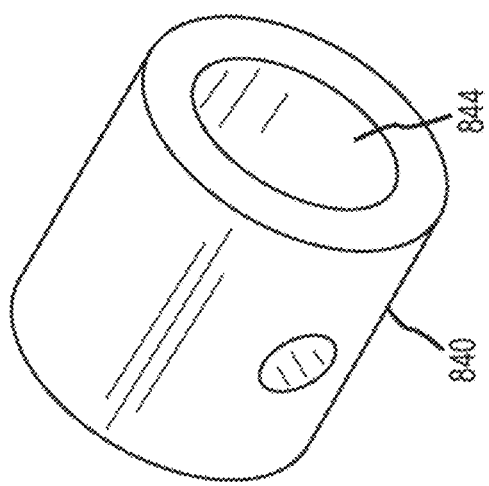
FIGS. 37A and 37B are an isometric and a side view, respectively, of a middle portion of a pivotable arm bracket.
Figure 37B:
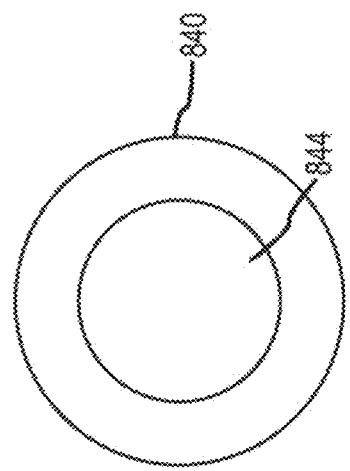

In general, the arms 1036-1039 may be sized and shaped in the manner described above in connection with arms 836-838, and as shown in FIGS. 35 and 36. The middle portion 1040 may be sized and shaped in the manner described above in connection with middle portion 840, as shown in FIGS. 37A-37B, as well as the described variations thereof. In addition, the middle portion 1040 may cooperate with the trailing arm frame 320, in the manner discussed above with regard to the connection between the lever arm 335, 725 and the trailing arm frame 320. Referring to FIG. 77, the middle portion 1040 may be securely and pivotably connected to the trailing arm frame by means of a bolt 842 extending through the pivot sleeve 841. The bolt 842 may be secured in place by a nut 843. Other pivotable fastening mechanisms or devices may also be used.

With reference to FIG. 77, the first and second furrow closer wheel arms 1036, 1038 may be provided on a generally opposite side of the middle portion 840 from the first and second fertilizer furrow opener disc arms 1037, 1039. For example, the furrow closer wheel arms 1036, 1038 may be arranged at a leading end or a trailing end of the pivotable arm bracket 1035, while the fertilizer furrow opener disc arms 1037, 1039 are located at the opposite end of the pivotable arm bracket 1035. In some implementations, the geometric relationship between the first and second furrow closer wheel arms 1036, 1038 and the fertilizer furrow opener disc arms 1037, 1039 may be non-linear. The first fertilizer furrow opener disc arm 1037 and the first furrow closer wheel arm 1036 may be generally co-linear to one another or an angular relationship may be provided. For example, an angle L1 may define the angle between the first furrow closer wheel arm 1036 and the first fertilizer furrow opener disc arm 1037, and an angle L2 may define the angle between the second furrow closer wheel arm 1038 and the second fertilizer furrow opener disc arm 1039. Angles L1, L2, for example, may be the same as shown in FIG. 77 or may differ from one another and may range from 150 degrees to 210 degrees, 160 to 200 degrees, 160 to 180 degrees, or 170 to 180 degrees. Other angles may also be used and may be selected to provide suitable relationships between the furrow closer wheels and the furrow opener discs.

Mounting ends 1045, 1046 may be tilted at an angle in the manner described above in connection with mounting ends 845 and 846, while mounting ends 1070, 1071 may be vertical or close to vertical to allow the fertilizer furrow opener disc to furrow straight down into the field or may be angled as with ends 1045, 1046.

FIGS. 79A and 79B show the arm bracket 1035 pivotably connected to the trailing arm frame 320. An arm bracket connection portion 341 of the trailing arm frame 320 may extend downwardly from the body of the frame 320 to meet with the middle portion 1040 (not visible) of the arm bracket 1035. The connection portion 341 may join to the middle portion 1040 in the manner described above in connection with middle portion 840, and as shown in FIGS. 38A and 38B.

The arm bracket 1035 may be connected to the trailing arm frame 320 in two orientations. The first orientation places the fertilizer furrow opener arms 1037, 1039 in a forward position (FIG. 79A, arrow F indicating the forward movement of the planter 200), and the second orientation places the fertilizer furrow opener arms 1037, 1039 in a rearward position (FIG. 79B). The two orientations may be made possible, in part, by the cylinder of the middle portion 1040 being identical on both sides. FIGS. 79A and 79B show each of these orientations. To switch from one orientation to another, the bolt 842 and nut 843 assembly may be disassembled from the middle portion 1040 and sides 341a, 341b, the arm bracket 1035 may be rotated by 180 degrees about its vertical axis (axis A shown in FIG. 77), and then the bolt 842 and nut 843 assembly may be reinserted.

FIGS. 80A and 80B in right and left side views illustrate the two orientations of a fully assembled trailing arm assembly 270, which also includes a first furrow closer wheel 1015, a second furrow closer wheel 1010, a first fertilizer furrow opener disc 1000 and a second fertilizer furrow opener disc 1005. The closer wheels 1015, 1010 are shown pivotably connected to their respective arm 1036, 1038 (not visible), at mounting ends 1045, 1046, and the fertilizer furrow opener discs 1000, 1005 are shown joined to their respective arm 1037, 1039 at mounting ends 1070, 1071. When the fertilizer furrow opener arms 1037, 1039 are in the forward position, the trailing arm assembly 270 is fully assembled in an "out-the-front" fertilizer placement, as described above with reference to FIGS. 3-8, 11-19, and 24-26, 38A and 41A. Conversely, when the fertilizer furrow opener arms 1037, 1039 are in the rearward position, the trailing arm assembly 270 is fully assembled in an "out-the-back" fertilizer placement, as described above with reference to FIGS. 27-29 and 32-34, 38B and 41B, above. Thus, similar to the arm bracket 835, the single pivotable arm bracket 1035 may be positioned in two fertilizing orientations. As described above in connection with arm bracket 835, the fertilizing orientation of the pivotable arm bracket 1035 may be selected based on soil conditions, which may be readily changed as soil conditions dictate.

With reference now to the operation of a planter configured with the arm bracket 1035 shown in FIGS. 80A and 80B, the planter may occasionally encounter a rock or other field impediment 295 during normal operation. In an out-the-front fertilizing configuration, as shown in FIG. 80A, the first or the second fertilizer furrow opener disc 1000, 1005 (or both) may first encounter the impediment 295 as the planter moves in a forward direction, indicated by arrow F. The impediment may cause both discs 1000, 1005 to rotate counterclockwise upwardly (resulting in softer contact with the field surface), as indicated by arrow B, with rotation occurring about the pivot point at middle portion 1040. Since the discs 1000, 1005 are both "tied" to one another because of their mutual connection to middle portion 1040, even if only one of the discs 1000, 1005 hits the impediment 295, both may be caused to rotate counterclockwise upwardly. At the same time, because of the upward counterclockwise rotation of on or both discs 1000, 1005, the trailing first and the second furrow closer wheels 1010, 1015 may be caused to rotate counterclockwise downwardly (resulting in harder contact with the field surface), also about the pivot point at middle portion 1040 and as indicated by arrow A, by virtue of its connection to middle portion 1040. Because the furrow closer wheels 1010, 1015 both pivot downwardly as the leading wheel or disc clears the obstruction, down pressure may be more evenly distributed between the wheels.

In contrast, in an out-the-back fertilizing configuration, as shown in FIG. 80B, the first or the second furrow closer wheel 1010, 1015 (or both) may first encounter the impediment 295 as the planter moves in the forward direction, indicated by arrow F. The impediment 295 may cause one or both of the wheels 1010, 1015 to rotate counterclockwise upwardly (resulting in softer contact with the field surface), as indicated by arrow A, with rotation occurring about the pivot point at middle portion 1040. At the same time, because of the upward counterclockwise rotation of one or more wheels 1010, 1015, the first and the second fertilizer furrow opener discs 1000, 1005 may be caused to rotate counterclockwise downwardly (resulting in harder contact with the field surface), also about the pivot point at middle portion 1040 and as indicated by arrow B, because of their mutual connection to middle portion 1040. Because the discs 1000, 1005 both pivot downwardly as the leading wheel or wheels clear the obstruction, down pressure may be more evenly distributed between the discs.

As the planter continues over the impediment 295, the arm bracket 1035 rotates or pivots in the same manner as described above with regard to the arm bracket 835. The arm bracket 1035 therefore is effectively tied to the movements of the first and second furrow closer wheels 1010, 1015 and the first and second fertilizer furrow opener discs 1000, 1005 about the middle portion 1040 because of their mutual connection to the middle portion 1040.

Figure 81:
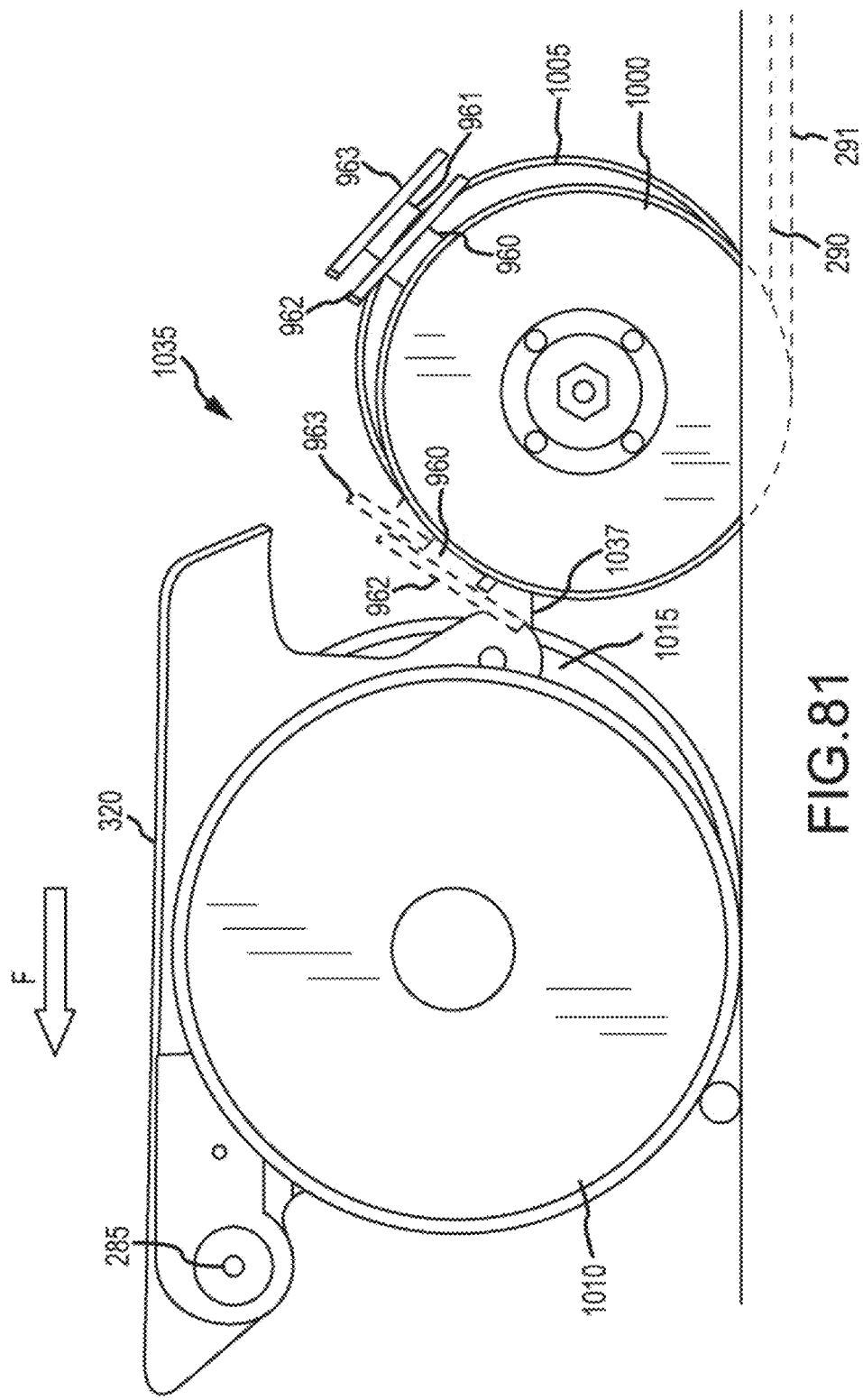
FIG. 81 is a right side view of the embodiment of the pivotable arm bracket of FIG. 77 connected to the trailing arm frame and showing two positions for the adjustable brackets located proximate the fertilizer furrow opener discs.

The arm bracket 1035 may include any of the additional components of the planter as described above with regard to the previous embodiments (e.g., with regard to the lever arm 335, 735 and the arm brackets 835, 935). For example, as shown in FIG. 81, the arm bracket 1035 may include two sets of pivotably adjustable brackets 960 and sleeves 962 for support and positioning of two fertilizer tubes for distribution of fertilizer in the furrows formed by the fertilizer furrow opener discs 1000, 1005. The arrangement and operation of the pivotably adjustable brackets 960 and sleeves 962 are described above in connection with the arm bracket 935 shown in FIG. 67.

In yet another embodiment, as depicted in FIGS. 82-84B, a pivotable arm bracket 1135 may be provided in place of the lever arm 335, 735 and the pivotable arm brackets 835, 935 and 1035 as described above. The pivotable arm bracket 1135, as set forth in greater detail below, may provide a "four-way" coordination to coordinate the relative movements of both furrow closer wheels and both fertilizer furrow opener discs by providing a first furrow closer wheel and a first fertilizer furrow opener disc on one side of the middle portion 1040 and second furrow closer wheel and a second fertilizer furrow opener disc and a second side of the middle portion 1040. In contrast, the previously described pivotable arm bracket 1035 coordinates relative movement between two furrow closer wheels on one side of the middle portion 1040 and two fertilizer furrow opener discs on the second side of the middle portion 1040. FIG. 82 shows a top plan view of the pivotable arm bracket 1135, and FIG. 83 shows the pivotable arm bracket 1135 in an assembled trailing arm assembly 270. The components of pivotable arm bracket 1135 common to the pivotable arm bracket 1035 are labeled with common reference elements.

In addition to forming two fertilizer furrows on opposing sides of a seed furrow and coordinating the relative movement furrow closer wheels and fertilizer furrow opener discs with one another by providing an arm bracket with four arms, it may be beneficial to have the relative movement of a first furrow closer wheel and a first fertilizer furrow opener disc coordinated with each other at a leading end, and relative movement of a second furrow closer wheel and a second fertilizer furrow opener disc coordinated with each other at a trailing end, which may enable down pressure to be more equally distributed on both sides of the seed furrow and in areas where the two fertilizer furrows are opened.

Pivotable arm bracket 1135 may include arms 1036-1039 that may be sized and shaped in the manner described above in connection with the pivotable arm bracket 1035 shown in FIG. 77 with the exception that the arrangement of the first furrow closer wheel arm 1036 and the first fertilizer furrow opener disc arm 1037 extend from one side of the middle portion 1040, and the second furrow closer wheel arm 1038 and a second fertilizer furrow opener disc arm 1039 extend from the second side of the middle portion 1040 of the pivotable arm bracket 1135 in a crisscross fashion. For example, this crisscross arrangement is shown in FIG. 82, in which the first fertilizer furrow opener disc arm 1037 is situated at top left position and the second furrow opener disc arm 1039 is situated at a bottom right position, which together may be likened to one diagonal leg of an X- or crisscross-shape. The first furrow closer wheel arm 1036 is situated at a top right position, and the second furrow closer wheel arm 1038 is situated at a bottom left position, which together may be likened to a second diagonal leg of an X- or crisscross-shape, thereby providing a crisscrossing arrangement of the arms 1036-1039 of the pivotable arm bracket 1135. In other respects, the pivotable arm bracket 1135 may be configured similarly to pivotable arm bracket 1035, so that, for example, the arms 1036-1039 and the mounting ends 1045, 1046, 1070 and 1071 may have a similar configuration and angular arrangement, and the pivotable arm bracket 1135 may join to the trailing arm frame 320 in the same manner described above in connection with arm bracket 1035.

FIG. 83 shows the pivot arm bracket 1135 pivotably connected to the trailing arm frame 320. Due to the crisscross arrangement of the arms 1036-1039 of the pivot arm bracket 1135, the assembly generally includes one orientation in which one fertilizer furrow opener arm 1037, 1039 is arranged in a leading position in front of a furrow closer arm 1036, 1038, and the other fertilizer furrow opener arm 1037, 1039 is arranged in a trailing position behind the other furrow closer arm 1036, 1038. Of course, the arms of the pivot arm bracket 1135 may be configured so that the leading fertilizer furrow opener arm 1037, 1039 is situated at a front left position as opposed to a front right position as shown in FIG. 83, while the trailing fertilizer furrow opener arm 1037, 1039 is situated at a back right position as opposed to the back left position as shown in FIG. 83.

Figure 84B:
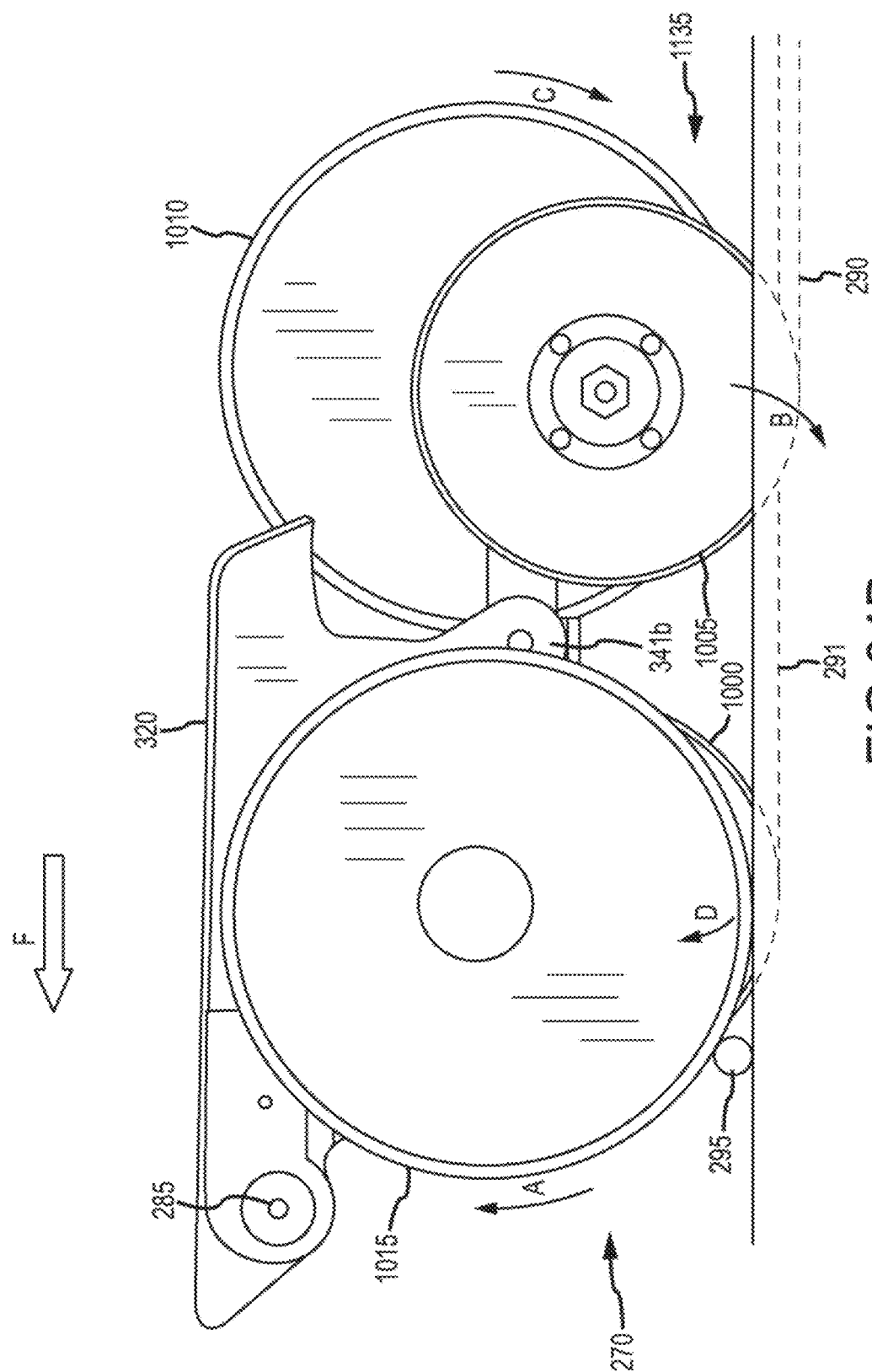

FIGS. 84A and 84B show a fully assembled trailing arm assembly 270, which includes a first furrow closer wheel 1015, a second furrow closer wheel 1010, a first fertilizer furrow opener disc 1000 and a second fertilizer furrow opener disc 1005 in a crisscrossed arrangement. The closer wheels 1015, 1010 are shown pivotably connected to their respective arm 1036, 1038, at mounting ends 1045, 1046, arranged on opposite sides of and at opposing ends of the middle portion 1040 relative to one another. The fertilizer furrow opener discs 1000, 1005 are shown joined to their respective arm 1037, 1039 at mounting ends 1070, 1071 that are also arranged on opposite sides of and at opposing ends of the middle portion 1040 relative to one another. The orientation of FIGS. 80A and 80B, with one of the fertilizer furrow opener arms 1037, 1039 in the forward position, results in one arm having an "out-the-front" fertilizer placement, as described above with reference to FIGS. 3-8, 11-19, and 24-26, 38A, 41A and 80A, and the second fertilizer furrow opener arm 1037, 1039 in the rearward position, resulting in an "out-the-back" fertilizer placement, as described above with reference to FIGS. 27-29 and 32-34, 38B, 41B and 80B, above.

With reference now to the operation of a planter configured with the arm bracket 1135 shown in FIGS. 84A and 84B, the planter may occasionally encounter a rock or other field impediment 295 during normal operation. For example, as shown in FIG. 80A, the second fertilizer furrow opener disc 1005 may first encounter the impediment 295 as the planter 200 moves in a forward direction, indicated by arrow F. The impediment may cause both the second fertilizer furrow opener disc 1005 and the first furrow closer wheel 1010 to rotate counterclockwise upwardly (resulting in softer contact with the field surface), as indicated by arrows B and C, with rotation occurring about the pivot point at middle portion 1040. Since the disc 1005 and the wheel 1010 are both "tied" to one another by virtue of their mutual connection to middle portion 1040, even if only one of the disc 1005 or wheel 1010 hits the impediment 295, both may be caused to rotate upwardly. At the same time, because of the upward counterclockwise rotation of one or both of the second fertilizer furrow opener disc 1005 and the first furrow closer wheel 1010, the trailing second furrow closer wheel 1015 and the first fertilizer furrow opener disc 1000 may be caused to rotate counterclockwise downwardly (resulting in harder contact with the field surface), also about the pivot point at middle portion 1040 and as indicated by arrows A and D, because of their connection to middle portion 1040. Compared to FIG. 84A, the operation of the planter shown in FIG. 84B may result in the second furrow closer wheel 1015 to rotate clockwise upwardly as indicated by arrow A and cause the first fertilizer furrow opener disc 1000 to rotate clockwise upwardly as indicated by arrow D, which may result in the second fertilizer furrow opener disc 1005 and the first furrow closer wheel 1010 to rotate counterclockwise downwardly by a relatively shorter distance due to the axle of the second furrow closer wheel 1015 being a further distance away from the middle portion 1040 as compared to the first and second fertilizer furrow opener discs 1000, 1005.

As the planter continues over the impediment 295, the arm bracket 1135 rotates or pivots in the same manner as described above with regard to the arm bracket 1035 and 835. The arm bracket 1135 therefore is effectively tied to the movements of the first furrow closer wheel 1010 adjacent the second fertilizer furrow opener disc 1005, and the second furrow closer wheel 1015 adjacent the first furrow opener disc 1000 about the middle portion 1040 because of their mutual connection to the middle portion 1040. In each of FIGS. 84A and 84B, as the leading wheel, disc or both clears the obstruction 295, the two arms at the trailing end may enable the down pressure to be distributed between the discs, the wheels or one of each joined to the bracket 1135 at the trailing end.

The arm bracket 1135 may include any of the additional components of the planter as described above with regard to the previous embodiments (e.g., with regard to the lever arm 335, 735 and the arm brackets 835, 935 and 1035). For example, as shown in FIG. 81, the arm bracket 1135 may include two sets of pivotably adjustable brackets 960 and sleeves 962 for support and positioning of two fertilizer tubes for distribution of fertilizer in the furrows formed by the fertilizer furrow opener discs 1000, 1005. The arrangement and operation of the pivotably adjustable brackets 960 and sleeves 962 are described above in connection with arm bracket 935.

For each of arm brackets 1035, 1135, the formation of fertilizer furrows and the application of fertilizer therein results in fertilization along both sides of the seed furrow. This may enable a more even distribution of fertilizer along the sides of the seed furrow. The fertilizer may be distributed into fertilizer furrows that are two to four inches away from the seed furrow and two to four inches deep. In addition, relatively more fertilizer may be deposited because of the additionally formed fertilizer furrow. For example, some farmers prefer to apply 60 gallons of fertilizer per acre instead of 30 gallons per acre. By using the arm brackets 1035, 1135, fertilizer may be deposited at the same rate as if only one fertilizer tube were used (e.g. 30 gallons per acre), but at twice the amount (e.g., 60 gallons per acre), due to the two fertilizer tubes extending from sleeves 962 (see, e.g., FIG. 81) that may be joined to fertilizer furrow opener disc arms 1037, 1039.

The arm bracket 1135 having the crisscrossed arrangement, in addition to providing fertilizer on both sides of the seed furrow, may enable the arm bracket 1135 to operate with a more equal distribution of down pressure due to one fertilizer furrow opener disc and one furrow closer wheel being provided on each side of the arm bracket as compared to the arm bracket 1035 having both discs on one side of the arm bracket and both wheels on the other side.

The embodiments described above may form fertilizer furrows by fertilizer furrow opener discs (e.g., disc 305, 805, 1000, 1005), which may be laterally offset relative to the seed furrow opener disc 260 such that the fertilizer furrow 290 (see e.g., FIG. 2) or furrows 290, 291 (see, e.g., FIGS. 80A-811 and 84A-84B) are laterally offset from the seed furrow 280 a distance between approximately one-half inch and approximately four inches. The lateral offset between the seed furrow 280 and the fertilizer furrows 290, 291 may assist in reducing the likelihood that the fertilizer 385 may burn the seed 282. In addition, as provided above, the fertilizer opener discs may be positioned on the arm bracket (e.g., pivotable arm brackets 1035, 1135 at mounting positions 41a-41c) so that the discs form relatively deeper or shallower fertilizer furrows. In some implementations, the depth of the furrows formed by the fertilizer opener discs (e.g., discs 1000, 1005) may be between approximately one-half inch and approximately four inches. Depositing fertilizer in fertilizer furrows ranging between about one-half inch to about four inches deep may reduce the likelihood that fertilizer 385 may burn the seed 282. In a particular embodiment, the pivotable arm brackets 1035, 1135 may be used to form fertilizer furrows 290, 291 via the fertilizer furrow opener discs 1000, 1005 so that each fertilizer furrow 290, 291 is laterally spaced two inches to the side of the seed furrow 280 and two inches deep. In another embodiment, the fertilizer furrow opener discs 1000, 1005 may form fertilizer furrows 290, 291 that are laterally spaced four inches to the side of the seed furrow 280 and four inches deep. Other fertilizer furrow arrangements formed by the pivotable arm brackets 1035, 1135 are also contemplated, and may form two fertilizer furrows 290, 291 each having the same or a different vertical depth and each having the same or a different lateral spacing from the seed furrow 280.

While the pivotable arm bracket 1035, 1135 provided above may form two fertilizer furrows, the lever arms 335, 735 may be provided in pairs on the planter 200 (e.g., one lever arm 335, 735 may replace the furrow closer wheel 310, 710), so that two fertilizer furrow opener discs are provided and form two fertilizer furrows 290, 291 on both sides of the seed furrow 280, and two furrow closer wheels close the seed furrow 280.

The lever arms 335, 735 and pivotable arm brackets 835, 935, 1035, 1135 may enable fertilizer to be placed behind the gage wheel and in front of the press wheel of the planter on one or both sides of the seed furrow. This may eliminate finding room in front or behind the planter for much larger fertilizer units. By placing the liquid attachment (e.g., the fertilizer deposit tube bracket 730 or the pivotably adjustable brackets 960 and sleeves 962) behind the gage wheel, the planter may maintain a relatively uniform depth in uneven terrains and may enable fertilizer to be placed less than 12" from the seed drop. By providing the fertilizer furrow opener discs 305, 705, 805, 905, 1000, 1005 in front of the press wheel and/or in front of the furrow closer wheels, the fertilizer furrow opener discs may break side wall compaction, which may enable the press wheel and/or the furrow closer wheels to crumble soil down around the seed and press the soil thereon.

All directional references (e.g., upper, lower, upward, downward, left, right, leftward, rightward, top, bottom, above, below, inner, outer, vertical, horizontal, clockwise, and counterclockwise) are only used for identification purposes to aid the reader's understanding of the examples of the disclosure, and do not create limitations, particularly as to the position, orientation, or use of the disclosure unless specifically set forth in the claims. Joinder references (e.g., attached, coupled, connected, joined, and the like) are to be construed broadly and may include intermediate members between a connection of elements and relative movement between elements. As such, joinder references do not necessarily infer that two elements are directly connected and/or in fixed relation to each other.

In some instances, components are described with reference to "ends" having a particular characteristic and/or being connected with another part. However, those skilled in the art will recognize that the present disclosure is not limited to components which terminate immediately beyond their points of connection with other parts. Thus, the term "end" should be interpreted broadly, in a manner that includes areas adjacent, rearward, forward of, or otherwise near the terminus of a particular element, link, component, part, member or the like.

In methodologies directly or indirectly set forth herein, various steps and operations are described in one possible order of operation, but those skilled in the art will recognize that steps and operations may be rearranged, replaced, or eliminated or have other steps inserted without necessarily departing from the spirit and scope of the present disclosure. It is intended that all matter contained in the above description or shown in the accompanying drawings shall be interpreted as illustrative only and not limiting. Changes in detail or structure may be made without departing from the spirit of the disclosure as defined in the appended claims.

Although the present disclosure has been described with respect to particular apparatuses, configurations, components, systems and methods of operation, it will be appreciated by those of ordinary skill in the art upon reading this disclosure that certain changes or modifications to the embodiments and/or their operations, as described herein, may be made without departing from the spirit or scope of the disclosure. Accordingly, the proper scope of the disclosure is defined by the appended claims. The various embodiments, operations, components and configurations disclosed herein are generally exemplary rather than limiting in scope.

What is claimed is:

1. A bracket for use with an agricultural planter comprising a trailing arm assembly defining a pivot axis, the bracket comprising:
    at least a first arm and a second arm joined to a middle portion of the bracket;
    a first mounting end extending from the first arm and configured to rotatably and selectively receive a first implement, and
    a second mounting end extending from the second arm and configured to rotatably receive a second implement,
    wherein:
        the bracket is configured so that when the bracket is joined to the trailing arm assembly, a pivoted displacement of the first implement causes a pivoted displacement of the second implement;
        the pivoted displacement of the first implement is in a first direction, and
        the bracket is configured so that when the bracket is joined to the trailing arm assembly, the pivoted displacement of the first implement in the first direction causes a pivoted displacement of the second implement in a second direction opposite the first direction.

2. The bracket of claim 1, wherein the middle portion is configured for rotatable coupling relative to a trailing arm frame of the trailing arm assembly.

3. The bracket of claim 2, wherein the middle portion defines a surface configured to rotate relative to the trailing arm frame or a fastener attached to the trailing arm frame.

4. The bracket of claim 3, wherein the first and second arms extend away from the surface in generally opposing directions.

5. The bracket of claim 4, wherein the surface defines a hollow bore of a substantially cylindrical component.

6. The bracket of claim 1, wherein
    the first implement comprises a furrow opener disc, and
    the second implement comprises a furrow closer disc.

7. The bracket of claim 1, wherein one or both of the first mounting end or the second mounting end is configured to tilt the respective one the first or second implements relative to a reference vertical axis from a ground surface in contact with the first or second implements.

8. The bracket of claim 1, wherein the tilt is greater than 5 degrees.

9. An agricultural planter comprising:
    a bracket comprising:
        a middle portion,
        a first arm rotatably and selectively coupled with a furrow opener disc, and a second arm rotatably and selectively coupled with a furrow closer disc, wherein each of first and second arms extend from the middle portion such that a pivoted displacement of one of the first or second arms in a first direction cause a pivoted displacement of the other of the first or second arms in a second direction that is opposite the first direction.

10. The agricultural planter of claim 9, wherein the bracket further comprises a first mounting end extending from the first arm and configured to tilt the furrower opener disc relative to a referenced vertical axis from a ground surface in contact with the furrow opener disc.

11. The agricultural planter of claim 9, wherein the bracket further comprises a second mounting end extending from the second arm and configured to tilt the furrower closer disc relative to a referenced vertical axis from a ground surface in contact with the furrow closer disc.

12. The agricultural planter of claim 9, wherein the agricultural planter further comprises a trailing arm frame pivotally coupled to a rear portion of the of the planter, and the bracket is pivotally coupled with the trailing arm frame along a pivot axis.

13. The agricultural planter of claim 12, wherein the pivot axis is offset from the pivotal coupling of the trailing arm frame the rear portion of the planter.

* * * * *